United States Patent
Hirai

(10) Patent No.: US 7,488,519 B2
(45) Date of Patent: Feb. 10, 2009

(54) POLYMERIZABLE LIQUID CRYSTAL COMPOSITION

(75) Inventor: Yoshiharu Hirai, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/078,298

(22) Filed: Mar. 28, 2008

(65) Prior Publication Data

US 2008/0241431 A1   Oct. 2, 2008

(30) Foreign Application Priority Data

Mar. 28, 2007   (JP) ............................... 2007-84013

(51) Int. Cl.
  *C09K 19/32* (2006.01)
  *C09K 19/30* (2006.01)
  *C09K 19/12* (2006.01)

(52) U.S. Cl. ..................... 428/1.1; 428/1.2; 428/1.3; 252/299.01; 252/299.5; 252/299.61; 252/299.62; 252/299.66; 252/299.67

(58) Field of Classification Search ................. 428/1.1, 428/1.2, 1.3; 252/299.01, 299.5, 299.61, 252/299.62, 299.66, 299.67
See application file for complete search history.

(56) References Cited

U.S. PATENT DOCUMENTS

| | | | |
|---|---|---|---|
| 5,863,457 | A | 1/1999 | Hasebe et al. |
| 6,379,758 | B1 | 4/2002 | Hanmer et al. |
| 2005/0224754 | A1 | 10/2005 | Hirai et al. |
| 2006/0114392 | A1 | 6/2006 | Tanaka |
| 2006/0182900 | A1 | 8/2006 | Kim et al. |

(Continued)

FOREIGN PATENT DOCUMENTS

GB   2 324 382   10/1998

(Continued)

OTHER PUBLICATIONS

English translation by computer for JP 2001-172339, http://www4.ipdl.inpit.go.jp/Tokujitu/PAJdetail.ipdl?N0000=60&N0120=01&N2001=2&N3001=2001-172339.*

(Continued)

*Primary Examiner*—Shean C Wu
(74) *Attorney, Agent, or Firm*—Wenderoth, Lind & Ponack, L.L.P.

(57) ABSTRACT

Such a polymerizable liquid crystal composition is to be provided that is excellent in stability in a solution state, shows good coating property on a supporting substrate, and has a uniform homeotropic alignment property. The polymerizable liquid crystal composition contains an acrylate compound, an epoxy compound and a bisphenol fluorene compound. The polymerizable liquid crystal composition contains a compound selected from a group of compounds represented by formulae (1-1) and (1-2) as a component (A), a compound selected from a group of compounds represented by formula (2) as a component (B), a compound selected from a group of compounds represented by formulae (3-1) to (3-3) as a component (C) and a compound selected from a group of compounds represented by formulae (4-1A), (4-1B), (4-2), (4-3), (4-4) and (4-5) as a component (D), and may optionally contain a compound selected from a group of compounds represented by formulae (5-1) and (5-2) as a component (E). The bisphenol fluorene compound is effective for controlling a uniform homeotropic alignment of the polymerizable liquid crystal composition.

23 Claims, 1 Drawing Sheet

U.S. PATENT DOCUMENTS

2008/0014374 A1 * 1/2008 Hirai ........................ 428/1.1

FOREIGN PATENT DOCUMENTS

| JP | 2001-172339 | * | 6/2001 |
| JP | 2002-243942 | | 8/2002 |
| JP | 2004-198478 | | 7/2004 |
| JP | 2005-196221 | | 7/2005 |
| WO | 2005/038517 | | 4/2005 |

OTHER PUBLICATIONS

Abstract of JP 10-319408 published Dec. 4, 1998.
Abstract of JP 2000-514202 published Oct. 24, 2000.
Abstract of JP 7-294735 published Nov. 10. 1995.
Abstract of WO 04/72699 published Aug 26, 2004.
Abstract of JP 2006-126757 published May 18, 2006.
Masakazu Nakata et al., "Novel Optical Compensation Films for IPS-LCDs", SID 06 Digest, P-58, pp. 420-423, 2006.
Kyeong Jin Kim et al., "New Structure of IPS Mode with In-cell Retarder for TV Application", SID 06 Digest, 21.1, pp. 1158-1161, 2006.
J. S. Yu et al., "A New Polarizer with Wide Viewing Angle and Low Color Shift Characteristics designed for In-Plant-Switching Liquid Crystal Display (IPS-LCD)", IDW '04, FMC8-4, pp. 655-658, 2004.

* cited by examiner

POLYMERIZABLE LIQUID CRYSTAL COMPOSITION

FIELD OF THE INVENTION

The present invention relates to a polymerizable liquid crystal composition, which may be used as a liquid crystal film by coating on a supporting substrate. The invention also relates to an optical compensation film, an optical device and a liquid crystal display device using the liquid crystal film.

BACKGROUND OF THE INVENTION

A polymerizable compound having a liquid crystal phase provides a polymer having such a function as optical compensation through polymerization. This is because the alignment of the liquid crystal molecules is fixed by polymerization. In order to utilize the function of the polymer, various kinds of polymerizable compounds have been developed. However, sufficient functions may not be obtained from only one kind of a polymerizable compound. Accordingly, there have been such attempts that a composition is prepared by using plural polymerizable compounds, and the composition is polymerized (as described in JP-A-10-319408 (GB 2324382A), JP-A-2004-198478, JP-A-2002-243942 and JP-A-2005-196221).

In the present specification, the state where a liquid crystal skeleton of a liquid crystal film or the like exhibit a homogeneous alignment, a tilted alignment, a homeotropic alignment or a twisted alignment may be simply referred to as that the liquid crystal film or the like "has a homogeneous alignment, "has a tilted alignment", "has a homeotropic alignment" or "has a twisted alignment", respectively.

A polymer having a homeotropic alignment has an optical axis in the $n_z$ direction, and the refractive index in the direction of the optical axis is larger than the refractive index in the direction perpendicular to the optical axis. Accordingly, the polymer is classified into a positive C plate in terms of index ellipsoid. The positive C plate can be applied, by combining with a film having an other optical function, to optical compensation of a liquid crystal mode with a horizontal alignment, i.e., a so-called IPS (in-plane switching) mode, and the like, such as improvement in viewing angle characteristics of a polarizing plate (as described in M. S. Park, et al., IDW, '04, FMC8-4, M. Nakata, et al., SID, '06, P-58, K. J. Kim, et al., SID, '06, Digest, p. 1158-1161, WO 05/38517 and US 2006/182900).

In the aforementioned purposes, a polymerizable liquid crystal material may be laminated with a glass substrate, a glass substrate having a plastic thin film covering the surface thereof (such as, an overcoat film formed on a color filter) or a plastic substrate, in some cases. Examples of the material used for the plastic substrate include TAC (triacetyl cellulose), polycarbonate, PET and a cycloolefin polymer.

In order to make a polymerizable liquid crystal in a homeotropic alignment, there are such methods, in the case where the supporting substrate is a glass substrate, as a method of selecting the structure of the polymerizable liquid crystal compound to exhibit a smectic phase, as described in JP-A-2000-514202 (U.S. Pat. No. 6,379,758 B1), and a method of coating lecithin as a homeotropic alignment film on the glass substrate, as described in JP-A-7-294735 (U.S. Pat. No. 5,863,457). In the case where the supporting substrate is a plastic substrate, it is necessary to form an alignment film on the supporting substrate (as described in JP-A-10-319408 (GB 2324382A) and WO 04/72699). The present inventors have found such a polymerizable liquid crystal composition that a polymerizable liquid crystal compound can be formed on a glass substrate or a plastic substrate to have a homeotropic alignment without formation of an alignment film on the supporting substrate and can be excellent in adhesion property (as described in JP-A-2006-126757 (US 2005/224754 A1)). However, the composition may suffer increase of the viscosity of the solution to provide a problem in storage stability, and thus it is necessary to mix an additive immediately before use. Also, a uniform alignment property is not sometimes obtained according as kind of supporting substrate. Under the circumstances, the inventors have found such a polymerizable liquid crystal composition that is excellent in storage stability and is capable of forming a homeotropic alignment without a special homeotropic alignment film irrespective of the kind of the supporting substrate, and have filed a patent application. However, the composition is still insufficient in adhesion property and has room for improvements. Accordingly, such a polymerizable liquid crystal composition has been demanded that provides a homeotropic alignment on a glass substrate and a plastic substrate without a surface treatment with a homeotropic alignment film having long-chain alkyl groups or the like or an inorganic material, and particularly is excellent in storage stability of the solution.

SUMMARY OF THE INVENTION

An object of the present invention is to provide such a polymerizable liquid crystal composition that is excellent in stability in a solution state, shows good coating property on a supporting substrate, and has a uniform homeotropic alignment property and good adhesion property to a supporting substrate. Another object of the invention is to provide a liquid crystal layer controlled in alignment containing the polymerizable liquid crystal composition, a liquid crystal film obtained by polymerizing the polymerizable liquid crystal composition, and an optical compensation film containing the film. Still another object of the invention is to provide an image display device, such as a liquid crystal display device, an organic EL display device and PDP, containing the optical compensation film.

The inventors have found that the use of an acrylate compound, an epoxy compound and a bisphenol fluorene compound, which is a compound represented by the following formulae (3-1) to (3-3), as components of a polymerizable liquid crystal composition is effective for controlling a uniform homeotropic alignment of the polymerizable liquid crystal composition and for improving the adhesion property to a supporting substrate, and thus the invention has been completed. In particular, the epoxy compound is effective for improving the adhesion property to a supporting substrate. The composition has good storage stability as a solution since the solution does not suffer coloration, change in viscosity, and the like with the lapse of time. The inventors have also found that a polymer obtained from the polymerizable liquid crystal composition exhibits excellent adhesion property to a supporting substrate and a uniform homeotropic alignment, and the same advantages can be obtained in the case where the polymerizable liquid crystal composition is coated on a supporting substrate having been subjected to a mechanical surface treatment, such as rubbing, or a chemical surface treatment.

The polymerizable liquid crystal composition of the invention contains a compound selected from a group of compounds represented by formulae (1-1) and (1-2) as a component (A), a compound selected from a group of compounds represented by formula (2) as a component (B), a compound selected from a group of compounds represented by formulae (3-1) to (3-3) as a component (C) and a compound selected from a group of compounds represented by formulae (4-1A), (4-1B), (4-2), (4-3), (4-4) and (4-5) as a component (D), and may optionally contain a compound selected from a group of compounds represented by formulae (5-1) and (5-2) as a component (E).

DETAILED DESCRIPTION OF THE INVENTION

Figure 1:
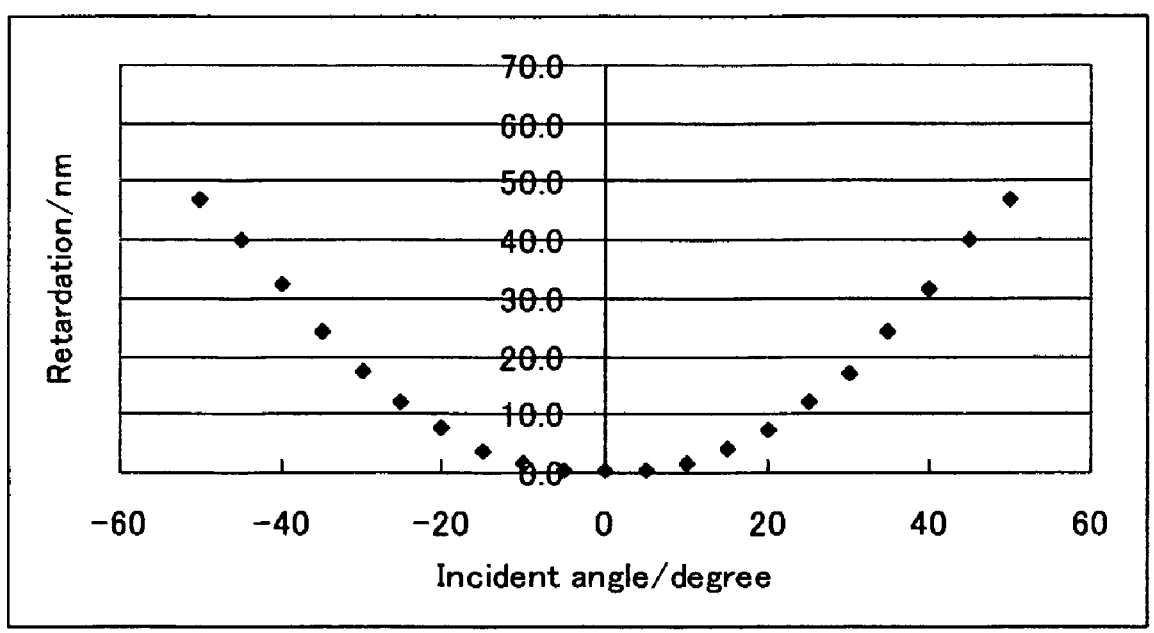
FIG. 1 is a graph showing measurement results of retardation of a liquid crystal film of Example 1.

The terms used herein are defined as follows. A liquid crystal compound is a generic term for a compound having a liquid crystal phase and a compound having no liquid crystal phase but being useful as a component of a liquid crystal composition. A liquid crystal phase includes a nematic phase, a smectic phase, a cholesteric phase and the like, and means a nematic phase in many cases. Polymerizability means such a capability that a monomer undergoes polymerization through such means as light, heat or a catalyst to provide a polymer. A compound represented by formula (1-1) is sometimes referred to as a compound (1-1). The rule may also be applied to compounds represented by the other formulae. The term "(meth)acrylate" means one or both of acrylate and methacrylate. The term "epoxy" means oxiranyl or oxetanyl. In the chemical formulae, in the case where a substituent on a benzene ring has a bond that does not bonded to any specific carbon atom on the benzene ring, the substituent is bonded to an arbitrary position on the benzene ring.

In the invention, the polymerizable liquid crystal composition is described as a system containing no solvent for convenience of clear illustration the compositional ratios of the components of the composition. A solution containing the polymerizable liquid crystal composition and a solvent is expressed as a solution of the polymerizable liquid crystal composition. However, the expression does not only mean that a polymerizable liquid crystal composition containing no solvent is firstly prepared, which is then diluted by adding a solvent. In normal cases, the components of the polymerizable liquid crystal composition are dissolved in a solvent to prepare a solution of the polymerizable liquid crystal composition.

An alignment of liquid crystal molecules is classified into homogeneous, homeotropic, tilted, twisted and the like, based on the extent of the tilt angle and the like. The tilt angle is an angle between the alignment state of the liquid crystal molecule and a supporting substrate. The homogeneous alignment is such a state that the alignment state of the liquid crystal molecules is in parallel to the substrate, and the liquid crystal molecules are aligned in one direction. The tilt angle in the homogeneous alignment is, for example, from 0 to 5 degree. The homeotropic alignment is such a state that the alignment state of the liquid crystal molecules is perpendicular to the substrate. The tilt angle in the homeotropic alignment is, for example, from 85 to 90 degree. The tilted alignment is such a state that the alignment state of the liquid crystal molecules is changed from parallel to perpendicular apart from the substrate. The tilt angle in the tilted alignment is, for example, from 5 to 85 degree. The twisted alignment is such a state that the alignment state of the liquid crystal molecules is in parallel to the substrate, but is twisted in a step form with a helical axis as the center. The tilt angle in the twisted alignment is, for example, from 0 to 5 degree.

The invention includes the following items [1] to [23].

[1] A polymerizable liquid crystal composition containing at least one compound selected from a group of compounds represented by formulae (1-1) and (1-2) as a component (A), at least one compound selected from a group of compounds represented by formula (2) as a component (B), at least one compound selected from a group of compounds represented by formulae (3-1) to (3-3) as a component (C) and at least one compound selected from a group of compounds represented by formulae (4-1A), (4-1B), (4-2), (4-3), (4-4) and (4-5) as a component (D), and optionally containing at least one compound selected from a group of compounds represented by formulae (5-1) and (5-2) as a component (E):

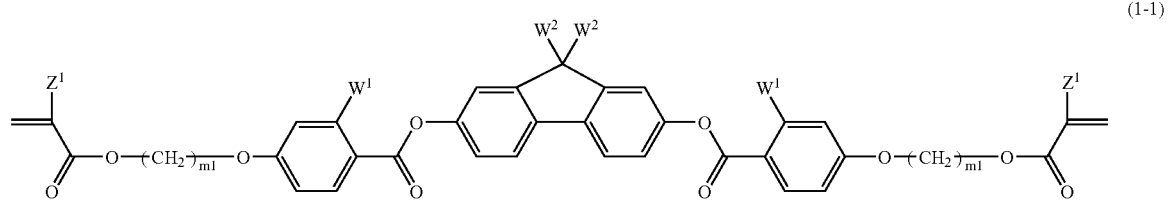

(1-1)

-continued

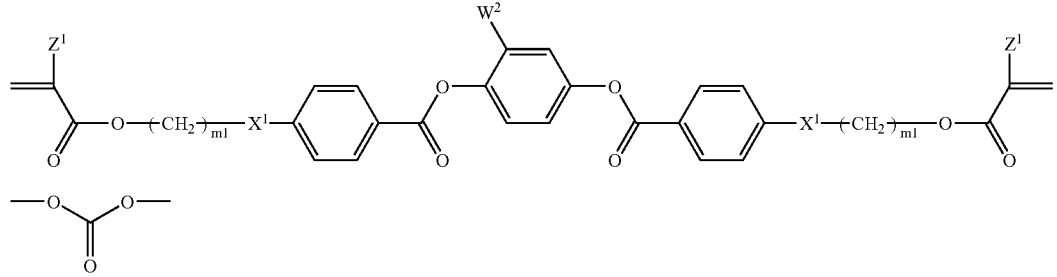

wherein $Z^1$ independently represents hydrogen, fluorine, methyl or trifluoromethyl; $W^1$ independently represents hydrogen or fluorine; $W^2$ independently represents hydrogen or methyl; $X^1$ independently represents —O— or a group represented by formula (a); and m1 independently represents an integer of from 2 to 15, wherein $Z^2$ represents hydrogen or methyl; $W^3$ represents hydrogen or fluorine; $R^1$ represents —CN, —OCF$_3$, alkyl having from 1 to 10 carbon atoms or alkoxy having from 1 to 10 carbon atoms; $X^2$ represents a single bond, —COO— or —OCO—; and m1 represents an integer of from 2 to 15,

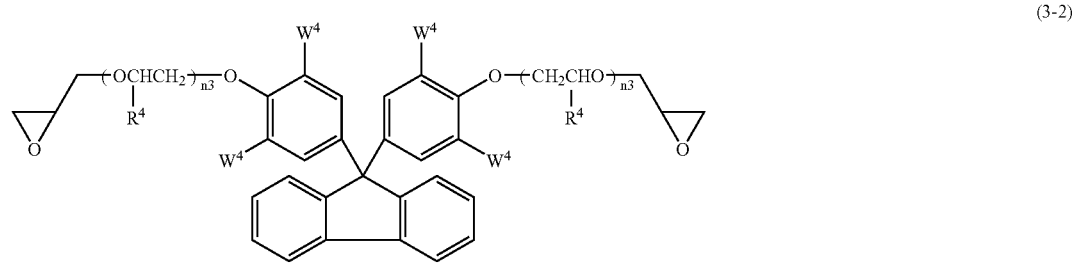

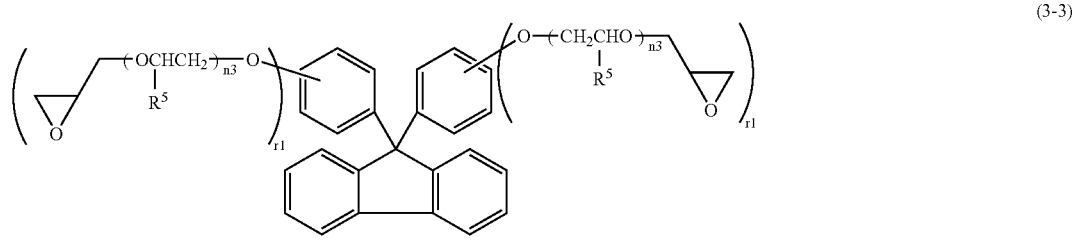

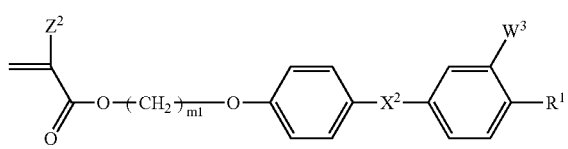

wherein $Z^2$ independently represents hydrogen or methyl; $R^3$ independently represents hydrogen or alkyl having from 1 to 6 carbon atoms; $R^4$ independently represents hydrogen or alkyl having from 1 to 6 carbon atoms; $R^5$ independently represents hydrogen or methyl; $W^4$ independently represents hydrogen, alkyl having from 1 to 6 carbon atoms, phenyl or halogen; n1 independently represents an integer of from 1 to 3; n2 independently represents an integer of from 1 to 3; n3 independently represents an integer of from 0 to 10; and r1 independently represents an integer of from 2 to 5,

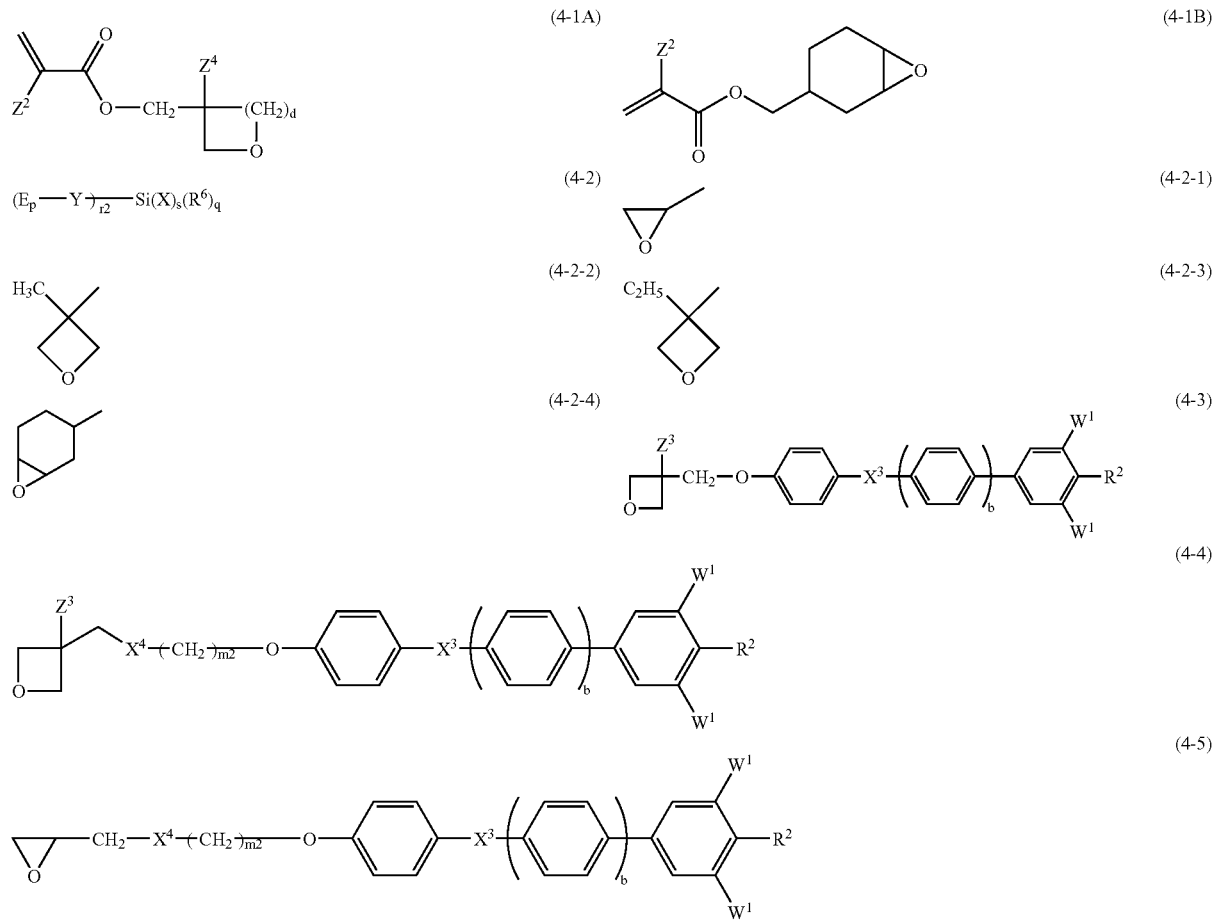

wherein $Z^2$ independently represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 20 carbon atoms, and in the alkylene, one or two —CH$_2$— not adjacent to each other may be replaced by —O—; X represents alkoxy having from 1 to 4 carbon atoms or trimethylsiloxy; $R^6$ represents alkyl having from 1 to 4 carbon atoms; r2 represents an integer of from 1 to 3; s and q each independently represents an integer of from 0 to 3; and the sum of r2, s and q is 4;

$Z^3$ independently represents methyl or ethyl; $W^1$ independently represents hydrogen or fluorine; $R^2$ independently represents —CN, —CF$_3$, —OCF$_3$, alkyl having from 1 to 25 carbon atoms or alkoxy having from 1 to 25 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; $X^4$ independently represents —CH$_2$— or —O—; m2 independently represents an integer of from 2 to 8; and b independently represents 0 or 1,

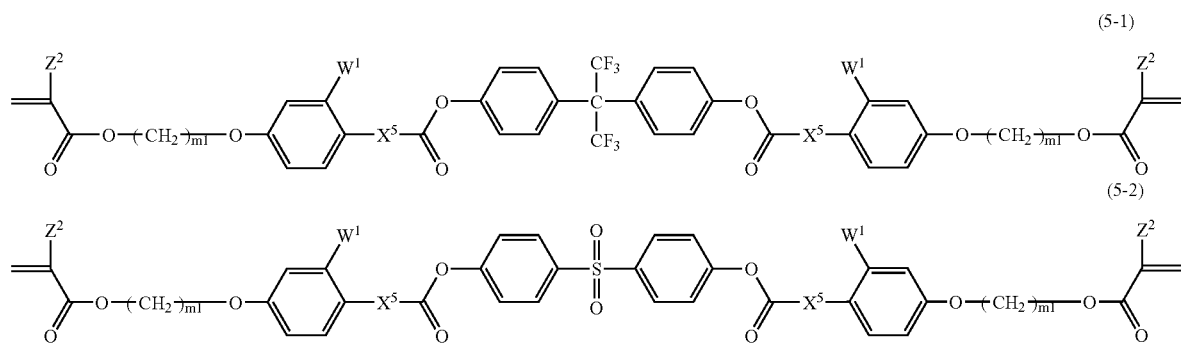

wherein $Z^2$ independently represents hydrogen or methyl; $X^5$ independently represents a single bond, —(CH$_2$)$_2$— or —CH=CH—; $W^1$ independently represents hydrogen or fluorine; and m1 independently represents an integer of from 2 to 15.

[2] The polymerizable liquid crystal composition according to the item [1], wherein in formulae (1-1) and (1-2), $Z^1$ independently represents hydrogen, fluorine or methyl; $W^1$ independently represents hydrogen or fluorine; $W^2$ independently represents hydrogen or methyl; $X^1$ independently represents —O— or a group represented by formula (a); and m1 independently represents an integer of from 2 to 15, in formula (2), $Z^2$ represents hydrogen or methyl; $W^3$ represents hydrogen or fluorine; $R^1$ represents —CN, —OCF$_3$, alkyl having from 1 to 10 carbon atoms or alkoxy having from 1 to 10 carbon atoms; $X^2$ represents a single bond, —COO— or —OCO—; and m1 represents an integer of from 2 to 15, in formulae (3-1) to (3-3), $Z^2$ independently represents hydrogen or methyl; $R^3$ independently represents hydrogen or alkyl having from 1 to 6 carbon atoms; $R^4$ independently represents hydrogen or alkyl having from 1 to 3 carbon atoms; $R^5$ independently represents hydrogen or methyl; $W^4$ independently represents hydrogen or alkyl having from 1 to 6 carbon atoms; n1 independently represents an integer of from 1 to 3; n2 independently represents an integer of from 1 to 3; n3 independently represents an integer of from 0 to 10; and r1 independently represents an integer of from 2 to 5, in formulae (4-1A), (4-1B) and (4-2), $Z^2$ independently represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 10 carbon atoms, and in the alkylene, one or two —CH$_2$— not adjacent to each other may be replaced by —O—; X represents alkoxy having from 1 to 4 carbon atoms or trimethylsiloxy; $R^6$ represents alkyl having from 1 to 4 carbon atoms; r2 represents an integer of from 1 to 3; s and q each independently represents an integer of from 0 to 3; and the sum of r2, s and q is 4, in formulae (4-3) to (4-5), $Z^3$ independently represents methyl or ethyl; $W^1$ independently represents hydrogen or fluorine; $R^2$ independently represents —CN, —CF$_3$, —OCF$_3$, alkyl having from 1 to 25 carbon atoms or alkoxy having from 1 to 25 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; $X^4$ independently represents —CH$_2$— or —O—; m2 independently represents an integer of from 2 to 8; and b independently represents 0 or 1, and in formulae (5-1) and (5-2), $Z^2$ independently represents hydrogen or methyl; $X^5$ independently represents a single bond, —(CH$_2$)$_2$— or —CH=CH—; $W^1$ independently represents hydrogen or fluorine; and m1 independently represents an integer of from 2 to 15.

[3] The polymerizable liquid crystal composition according to the item [1], wherein in formulae (1-1) and (1-2), $Z^1$ independently represents hydrogen, fluorine or methyl; $W^1$ independently represents hydrogen or fluorine; $W^2$ independently represents hydrogen or methyl; $X^1$ independently represents —O— or a group represented by formula (a); and m1 independently represents an integer of from 2 to 10, in formula (2), $Z^2$ represents hydrogen or methyl; $W^3$ represents hydrogen or fluorine; $R^1$ represents —CN, —OCF$_3$, alkyl having from 1 to 10 carbon atoms or alkoxy having from 1 to 10 carbon atoms; $X^2$ represents a single bond, —COO— or —OCO—; and m1 represents an integer of from 2 to 10, in formulae (3-1) to (3-3), $Z^2$ independently represents hydrogen or methyl; $R^3$ represents hydrogen; $R^4$ independently represents hydrogen or alkyl having from 1 to 3 carbon atoms; $R^5$ independently represents hydrogen or methyl; $W^4$ represents hydrogen; n1 independently represents an integer of from 1 to 3; n2 independently represents an integer of from 1 to 3; n3 independently represents an integer of from 0 to 6; and r1 independently represents an integer of from 2 to 5, in formulae (4-1A), (4-1B) and (4-2), $Z^2$ represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 6 carbon atoms, and in the alkylene, one or two —CH$_2$— not adjacent to each other may be replaced by —O—; X represents alkoxy having from 1 to 4 carbon atoms or trimethylsiloxy; $R^6$ represents alkyl having from 1 to 4 carbon atoms; r2 represents an integer of from 1 to 3; s and q each independently represents an integer of from 0 to 3; and the sum of r2, s and q is 4, in formulae (4-3) to (4-5), $Z^3$ independently represents methyl or ethyl; $W^1$ independently represents hydrogen or fluorine; $R^2$ independently represents —CN, —OCF$_3$, alkyl having from 1 to 10 carbon atoms or alkoxy having from 1 to 10 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; $X^4$ independently represents —CH$_2$— or —O—; m2 independently represents an integer of from 2 to 8; and b independently represents 0 or 1, and in formulae (5-1) and (5-2), $Z^2$ independently represents hydrogen or methyl; $X^5$ independently represents a single bond, —(CH$_2$)$_2$— or —CH=CH—; $W^1$ independently represents hydrogen or fluorine; and m1 independently represents an integer of from 2 to 10.

[4] The polymerizable liquid crystal composition according to the item [1], wherein in formulae (1-1) and (1-2), $Z^1$ independently represents hydrogen, fluorine or methyl; $W^1$ represents hydrogen or fluorine; $W^2$ independently represents hydrogen or methyl; $X^1$ represents —O— or a group represented by formula (a); and m1 independently represents an integer of from 2 to 6, in formula (2), $Z^2$ represents hydrogen or methyl; $W^3$ represents hydrogen or fluorine; $R^1$ represents —CN or —OCF$_3$; $X^2$ represents a single bond, —COO— or —OCO—; and m1 represents an integer of from 2 to 6, in formulae (3-1) to (3-3), $Z^2$ represents hydrogen; $R^3$ represents hydrogen; $R^4$ represents hydrogen; $R^5$ represents hydrogen; $W^4$ represents hydrogen; n1 represents an integer of from 1 to 3; n2 represents an integer of from 1 to 3; n3 represents an integer of from 0 to 4; and r1 represents 2, in formulae (4-1A), (4-1B) and (4-2), $Z^2$ represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 6 carbon atoms, and in the alkylene, one or two —CH$_2$— not adjacent to each other may be replaced by —O—; X represents alkoxy having from 1 to 4 carbon atoms; $R^6$ represents methyl; r2 represents 1 or 2; q represents 0 or 1; and s represents (4-r2-q), in formulae (4-3) to (4-5), $Z^3$ independently represents methyl or ethyl; $W^1$ independently represents hydrogen or fluorine; $R^2$ independently represents —CN, —OCF$_3$, alkyl having from 1 to 10 carbon atoms or alkoxy having from 1 to 10 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—;

$X^4$ independently represents —$CH_2$— or —O—; m2 independently represents an integer of from 2 to 8; and b independently represents 0 or 1, in formulae (5-1) and (5-2), $Z^2$ independently represents hydrogen or methyl; $X^5$ independently represents a single bond, —$(CH_2)_2$— or —CH=CH—; $W^1$ independently represents hydrogen or fluorine; and m1 independently represents an integer of from 2 to 6, and the polymerizable liquid crystal composition contains the component (A) in a ratio of from 15 to 95% by weight, the component (B) in a ratio of from 3 to 40% by weight, the component (C) in a ratio of from 1 to 20% by weight, the component (D) in a ratio of from 1 to 25% by weight, and the component (E) in a ratio of from 0 to 20% by weight, based on a total weight of the components (A) to (E).

[5] The polymerizable liquid crystal composition according to the item [1], wherein in formulae (1-1) and (1-2), $Z^1$ independently represents hydrogen, fluorine or methyl; $W^1$ represents hydrogen or fluorine; $W^2$ independently represents hydrogen or methyl; $X^1$ represents —O— or a group represented by formula (a); and m1 independently represents an integer of from 4 to 6, in formula (2), $Z^2$ represents hydrogen; $W^3$ represents hydrogen; $R^1$ represents —CN; $X^2$ represents a single bond, —COO— or —OCO—; and m1 represents an integer of from 4 to 6, in formulae (3-1) to (3-3), $Z^2$ represents hydrogen; $R^3$ represents hydrogen; $R^4$ represents hydrogen; $R^5$ represents hydrogen; $W^4$ represents hydrogen; n1 represents 1; n2 represents 1; n3 represents an integer of from 0 to 2; and r1 represents 2, in formulae (4-1A), (4-1B) and (4-2), $Z^2$ represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 6 carbon atoms, and in the alkylene, one or two —$CH_2$— not adjacent to each other may be replaced by —O—; X represents alkoxy having from 1 to 4 carbon atoms; $R^6$ represents methyl; r2 represents 1; q represents 0 or 1; and s represents (4-r2-q), in formulae (4-3) to (4-5), $Z^3$ independently represents methyl or ethyl; $W^1$ independently represents hydrogen or fluorine; $R^2$ independently represents —CN, —$OCF_3$, alkyl having from 1 to 8 carbon atoms or alkoxy having from 1 to 8 carbon atoms; $X^3$ independently represents a single bond, —COO—, —OCO—, —CH=CH—COO—, —OCO—CH=CH—, —$CH_2CH_2$—COO— or —OCO—$CH_2CH_2$—; $X^4$ independently represents —$CH_2$— or —O—; m2 independently represents an integer of from 2 to 6; and b independently represents 0 or 1, in formulae (5-1) and (5-2), $Z^2$ independently represents hydrogen or methyl; $X^5$ independently represents a single bond, —$(CH_2)_2$— or —CH=CH—; $W^1$ represents hydrogen; and m1 independently represents an integer of from 2 to 6, and the polymerizable liquid crystal composition contains the component (A) in a ratio of from 27 to 91% by weight, the component (B) in a ratio of from 3 to 35% by weight, the component (C) in a ratio of from 3 to 15% by weight, the component (D) in a ratio of from 3 to 23% by weight, and the component (E) in a ratio of from 0 to 15% by weight, based on a total weight of the components (A) to (E).

[6] The polymerizable liquid crystal composition according to the item [1], wherein in formulae (1-1) and (1-2), $Z^1$ represents hydrogen, fluorine or methyl; $W^1$ represents hydrogen or fluorine; $W^2$ independently represents hydrogen or methyl; $X^1$ represents —O— or a group represented by formula (a); and m1 represents an integer of from 4 to 6, in formula (2), $Z^2$ represents hydrogen; $W^3$ represents hydrogen; $R^1$ represents —CN; $X^2$ represents a single bond, —COO— or —OCO—; and m1 represents an integer of from 4 to 6, in formulae (3-1) to (3-3), $Z^2$ represents hydrogen; $R^3$ represents hydrogen; $R^4$ represents hydrogen; $R^5$ represents hydrogen; $W^4$ represents hydrogen; n1 represents 1; n2 represents 1; n3 represents an integer of from 0 to 2; and r1 represents 2, in formulae (4-1A), (4-1B) and (4-2), $Z^2$ represents hydrogen or methyl; $Z^4$ represents hydrogen or ethyl; d represents 0 or 1; Ep represents a group represented by one of formulae (4-2-1) to (4-2-4); Y represents alkylene having from 1 to 6 carbon atoms, and in the alkylene, one or two —$CH_2$— not adjacent to each other may be replaced by —O—; X represents methoxy or ethoxy; $R^6$ represents methyl; r2 represents 1; q represents 0 or 1; and s represents (4-r2-q), in formulae (4-3) to (4-5), $Z^3$ represents ethyl; $W^1$ independently represents hydrogen or fluorine; $R^2$ independently represents —CN or —$OCF_3$; $X^3$ independently represents a single bond, —COO—, —OCO—, —CH=CH—COO—, —OCO—CH=CH—, —$CH_2CH_2$—COO— or —OCO—$CH_2CH_2$—; $X^4$ represents —O—; m2 independently represents an integer of from 4 to 6; and b independently represents 0 or 1, in formulae (5-1) and (5-2), $Z^2$ represents hydrogen or methyl; $X^5$ represents a single bond; $W^1$ represents hydrogen or fluorine; and m1 represents an integer of from 4 to 6, and the polymerizable liquid crystal composition contains the component (A) in a ratio of from 32 to 89% by weight, the component (B) in a ratio of from 5 to 35% by weight, the component (C) in a ratio of from 3 to 13% by weight, the component (D) in a ratio of from 3 to 20% by weight, and the component (E) in a ratio of from 0 to 13% by weight, based on a total weight of the components (A) to (E).

[7] The polymerizable liquid crystal composition according to the item [6], wherein the polymerizable liquid crystal composition contains the component (A) in a ratio of from 37 to 84% by weight, the component (B) in a ratio of from 10 to 35% by weight, the component (C) in a ratio of from 3 to 10% by weight, the component (D) in a ratio of from 3 to 18% by weight, and the component (E) in a ratio of from 0 to 10% by weight, based on a total weight of the components (A) to (E).

[8] The polymerizable liquid crystal composition according to the item [4], wherein the polymerizable liquid crystal composition contains the component (A) in a ratio of from 15 to 95% by weight, the component (B) in a ratio of from 3 to 40% by weight, the component (C) in a ratio of from 1 to 20% by weight, the component (D) in a ratio of from 1 to 25% by weight, and 0% by weight of the component (E), based on a total weight of the components (A) to (E).

[9] The polymerizable liquid crystal composition according to the item [4], wherein the polymerizable liquid crystal composition contains the component (A) in a ratio of from 15 to 94.9% by weight, the component (B) in a ratio of from 3 to 40% by weight, the component (C) in a ratio of from 1 to 20% by weight, the component (D) in a ratio of from 1 to 25% by weight, and the component (E) in a ratio of from 0.1 to 20% by weight, based on a total weight of the components (A) to (E).

[10] The polymerizable liquid crystal composition according to the item [6], wherein the polymerizable liquid crystal composition contains the component (A) in a ratio of from 32 to 89% by weight, the component (B) in a ratio of from 5 to 35% by weight, the component (C) in a ratio of from 3 to 13% by weight, the component (D) in a ratio of from 3 to 20% by weight, and 0% by weight of the component (E), based on a total weight of the components (A) to (E).

[11] The polymerizable liquid crystal composition according to the item [6], wherein the polymerizable liquid crystal composition contains the component (A) in a ratio of from 32 to 88.9% by weight, the component (B) in a ratio of from 5 to 35% by weight, the component (C) in a ratio of from 3 to 13% by weight, the component (D) in a ratio of from 3 to 20% by weight, and the component (E) in a ratio of from 0.1 to 13% by weight, based on a total weight of the components (A) to (E).

[12] A polymerizable liquid crystal layer obtained by directly coating the polymerizable liquid crystal composition according to any one of the items [1] to [11] on a supporting substrate.

[13] The polymerizable liquid crystal layer according to the item [12], wherein the supporting substrate is a glass substrate.

[14] The polymerizable liquid crystal layer according to the item [12], wherein the supporting substrate is a glass substrate having a plastic thin film coated on a surface thereof, or a plastic substrate.

[15] The polymerizable liquid crystal layer according to the item [12], wherein the supporting substrate is a glass substrate having a plastic thin film coated on a surface thereof and being subjected a corona treatment or a plasma treatment on a surface of the plastic thin film, or a plastic substrate being subjected a corona treatment or a plasma treatment on a surface thereof.

[16] The polymerizable liquid crystal layer according to the item [14], wherein a plastic material constituting the plastic thin film or the plastic substrate is one selected from polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

[17] The polymerizable liquid crystal layer according to the item [15], wherein a plastic material constituting the plastic thin film or the plastic substrate is one selected from polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

[18] The polymerizable liquid crystal layer according to any one of the items [12] to [17], wherein an alignment state of a liquid crystal skeleton in the polymerizable liquid crystal layer is a homeotropic alignment.

[19] A liquid crystal film obtained by polymerizing the polymerizable liquid crystal layer according to any one of the items [12] to [18].

[20] An optical compensation device comprising the liquid crystal film according to the item [19].

[21] An optical device comprising at least one liquid crystal film according to the item [19] and a polarizing plate.

[22] A liquid crystal display device comprising the optical compensation device according to the item [20] on an inner surface or an outer surface of a liquid crystal cell.

[23] A liquid crystal display device comprising the optical device according to the item [21] on an outer surface of a liquid crystal cell.

The composition of the present invention contains, as the essential components, the component (A), the component (B), the component (C) and the component (D). The component (A) is at least one compound selected from a group of compounds represented by formulae (1-1) and (1-2).

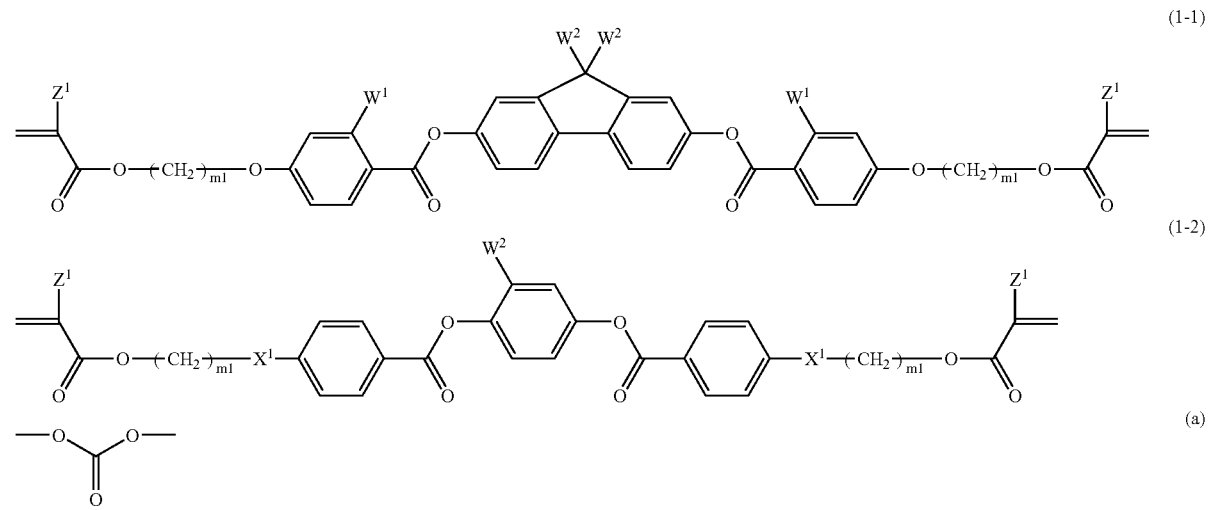

In formulae (1-1) and (1-2), $Z^1$ independently represents hydrogen, fluorine, methyl or trifluoromethyl. Preferred examples of $Z^1$ include hydrogen, fluorine and methyl. Two groups or atoms represented by $Z^1$ in one formula are preferably the same groups or atoms. $W^1$ independently represents hydrogen or fluorine. Two atoms represented by $W^1$ are preferably the same atoms. $W^2$ independently represents hydrogen or methyl. $X^1$ independently represents —O— or a group represented by formula (a). Two groups or atoms represented by $X^1$ are preferably the same groups or atoms. m1 independently represents an integer of from 2 to 15. m1 preferably represents an integer of from 2 to 10, and more preferably from 4 to 6. Two integers represented by m1 in one formula are preferably the same integers.

The component (B) is at least one compound selected from a group of compounds represented by formula (2).

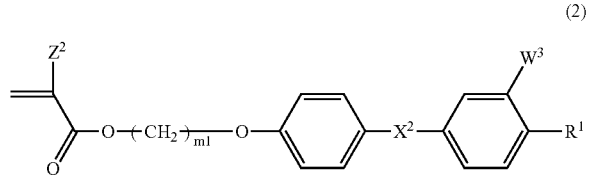
(2)

In formula (2), $Z^2$ represents hydrogen or methyl, and preferably hydrogen. $W^3$ represents hydrogen or fluorine, and preferably hydrogen. $R^1$ represents —CN, —OCF$_3$, alkyl having from 1 to 10 carbon atoms or alkoxy having from 1 to 10 carbon atoms. Preferred examples of $R^1$ include —CN and —OCF$_3$, and the most preferred example of $R^1$ is —CN. $X^2$ represents a single bond, —COO— or —OCO—. m1 represents an integer of from 2 to 15, preferably from 2 to 10, and more preferably from 4 to 6.

The component (C) is at least one compound selected from a group of compounds represented by formulae (3-1) to (3-3).

In the formulae (3-1) to (3-3), $Z^2$ independently represents hydrogen or methyl, and preferably hydrogen. $R^3$ independently represents hydrogen or alkyl having from 1 to 6 carbon atoms, and preferably hydrogen. $R^4$ independently represents hydrogen or alkyl having from 1 to 6 carbon atoms. Preferred examples of $R^4$ include hydrogen and alkyl having from 1 to 3 carbon atoms, and the most preferred example thereof is hydrogen. $R^5$ independently represents hydrogen or methyl, and preferably hydrogen. $W^4$ independently represents hydrogen, alkyl having from 1 to 6 carbon atoms, phenyl or halogen. Preferred examples of $W^4$ include hydrogen and alkyl having from 1 to 6 carbon atoms, and the most preferred example thereof is hydrogen. n1 independently represents an integer of from 1 to 3, and preferably 1. n2 independently represents an integer of from 1 to 3, and preferably 1. n3 independently represents an integer of from 0 to 10, preferably independently represents an integer of from 0 to 6, more preferably represents an integer of from 0 to 4, and further preferably represents an integer of from 0 to 2. r1 independently represents an integer of from 2 to 5, and preferably 2.

The component (D) is at least one compound selected from a group of compounds represented by formulae (4-1A), (4-1B), (4-2), (4-3), (4-4) and (4-5).

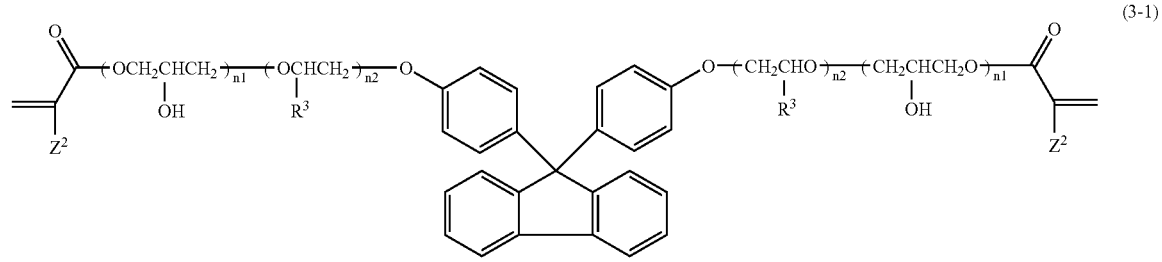
(3-1)

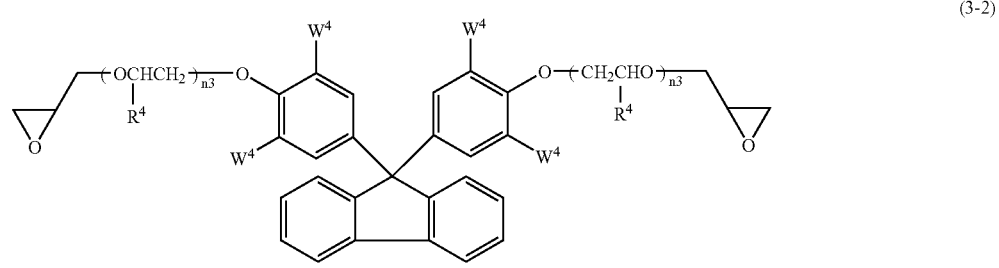
(3-2)

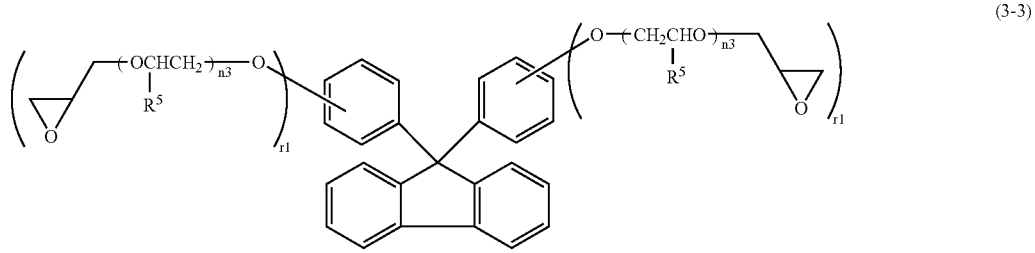
(3-3)

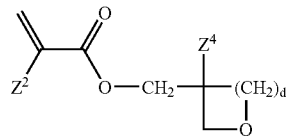 (4-1A)

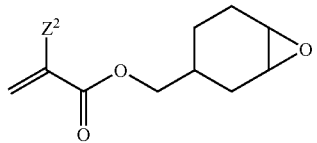 (4-1B)

(4-2)

$(E_p-Y)_{r2}-Si(X)_s(R^6)_q$ (4-2-1)

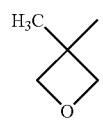 (4-2-2)

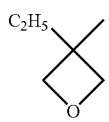 (4-2-3)

(4-2-4)

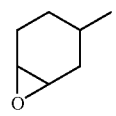

(4-3)

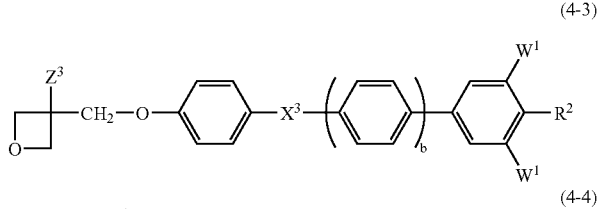

(4-4)

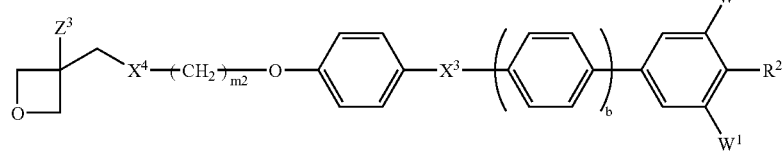

(4-5)

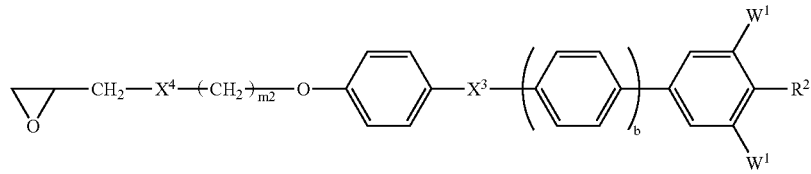

In formulae (4-1A), (4-1B) and (4-2), $Z^2$ independently represents hydrogen or methyl. $Z^4$ represents hydrogen, methyl or ethyl, and preferably hydrogen or ethyl. d represents 0 or 1. Ep represents a group represented by one of formulae (4-2-1) to (4-2-4). Y represents alkylene having from 1 to 20 carbon atoms, and in the alkylene, one or two —CH$_2$— not adjacent to each other may be replaced by —O—. The alkylene group for Y preferably has from 1 to 10 carbon atoms, and more preferably 1 to 6 carbon atoms. X represents alkoxy having from 1 to 4 carbon atoms or trimethylsiloxy, preferably alkoxy having from 1 to 4 carbon atoms, and more preferably methoxy or ethoxy. $R^6$ represents alkyl having from 1 to 4 carbon atoms, and preferably methyl. r2 represents an integer of from 1 to 3, preferably 1 or 2, and more preferably 1. s and q each independently represents an integer of from 0 to 3, and preferred examples of q include 0 and 1. The sum of r2, s and q is 4. Accordingly, in the case where r2 is 1 or 2, and q is 0 or 1, represents (4-r2-q).

In formulae (4-3) to (4-5), $Z^3$ independently represents methyl or ethyl, and preferably ethyl. $W^1$ independently represents hydrogen or fluorine. $R^2$ independently represents —CN, —CF$_3$, —OCF$_3$, alkyl having from 1 to 25 carbon atoms or alkoxy having from 1 to 25 carbon atoms. Preferred examples of $R^2$ include —CN, —OCF$_3$, alkyl having from 1 to 10 carbon atoms or alkoxy having from 1 to 10 carbon atoms. More preferred examples of $R^2$ include —CN, —OCF$_3$, alkyl having from 1 to 8 carbon atoms or alkoxy having from 1 to 8 carbon atoms. Further preferred examples of $R^2$ include —CN and —OCF$_3$. $X^3$ independently represents a single bond, —COO—, —OCO—, —CH═CH—COO—, —OCO—CH═CH—, —CH$_2$CH$_2$—COO— or —OCO—CH$_2$CH$_2$—. $X^4$ independently represents —CH$_2$— or —O—, and preferably —O—. m2 independently represents an integer of from 2 to 8. m2 preferably represents an integer of from 2 to 6, and more preferably from 4 to 6. b independently represents 0 or 1.

The composition of the invention may contain the component (E), which is at least one compound selected from a group of compounds represented by formulae (5-1) and (5-2).

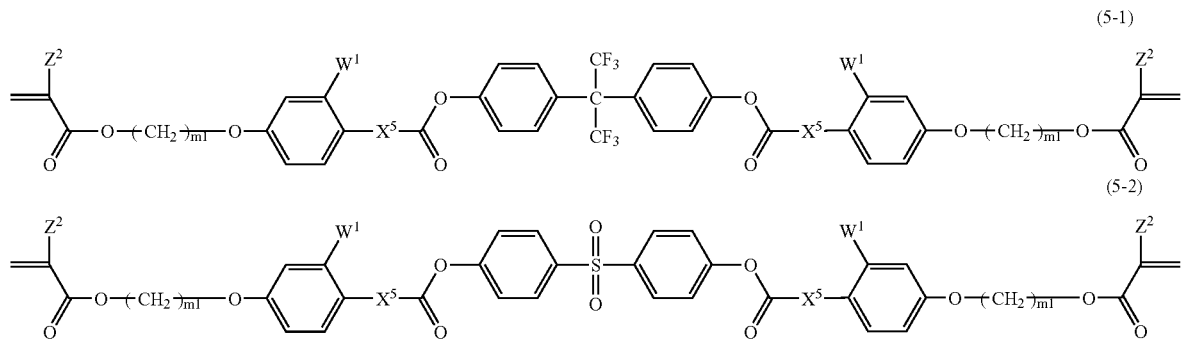

In formulae (5-1) and (5-2), $Z^2$ independently represents hydrogen or methyl. Two groups or atoms represented by $Z^2$ in one formula are preferably the same groups or atoms. $X^5$ independently represents a single bond, $-(CH_2)_2-$ or $-CH=CH-$. Two $X^5$s in one formula are preferably single bonds or the same groups. $X^5$ preferably represents a single bond. $W^1$ independently represents hydrogen or fluorine. Two atoms represented by $W^1$ in one formula are preferably the same atoms. $W^1$ preferably represents hydrogen. m1 independently represents an integer of from 2 to 15. m1 preferably represents an integer of from 2 to 10, more preferably from 2 to 6, and further preferably from 4 to 6. Two integers represented by m1 in one formula are preferably the same integers.

Preferred embodiments of the components of the composition of the invention have been described above. Examples of combinations of the preferred embodiments include the aforementioned items (2) to (6).

The composition of the invention has a nematic phase at room temperature, and is aligned homeotropically on a plastic substrate, a supporting substrate having a plastic thin film coated on a surface thereof, or a glass substrate. The composition of the invention has a high tendency of a homeotropic alignment on a supporting substrate having polar groups, such as $-COOH$, $-NH_2$ and $-OH$, on a surface thereof, and there is no necessity of a special alignment film for a homeotropic alignment.

The compounds used in the composition of the invention will be described. In the following description, the compounds (1-1) and (1-2) may be referred to as a compound (1) as a generic name in some cases. Compounds (3) to (5) are also generic names in the similar manner.

The compound (1) has a liquid crystal skeleton and two polymerizable groups. A polymer of the polymerizable compound can have a three-dimensional structure, and thus a hard polymer is provided as compared to a compound having one polymerizable group. The compound is liable to undergo a homogeneous alignment while it depends on such conditions as the supporting substrate and the additives. The compound exhibits a liquid crystal phase within a wide temperature range.

The compound (2) has one polymerizable group. The compound has such a property that tilt angles of other liquid crystal compounds are increased, and melting points thereof are decreased.

The compound (3) is not a liquid crystal compound. The compound has a bisphenol fluorene structure. The compound has such a property that liquid crystal molecules undergo a homeotropic alignment.

The compounds (4-1A), (4-1B) and (4-2) are not liquid crystal compounds. These compounds have two or three polymerizable groups and has such an effect that the adhesion property to a supporting substrate is improved. The compounds (4-3) to (4-5) have one polymerizable group. The compounds (4-3) to (4-5) have such a property that tilt angles of other liquid crystal compounds are increased, and melting points thereof are decreased, as similar to the compound (2). These compounds also have such a property that the adhesion property to a supporting substrate is improved.

The compound (5) has two polymerizable groups. A polymer of the polymerizable compound can have a three-dimensional structure, and thus a hard polymer is provided as compared to a compound having one polymerizable group. The compound has a bisphenol fluorene structure. The compound has such a property that tilt angles of other liquid crystal compounds are increased, and melting points thereof are decreased.

The composition of the invention may contain an other polymerizable compound that is different from the compounds (1) to (5). The composition may contain an additive, such as a surfactant, for forming a thin coated film, and the surfactant may not be necessarily for a purpose of controlling the kind of the alignment. The composition may contain such an additive as a polymerization initiator and a photosensitizer suitable for polymerization. The composition may contain such an additive as an ultraviolet ray absorbent, an antioxidant, a radical scavenger and a light stabilizer for improving the characteristics of the polymer. The composition may contain an organic solvent. The organic solvent is useful for forming a coated film (paint film) having a uniform thickness.

The ratios of the components of the composition of the invention will be described. The ratios of the component (A), the component (B), the component (C), the component (D) and the component (E) are preferably as follows based on the total amount of the components.

The ratios of the components may be the component (A) in a ratio of from 15 to 95% by weight, the component (B) in a ratio of from 3 to 40% by weight, the component (C) in a ratio of from 1 to 20% by weight, the component (D) in a ratio of from 1 to 25% by weight, and the component (E) in a ratio of from 0 to 20% by weight. In other words, the component (E) may not be used, and in the case where the component (E) is used, the lower limit of the ratio thereof is preferably 0.1% by weight.

The ratios of the components are preferably the component (A) in a ratio of from 27 to 91% by weight, the component (B) in a ratio of from 3 to 35% by weight, the component (C) in a ratio of from 3 to 15% by weight, the component (D) in a ratio of from 3 to 23% by weight, and the component (E) in a ratio of from 0 to 15% by weight.

The ratios of the components are more preferably the component (A) in a ratio of from 32 to 89% by weight, the component (B) in a ratio of from 5 to 35% by weight, the component (C) in a ratio of from 3 to 13% by weight, the component (D) in a ratio of from 3 to 20% by weight, and the component (E) in a ratio of from 0 to 13% by weight.

The ratios of the components are further preferably the component (A) in a ratio of from 37 to 84% by weight, the component (B) in a ratio of from 10 to 35% by weight, the component (C) in a ratio of from 3 to 10% by weight, the component (D) in a ratio of from 3 to 18% by weight, and the component (E) in a ratio of from 0 to 10% by weight.

In the case where the other polymerizable compound is used, the addition amount thereof may be from 0.01 to 0.20, and preferably from 0.01 to 0.10, in terms of a weight ratio with respect to the total amount of the component (A), the component (B), the component (C), the component (D) and the component (E). In the case where an additive, such as a surfactant, a polymerization initiator and the like, is used, the using amount thereof may be such a minimum amount that the purpose of the additive is attained.

The compound (1), the compound (2), the compounds (4-3) to (4-5) and the compound (5) can be synthesized by combining properly the known techniques in the field of organic chemistry. Methods for introducing intended end groups, rings, bonding groups and the like to starting materials and methods for forming them in starting materials are disclosed in Organic Syntheses, John Wiley & Sons, Inc.; Organic Reactions, John Wiley & Sons, Inc.; Comprehensive Organic Synthesis, Pergamon Press; New Experimental Chemistry Course (Shin Jikken Kagaku Kouza), Maruzen, Inc., and the like.

A synthesis method of the compound (1-1) is disclosed in JP-A-2003-328491. A synthesis method of the compound (1-2) is disclosed in Makromol. Chem., vol., 190, p. 3201-3215 (1998) and WO 97/00600. As a method for introducing α-fluoroacryloyloxy ($CH_2$=CF—COO—), α-fluoroacrylic acid and α-fluoroacrylic chloride may be used, but a method of reacting α-fluoroacrylic fluoride ($CH_2$=CFCOOF) is useful. A synthesis method of α-fluoroacrylic fluoride is disclosed in J. Org. Chem., vol. 54, p. 5640 (1989), JP-A-60-158137, JP-A-61-85345 and the like, and α-fluoroacrylic fluoride can be synthesized according to these methods. The compounds (1-1) and (1-2) can be synthesized by using the compounds as starting materials. A synthesis method of the compound (2) is disclosed in Macromolecules, vol. 26, p. 6132-6134 (1993) and Makromol. Chem., vol. 183, p. 2311-2321 (1982).

Specific synthesis methods of a part of the compound (1), the compound (2), the compounds (4-3) to (4-5) and the compound (5) are disclosed in the following literatures.

WO93/22397
JP-A-2003-238491
JP-A-2004-231638
GB 2306470B
JP-A-63-64029
JP-A-2004-175728
JP-A-2005-112850
JP-A-2005-35985
JP-A-2007-16213
JP-A-2003-513107
Polymer Bulletin, vol. 25, pp. 439-442 (1991)
Macromol. Chem. Phys., vol. 196, pp. 2941-2945 (1995)
JP-A-2005-320317
JP-A-2006-117564

Synthesis methods of the compound (3) are disclosed in the following literatures.

JP-A-2002-348357
JP-A-2005-41925
JP-A-2005-266739

Examples of commercially available products containing the compound (3) include ONF-1, ONCOAT EX-1010, ONCOAT EX-1020 and ONCOAT EX-1040, produced by Osaka Gas Chemicals Co., Ltd. These commercially available products may be used in the invention. For the compound (4-1A), the compound (4-1B) and the compound (4-2), commercially available products may be used.

Preferred examples of the compound (1-1) are shown below.

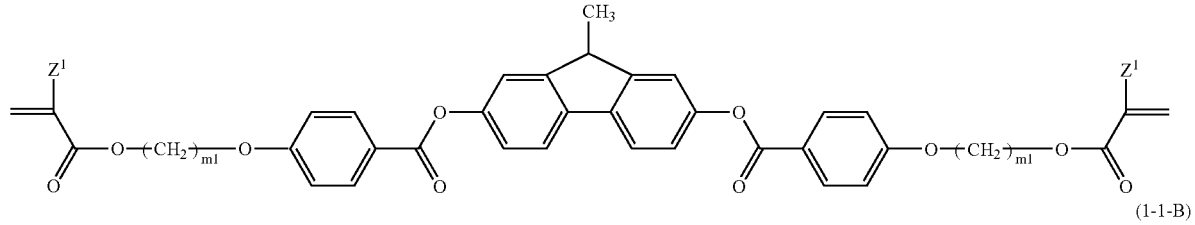
(1-1-A)

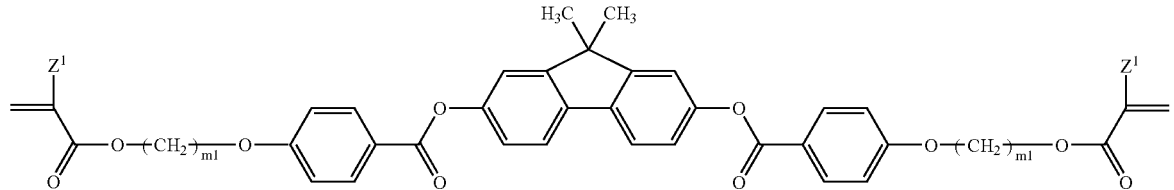
(1-1-B)

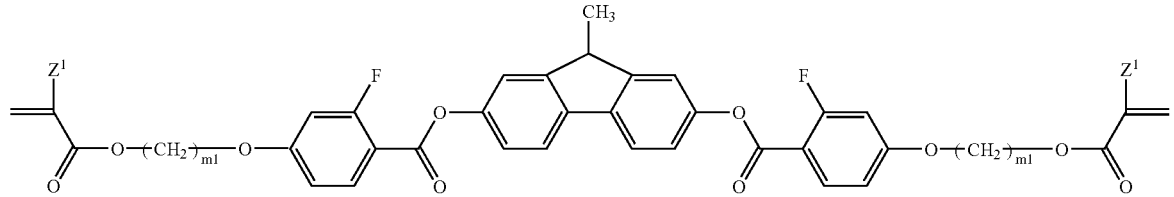
(1-1-C)

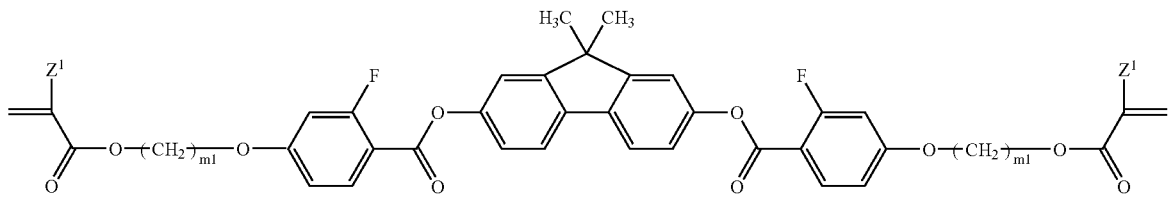
(1-1-D)
The symbols in these formulae have the same meanings as the symbols in formula (1-1).
Preferred examples of the compound (1-2) are shown below.
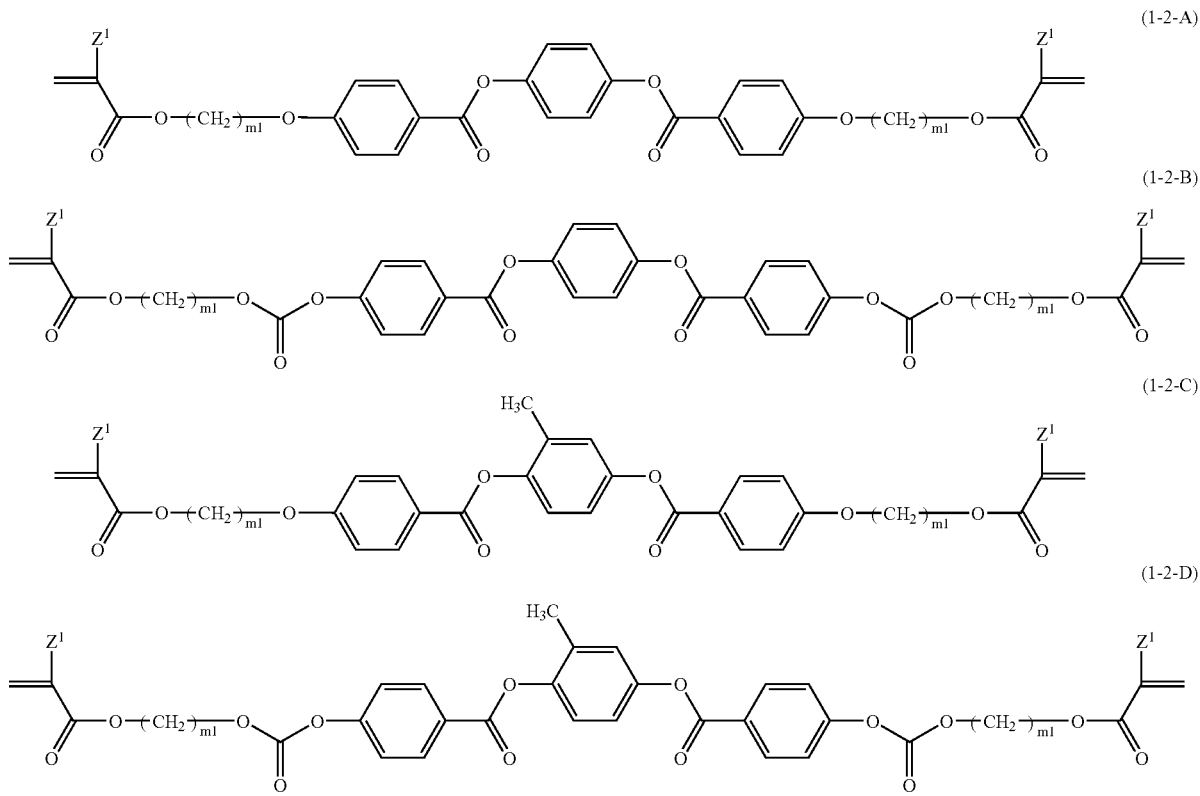
The symbols in these formulae have the same meanings as the symbols in formula (1-2).
Preferred examples of the compound (2) are shown below.
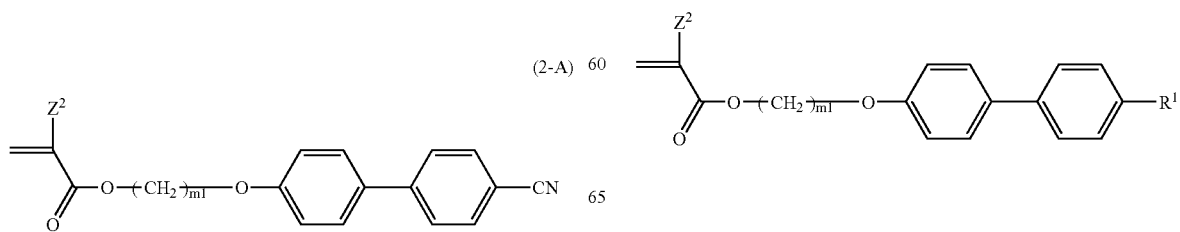

-continued

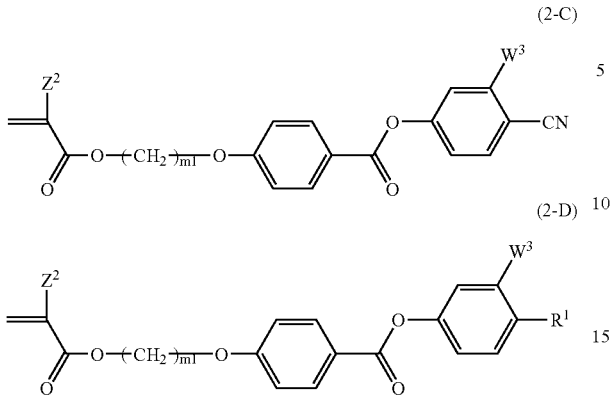

In these formulae, R¹ represents alkyl having from 1 to 10 carbon atoms or alkoxy having from 1 to 10 carbon atoms, and the other symbols have the same meanings as the symbols in formula (2).

Preferred examples of the compounds (3-1) to (3-3) are shown below.

The symbols in these formulae have the same meanings as the symbols in formulae (3-1) to (3-3).

Preferred examples of the compound (4-1A) are shown below.

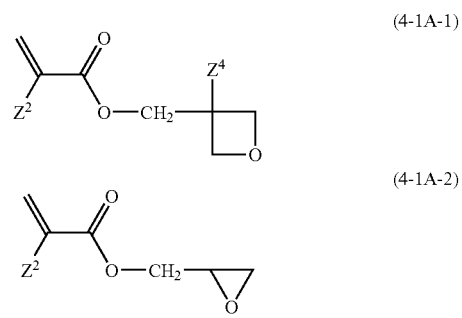

The symbols in these formulae have the same meanings as the symbols in formula (4-1A).

Preferred examples of the compound (4-2) are shown below.

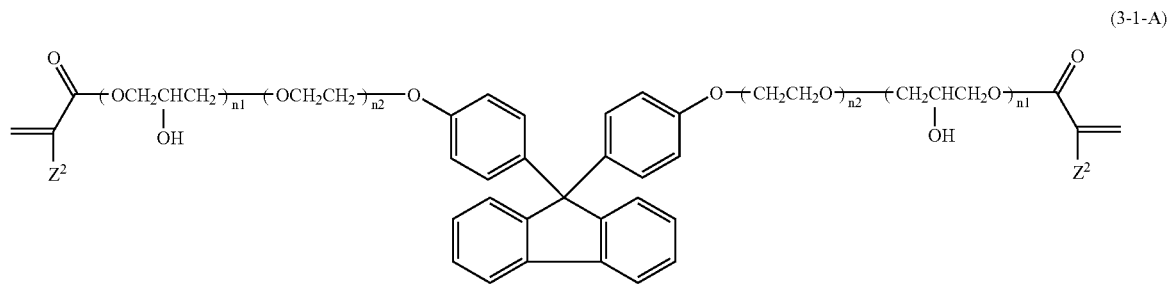

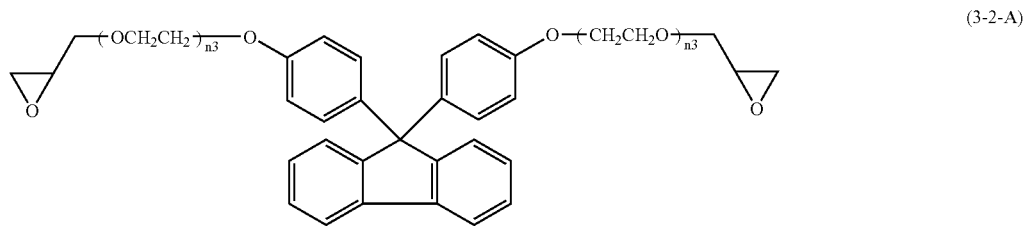

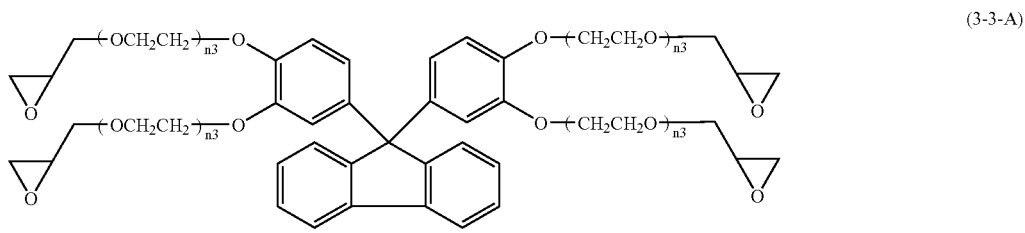

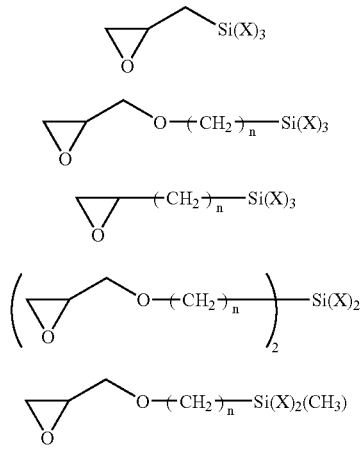
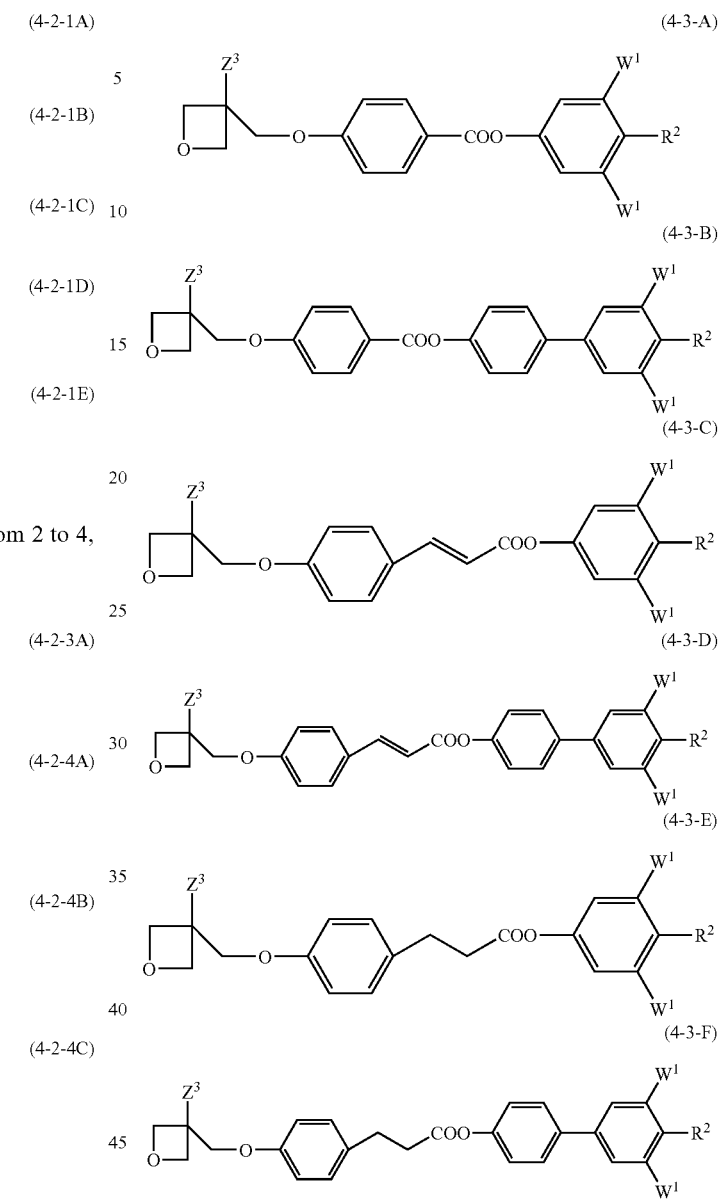
In these formulae, n represents an integer of from 2 to 4, and X represents methoxy or ethoxy.
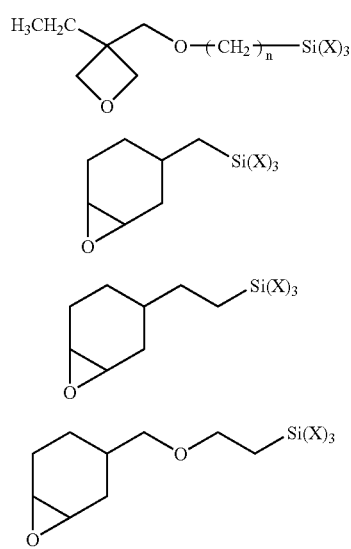
In these formulae, n represents an integer of from 2 to 4, and X represents methoxy or ethoxy.
Preferred examples of the compound (4-3) are shown below.
The symbols in these formulae have the same meanings as the symbols in formula (4-3).
Preferred examples of the compound (4-4) are shown below.
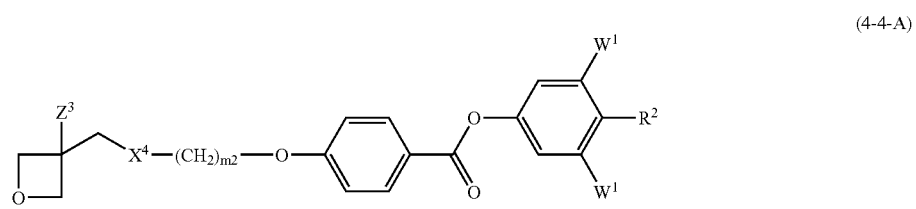

(4-4-B)
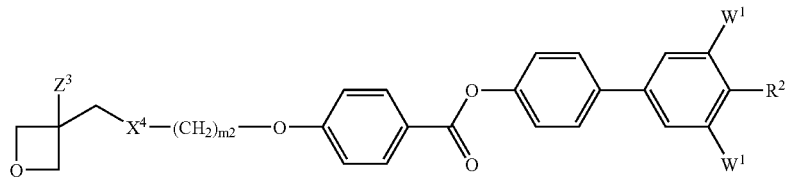
(4-4-C)
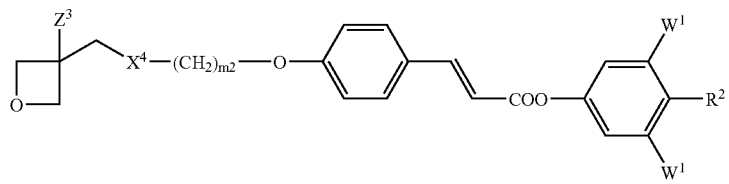
(4-4-D)
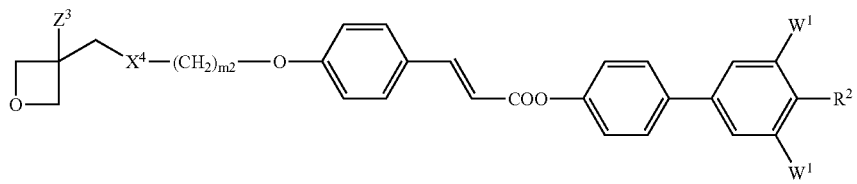
(4-4-E)
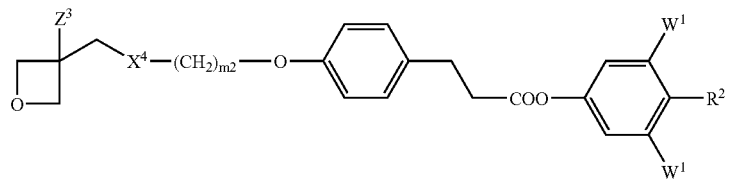
(4-4-F)
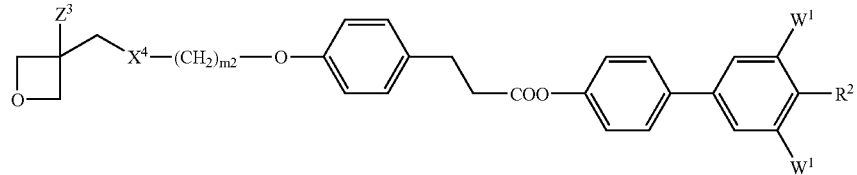
(4-4-G)
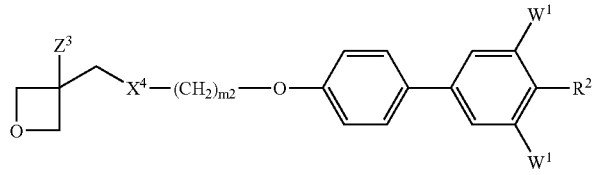
The symbols in these formulae have the same meanings as the symbols in formula (4-4).
Preferred examples of the compound (4-5) are shown below.
(4-5-A)
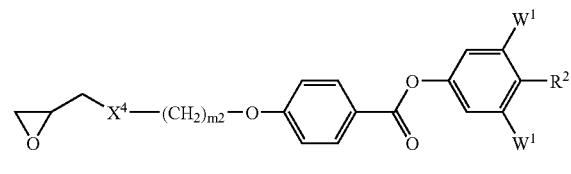
(4-5-B)
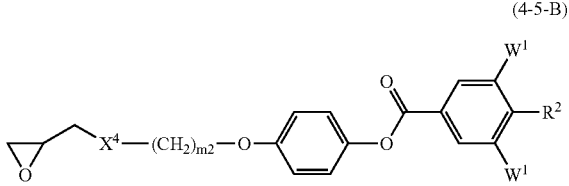

-continued
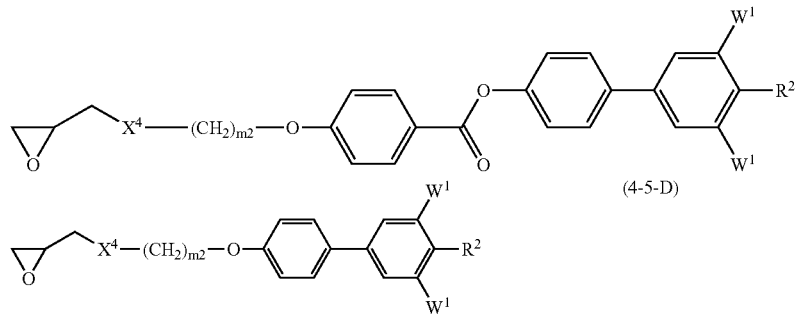
The symbols in these formulae have the same meanings as the symbols in formula (4-5).
Preferred examples of the compound (5-1) and the compound (5-2) are shown below.
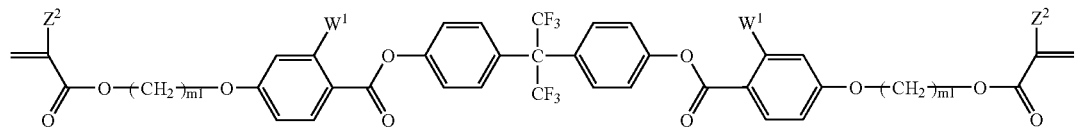
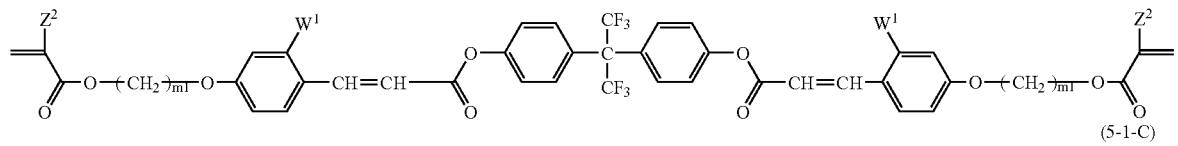
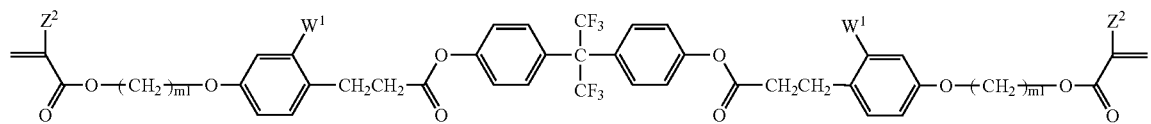
The symbols in these formulae have the same meanings as the symbols in formula (5-1).
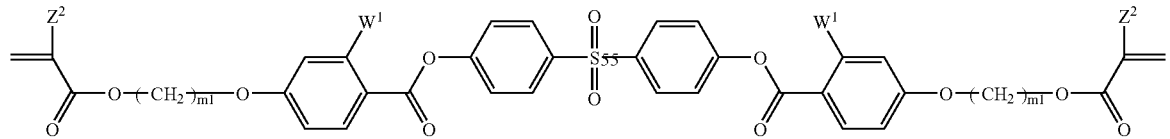
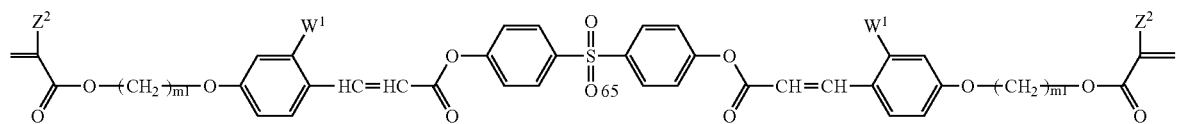

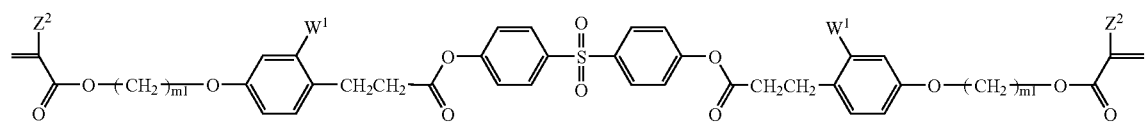
(5-2-C)
The symbols in these formulae have the same meanings as the symbols in formula (5-2).
Specific examples of the compound (1) are shown below.
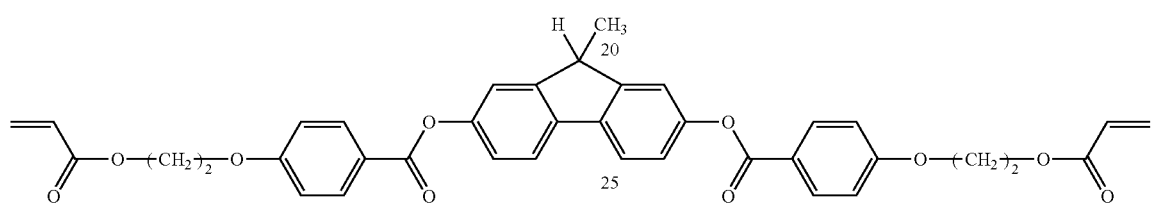
(1-1-1)
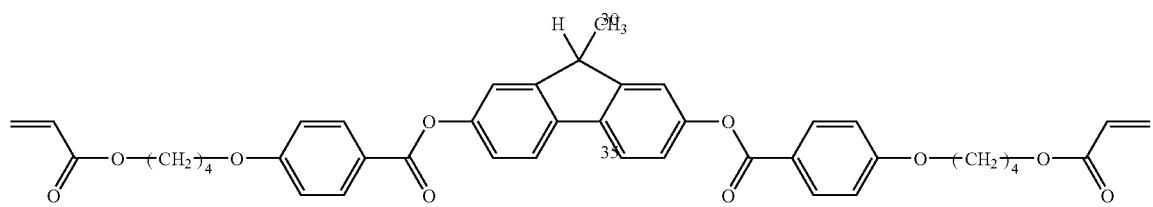
(1-1-2)
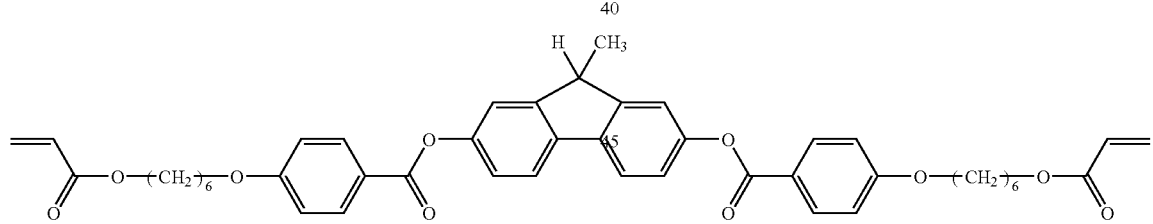
(1-1-3)
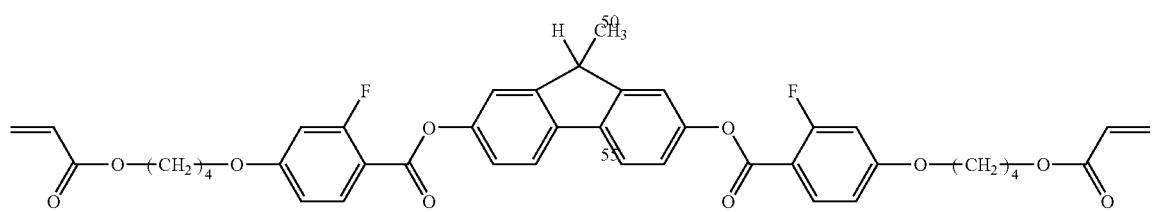
(1-1-4)
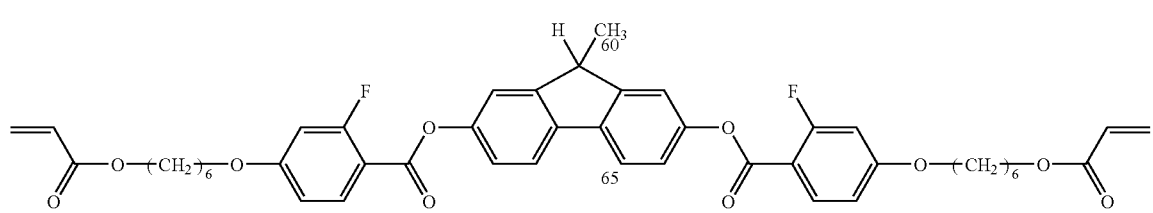
(1-1-5)

-continued
(1-1-6)
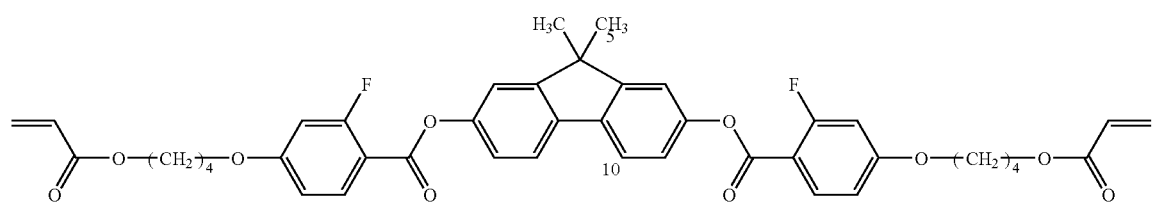
(1-1-7)
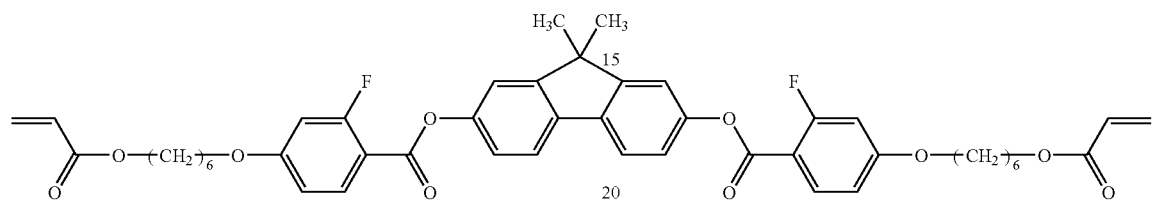
(1-1-8)
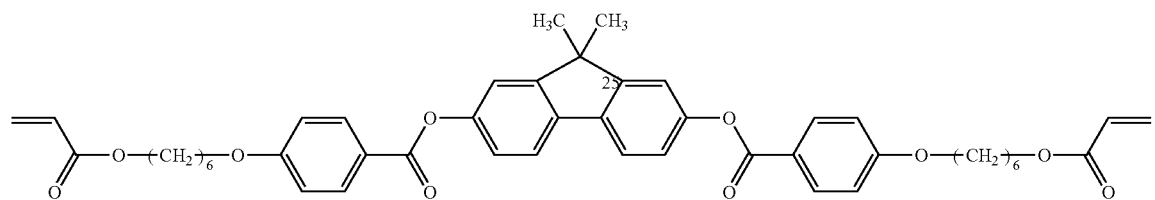
(1-1-9)
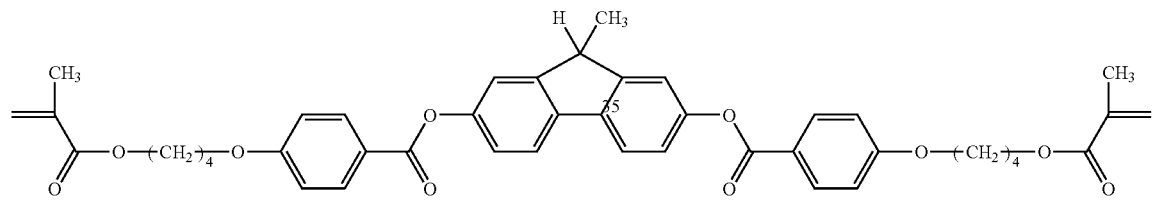
(1-1-10)
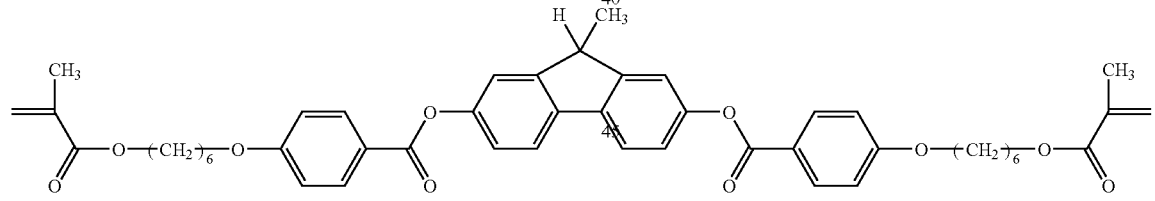
(1-1-11)
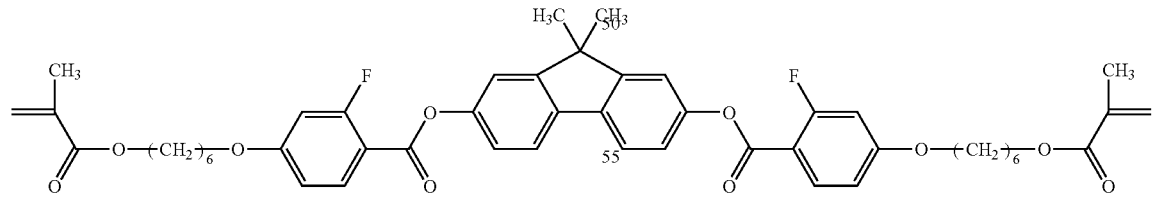
(1-1-12)
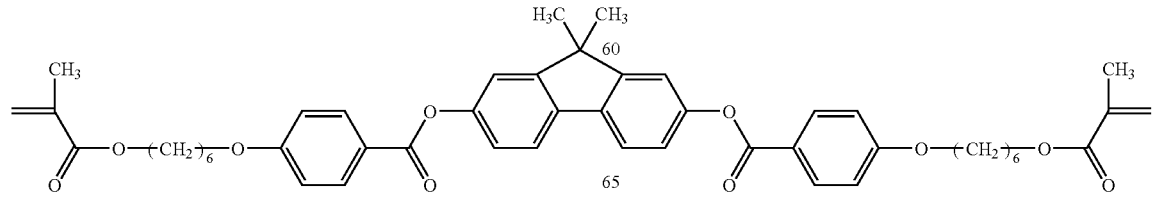

Among these compounds, the compounds (1-1-1) to (1-1-5), the compound (1-1-9) and the compound (1-1-10) can be synthesized according to the method disclosed in JP-A-2003-238491. The compounds (1-1-6) to (1-1-8) and the compounds (1-1-10) to (1-1-12) can be synthesized according to the method disclosed in JP-A-2006-307150.
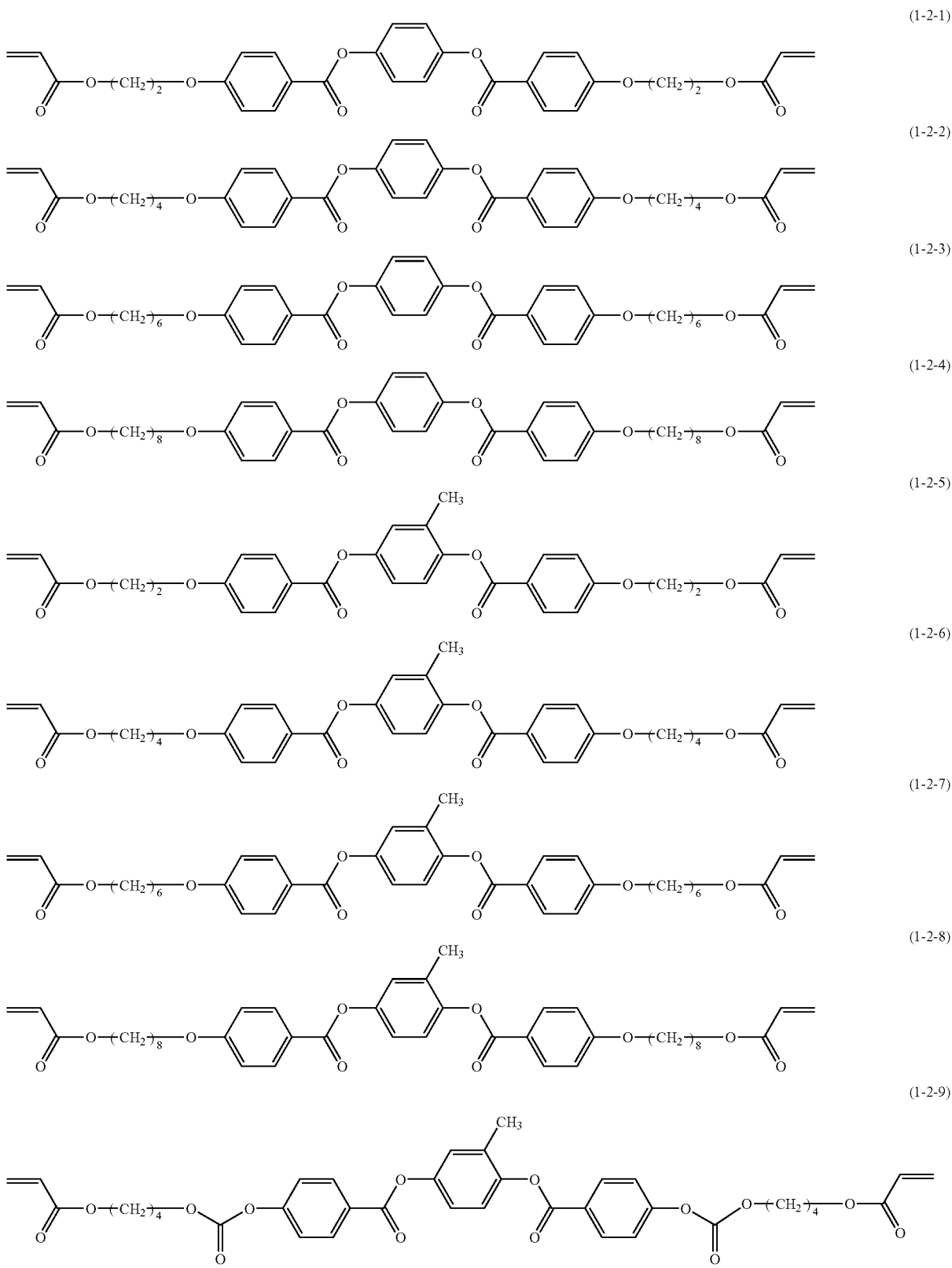

-continued (1-2-10)
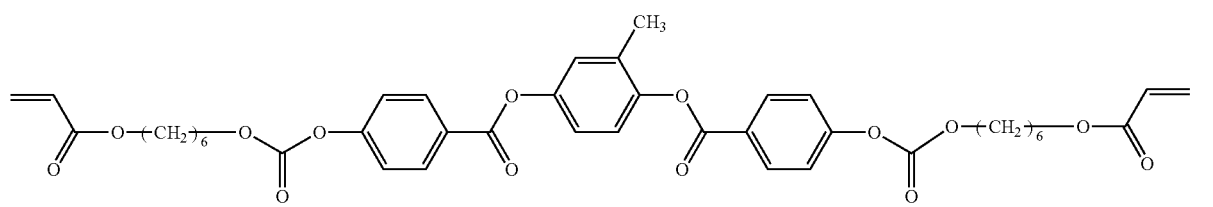

(1-2-11)
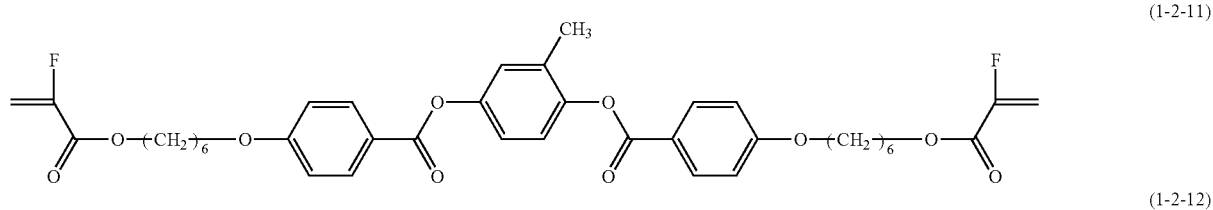

(1-2-12)
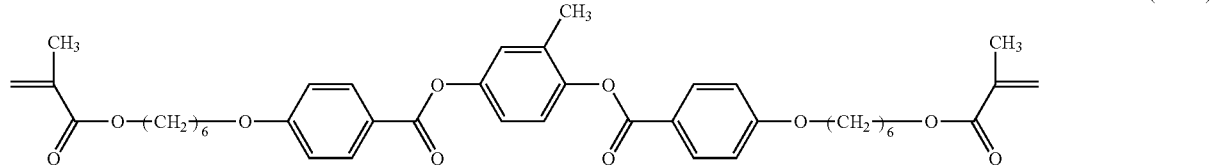

The compound (1-2-1), the compound (1-2-7) and the compound (1-2-12) can be synthesized according to the method disclosed in Makromol. Chem., vol. 190, pp. 3201-3215 (1998). The compound (1-2-9) and the compound (1-2-10) can be synthesized according to the method disclosed in WO97/00600. The compound (1-2-11) can be synthesized according to the method disclosed in JP-A-2005-112850.

Specific examples of the compound (2) are shown below.

(2-1)

(2-2)

(2-3)

(2-4)

(2-5)

-continued (2-6)
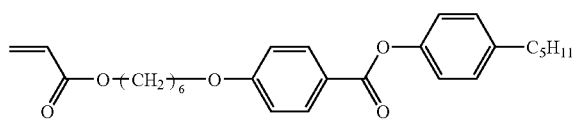

(2-7)

(2-8)

(2-9)
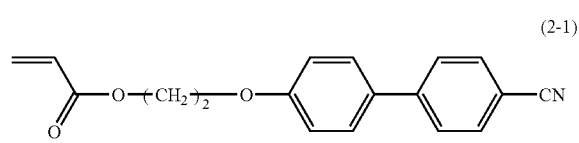

The compounds (2-1) to (2-3) can be synthesized according to the method disclosed in Macromolecules, vol. 26, pp. 6132-6134 (1993). The compounds (2-4) to (2-7) can be synthesized according to the method disclosed in Makromol. Chem., vol. 183, pp. 2311-2321 (1982). The compound (2-8) and the compound (2-9) can be synthesized according to the method disclosed in Makromol. Chem., vol. 179, pp. 273-276 (1978).

Specific examples of the compounds (3-1) to (3-3) are shown below.

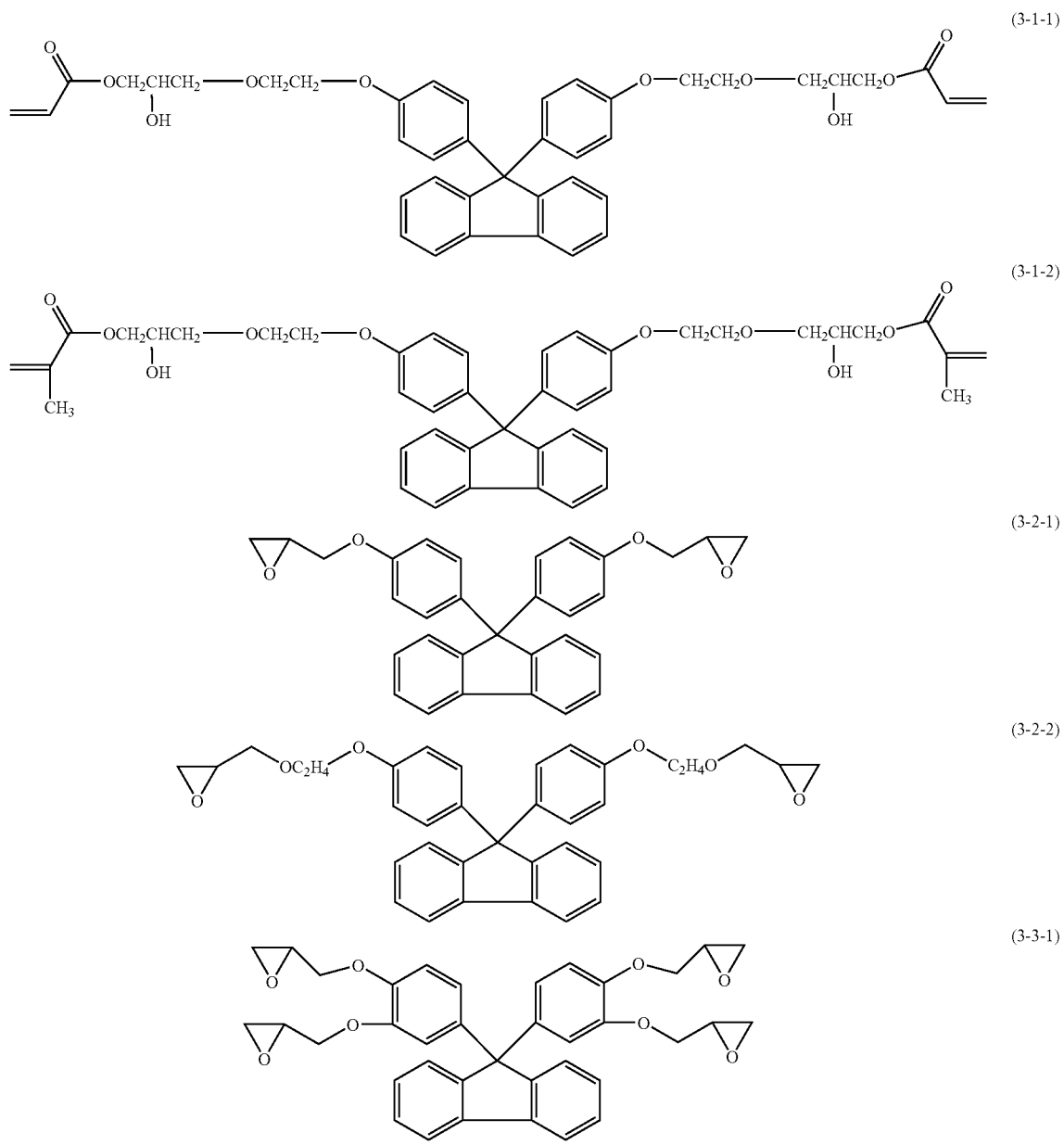

Synthesis methods of these compounds are disclosed in JP-A-2002-348357, JP-A-2005-41925, JP-A-2005-266739 and the like. Examples of commercially available products containing the compound (3-1-1), the compound (3-2-1), the compound (3-2-2) and the compound (3-3-1) include ONF-1, ONCOAT EX-1010, ONCOAT EX-1020 and ONCOAT EX-1040, produced by Osaka Gas Chemicals Co., Ltd. These commercially available products may be used in the invention.

Specific examples of the compound (4-1A) are shown below.

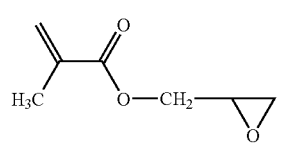

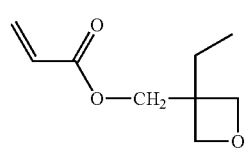

(4-1A-2-2)

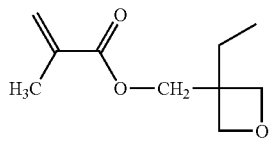

Examples of commercially available products containing the compound (4-1A-1) include Blemmer G, produced by NOF Corp. Examples of commercially available products containing the compounds (4-1A-2-1) and (4-1A-2-2) include OXE-10 and OXE-30, produced by Osaka Organic Chemical Industry, Ltd.

Specific examples of the compound (4-1B) are shown below.

(4-1B-1)
(4-1B-2)

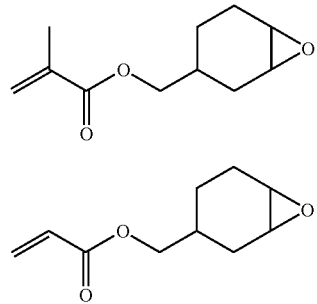

Examples of commercially available products containing the compounds (4-1B-1) and (4-1B-2) include Cyclmer M-100 and Cyclmer A-100, produced by Daicel Chemical Industries, Ltd.

Specific examples of the compound (4-2) are shown below.

(4-2-1)
(4-2-3)
(4-2-4)
(4-2-5)
(4-2-6)
(4-2-7)
(4-2-8)

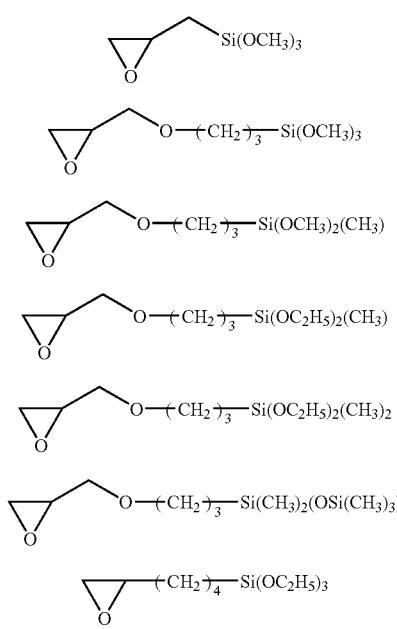

(4-2-9)
(4-2-10)

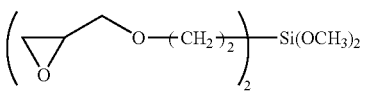
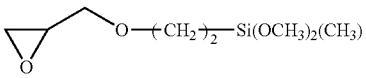

(4-2-11)
(4-2-12)

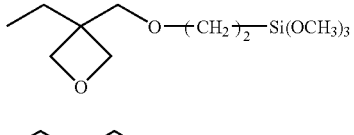

(4-2-13)

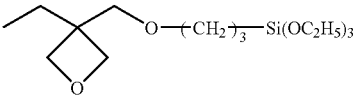

(4-2-14)

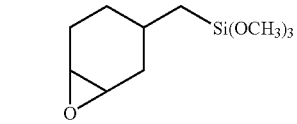

(4-2-15)

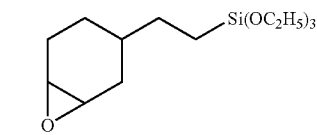

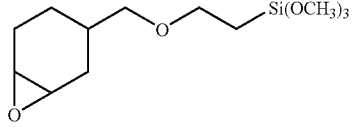

Commercially available products may be used as these compounds.

Specific examples of the compound (4-3) are shown below.

(4-3-1)

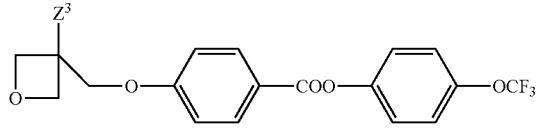

(4-3-2)

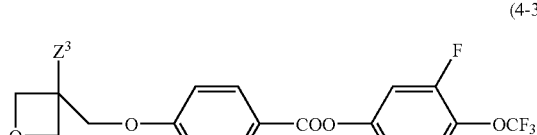

(4-3-3)

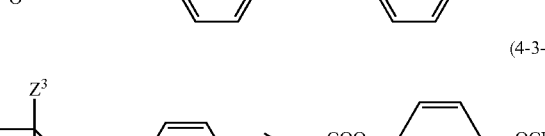

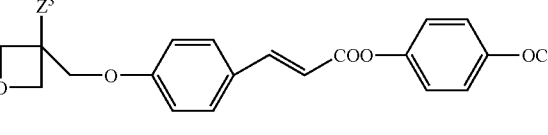

-continued
(4-3-4)
(4-3-5)
(4-3-6)
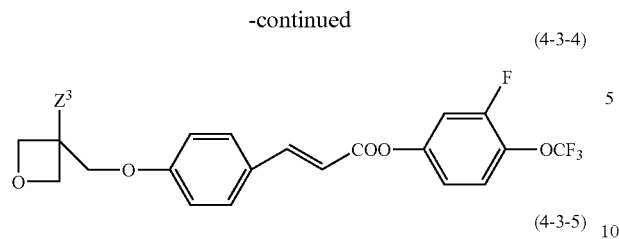
(4-3-7)
In these formulae, $Z^3$ has the same meaning as $Z^3$ in formula (4-3). These compound are disclosed in JP-A-2005-320317.
Specific examples of the compound (4-4) are shown below.
(4-4-1)
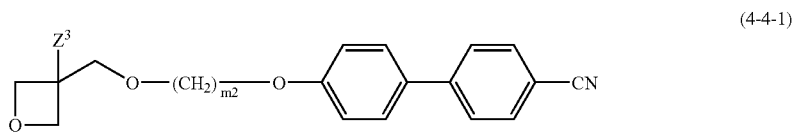
(4-4-2)
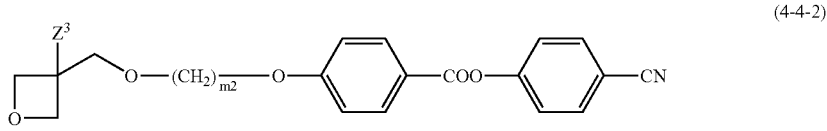
(4-4-3)
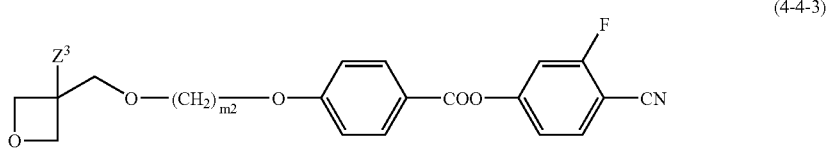
(4-4-4)
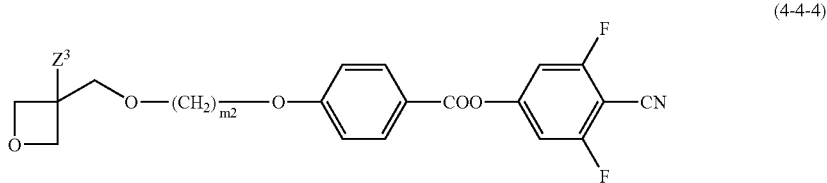
(4-4-5)
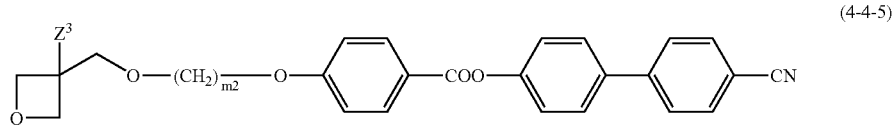
(4-4-6)
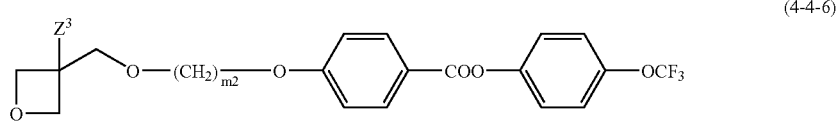
(4-4-7)
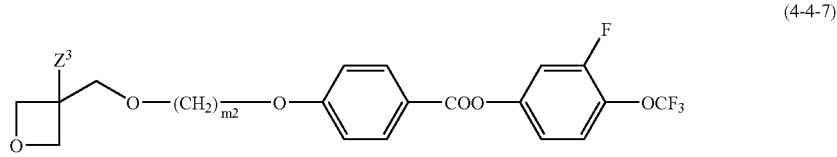

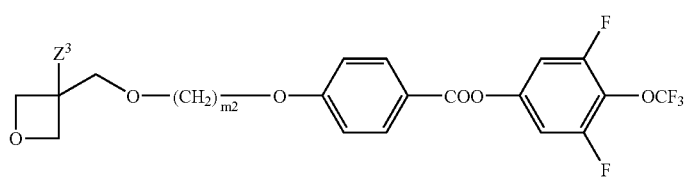

In these formulae, m2 represents an integer of from 4 to 6, and $Z^3$ has the same meaning as $Z^3$ in formula (4-4). These compounds are disclosed in JP-A-2003-513107, JP-A-2005-320317 and Polymer Bulletin, vol. 25, pp. 439-442 (1991).

Specific examples of the compound (4-5) are shown below.

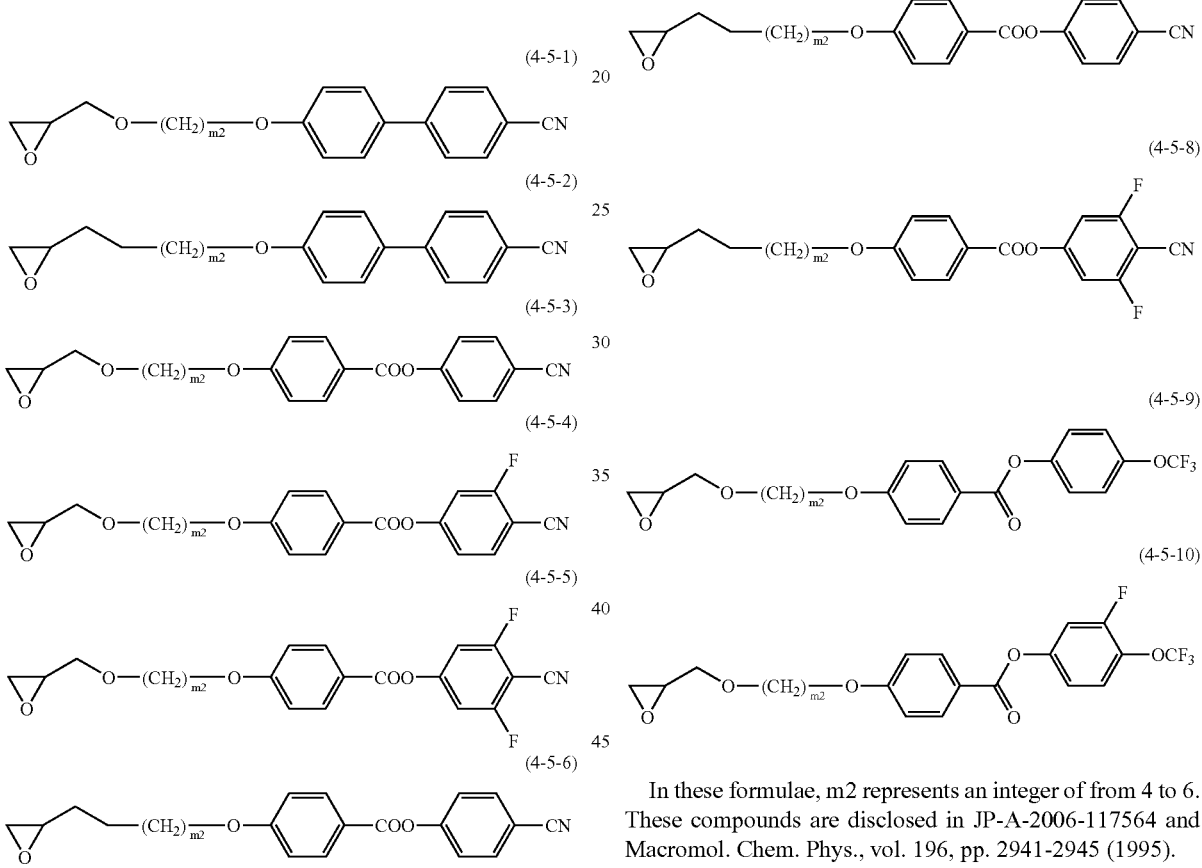

In these formulae, m2 represents an integer of from 4 to 6. These compounds are disclosed in JP-A-2006-117564 and Macromol. Chem. Phys., vol. 196, pp. 2941-2945 (1995).

Specific examples of the compound (5-1) are shown below.

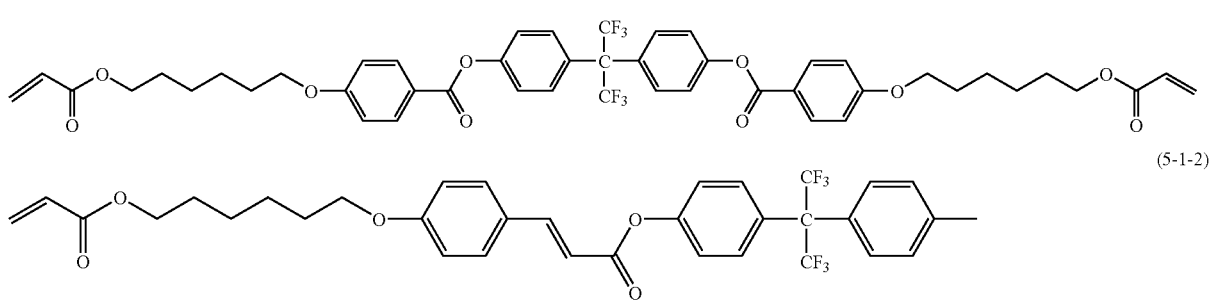

-continued
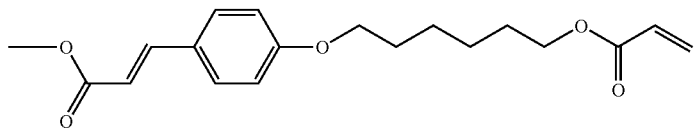
(5-1-3)
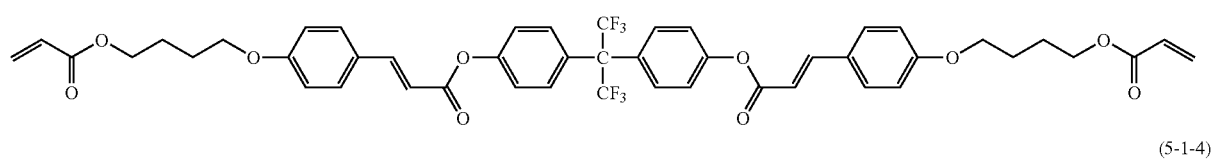
(5-1-4)
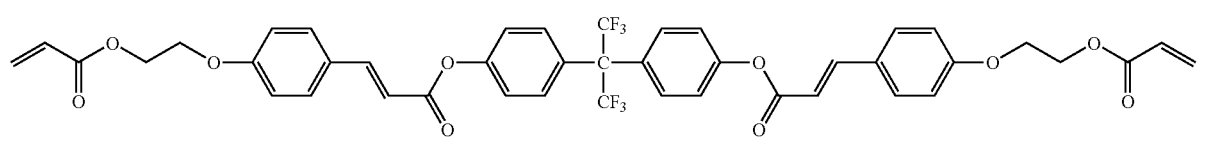
(5-1-5)
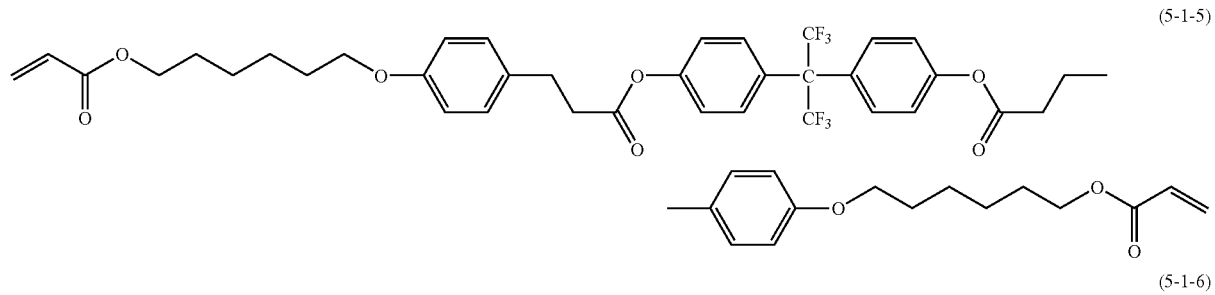
(5-1-6)
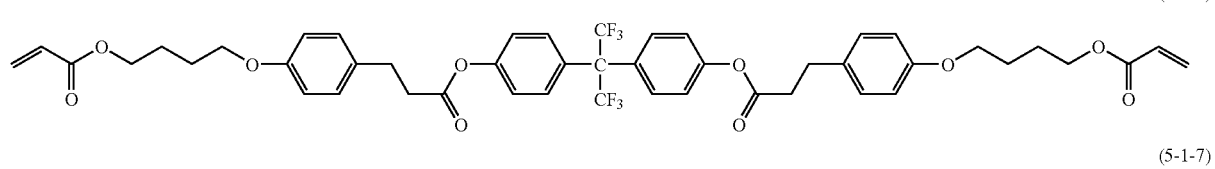
(5-1-7)
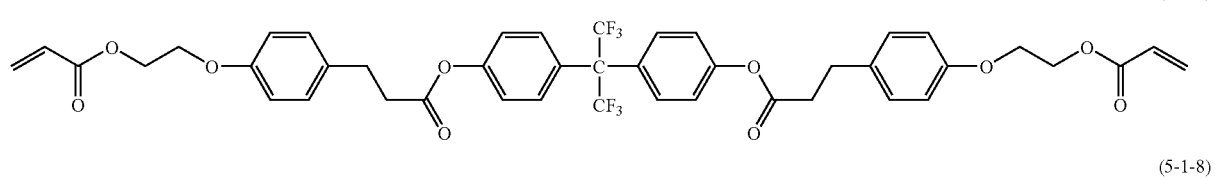
(5-1-8)
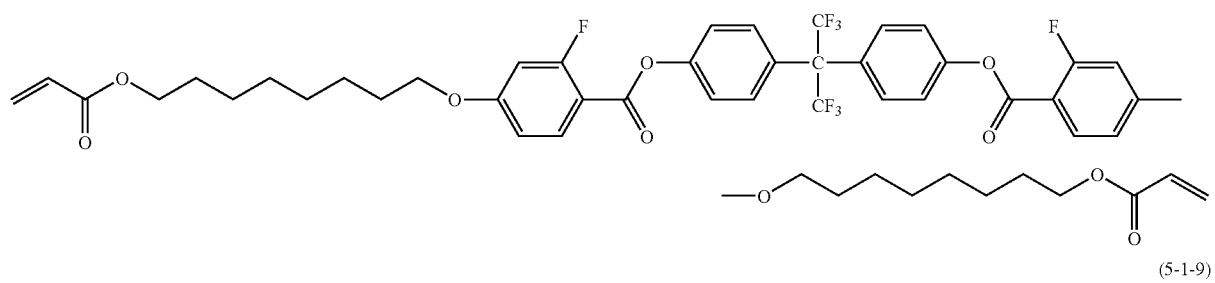
(5-1-9)
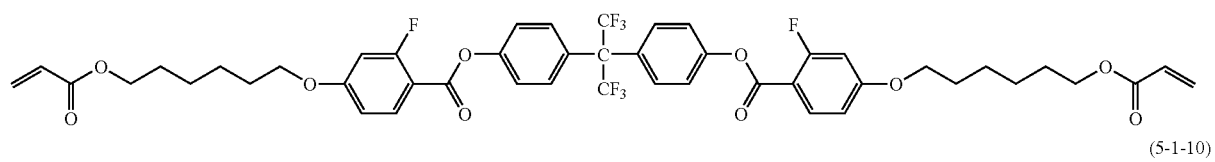
(5-1-10)
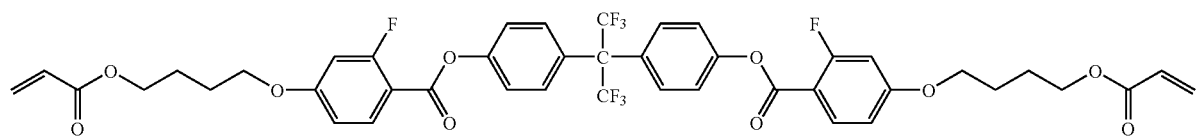

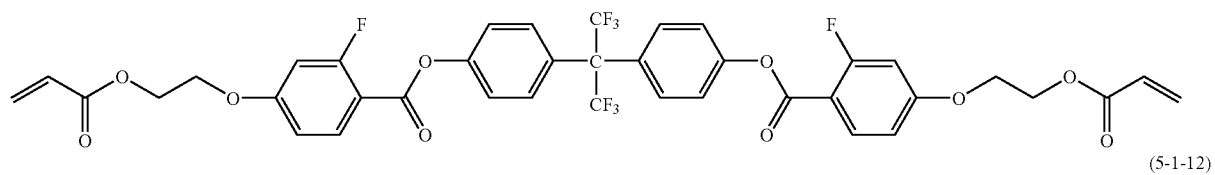
(5-1-11)
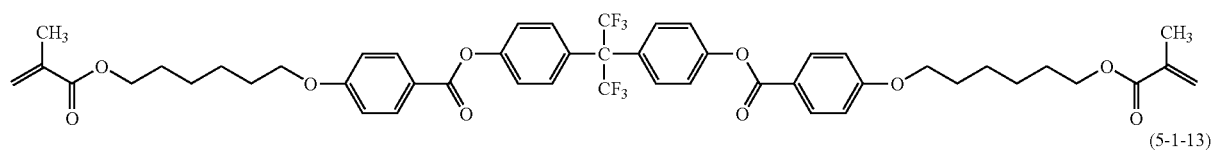
(5-1-12)
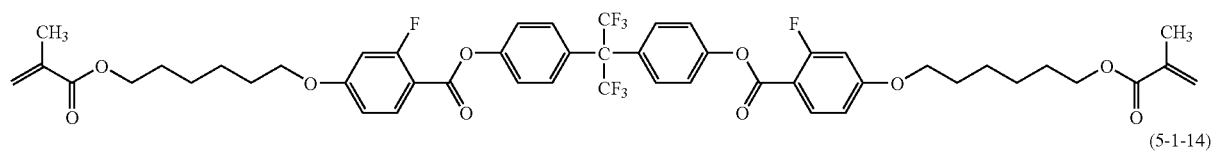
(5-1-13)
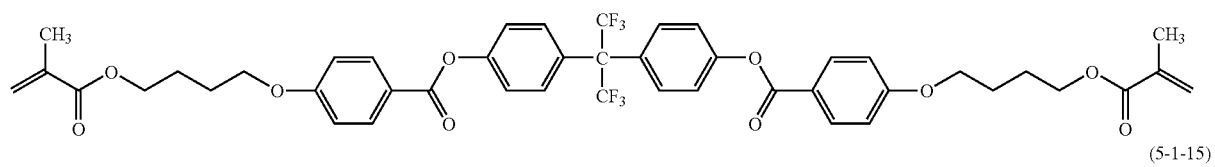
(5-1-14)
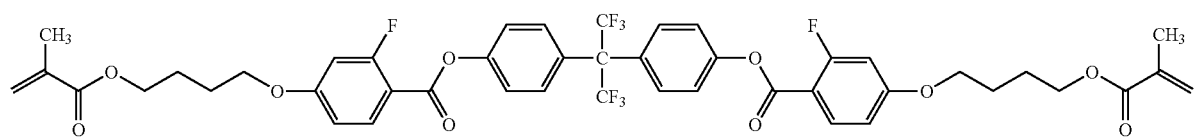
(5-1-15)
Specific examples of the compound (5-2) are shown below.
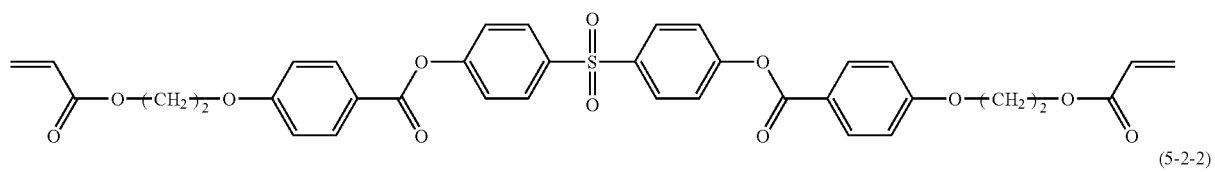
(5-2-1)
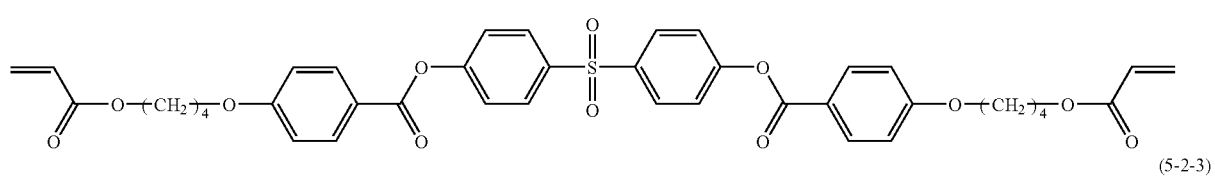
(5-2-2)
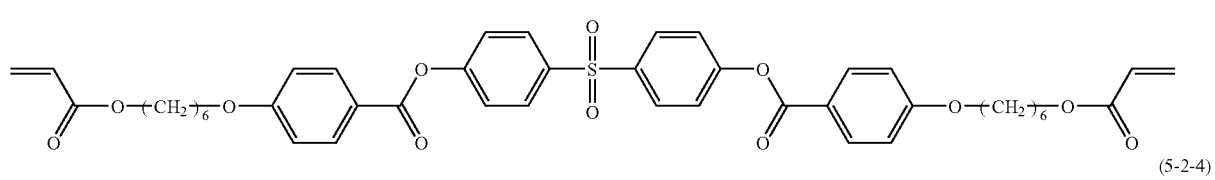
(5-2-3)
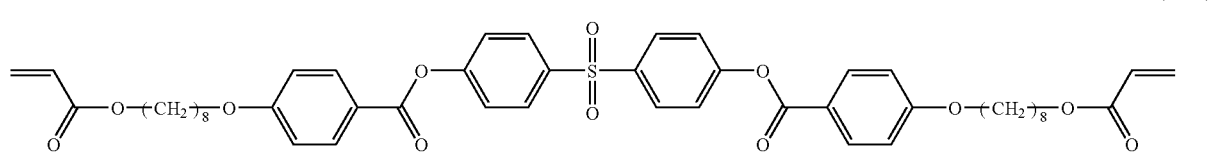
(5-2-4)

-continued
(5-2-5)
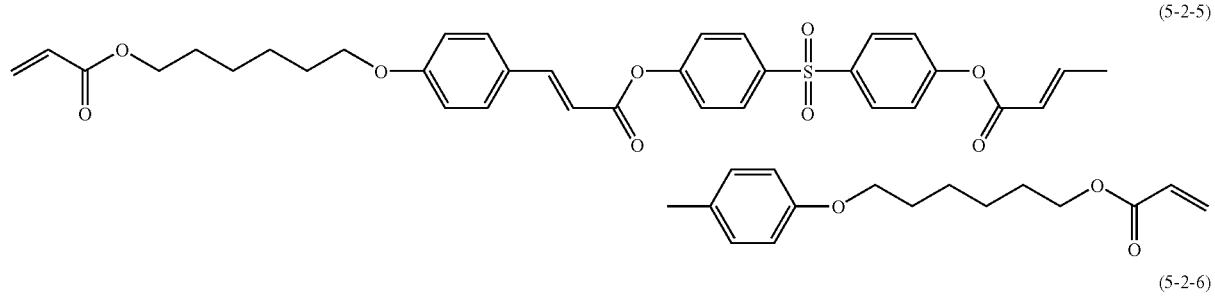
(5-2-6)
(5-2-7)
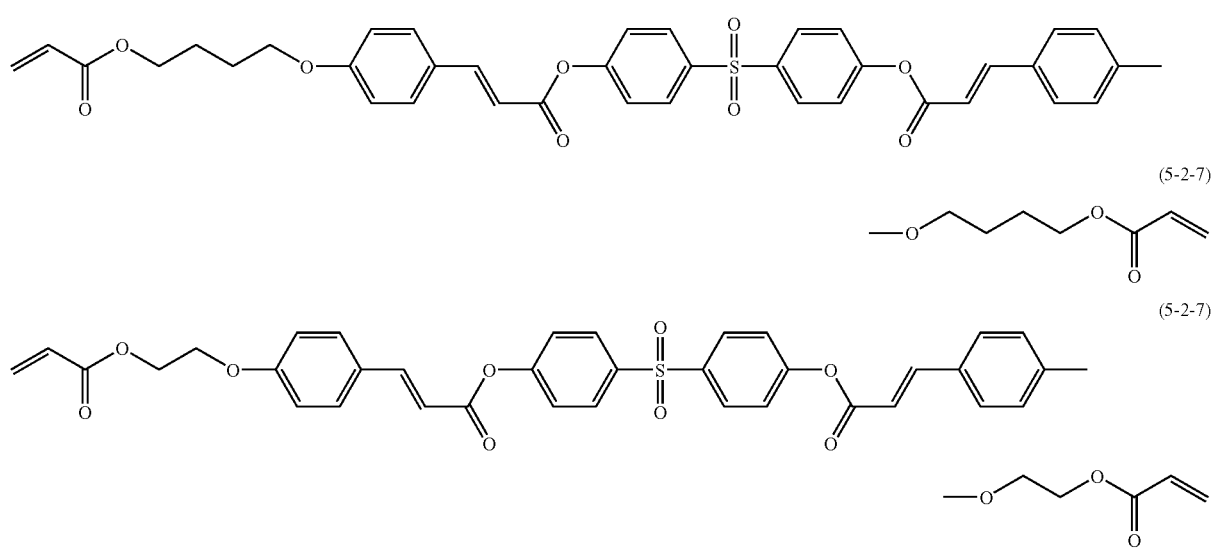
(5-2-7)
(5-2-8)
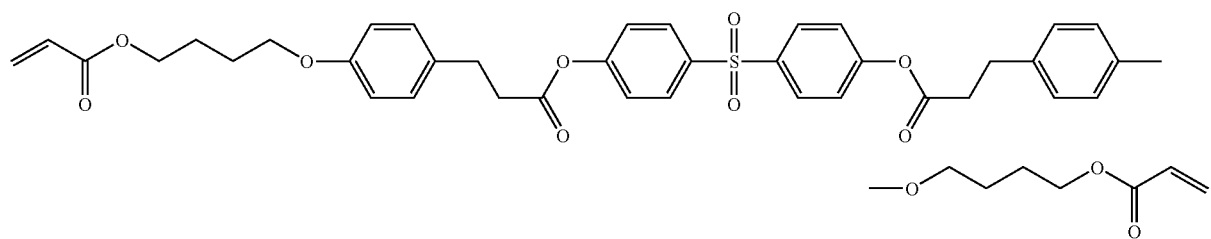
(5-2-9)
(5-2-10)
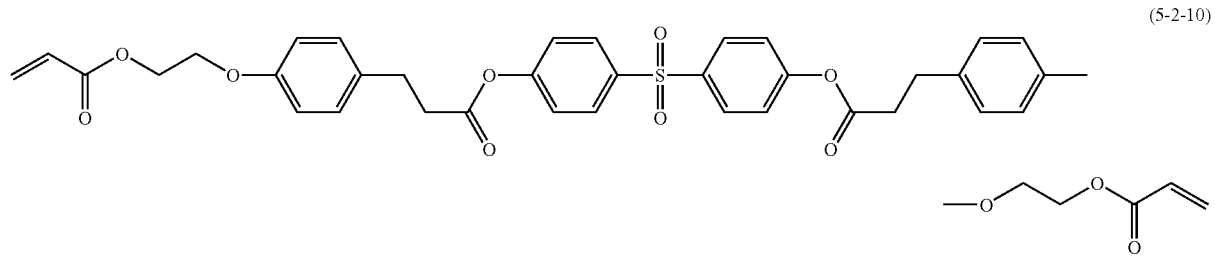

-continued
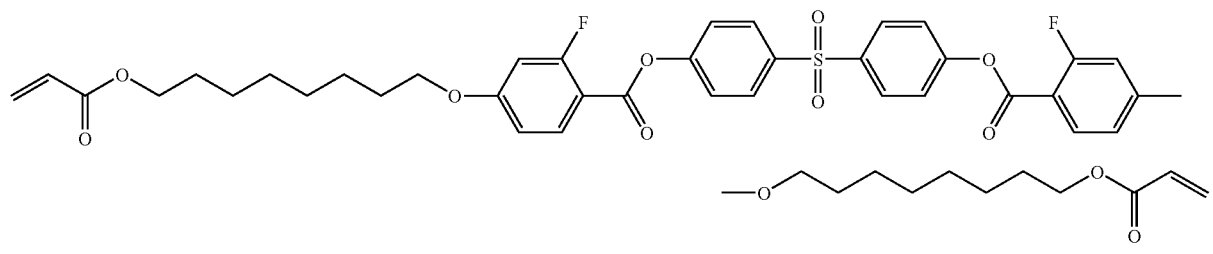
(5-2-11)
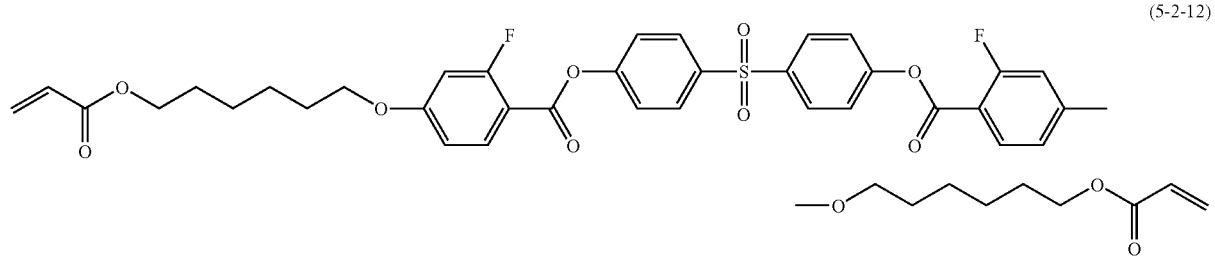
(5-2-12)
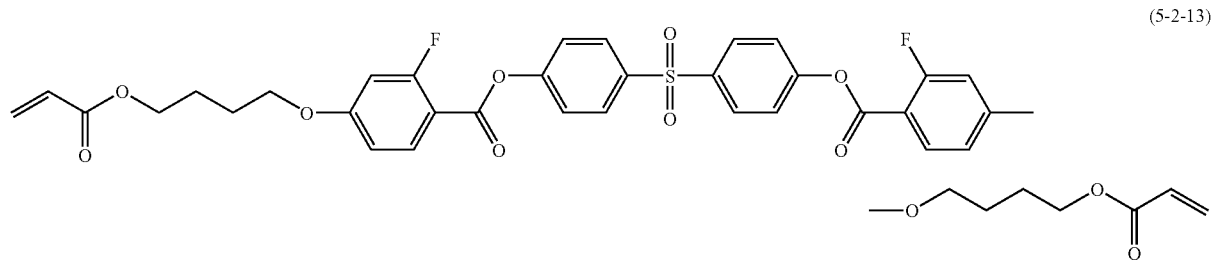
(5-2-13)
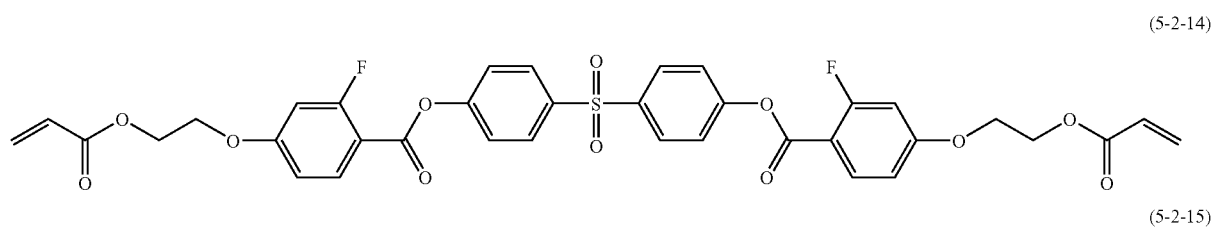
(5-2-14)
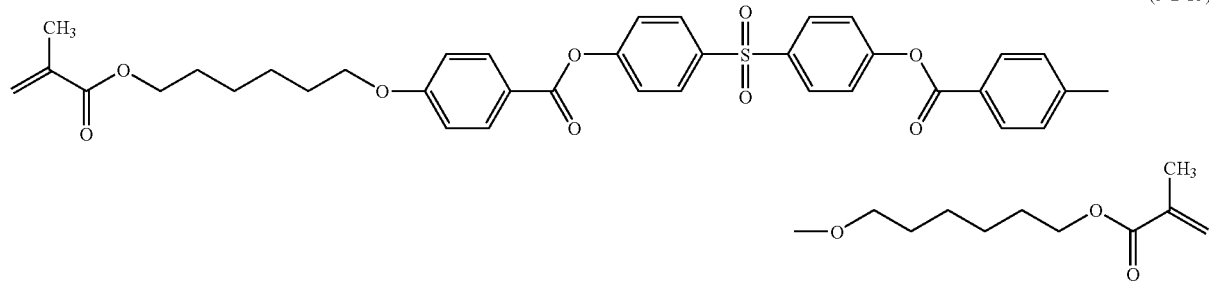
(5-2-15)
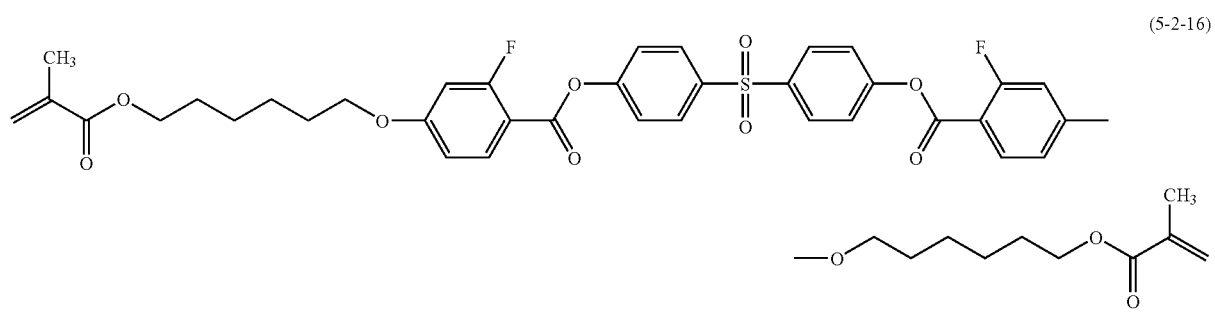
(5-2-16)

The compounds (5-1-1) to (5-1-15) and the compounds (5-2-1) to (5-2-16) can be synthesized according to JP-A-2007-16213.

Examples of the other polymerizable compound, the additive and the organic solvent are shown below. These compounds may be commercially available products. Examples of the other polymerizable compound include an acrylate compound having one polymerizable group, an acrylate compound having two or more polymerizable groups, an epoxy acrylate compound having two or more polymerizable groups, an epoxy compound having one polymerizable group and an epoxy compound having two or more polymerizable groups.

Examples of the compound having one polymerizable group include styrene, nuclear substituted styrene, acrylonitrile, vinyl chloride, vinylidene chloride, vinylpyridine, N-vinylpyrrolidone, vinylsulfonic acid, a vinyl fatty acid ester (such as vinyl acetate), an α,β-ethylenic unsaturated carboxylic acid (such as acrylic acid, methacrylic acid, maleic acid, fumaric acid and itaconic acid), an alkyl ester of (meth) acrylic acid (number of carbon atoms of alkyl: 1 to 18), a hydroxyalkyl ester of (meth)acrylic acid (number of carbon atoms of hydroxyalkyl: 1 to 18), an aminoalkyl ester of (meth) acrylic acid (carbon number of aminoalkyl: 1 to 18), an ether oxygen-containing alkyl ester of (meth)acrylic acid (number of carbon atoms of ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butylbenzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoic acid, vinyl propionate, vinyl stearate, vinyl 2-ethyl-2-methylbutanoate, dicyclopentanyloxylethyl (meth)acrylate, isobornyloxyethyl (meth)acrylate, isobornyl (meth)acrylate, adamantyl (meth)acrylate, dimethyladamantyl (meth)acrylate, dicyclopentanyl (meth)acrylate, dicyclopentenyl (meth)acrylate, 2-acryloyloxyethylsuccinic acid, 2-acryloyloxyethylhexahydrophthalic acid, 2-acryloyloxyethylphthalic acid, EO-modified (ethylene oxide-modified) phosphoric acrylate, EO-modified phosphoric methacrylate, EO-modified phosphoric butoxyacrylate, EO-modified phosphoric butoxymethacrylate, EO-modified succinic acrylate, EO-modified succinic methacrylate, a mono(meth)acrylate ester or a di(meth)acrylate ester of polyalkylene glycol, such as polyethylene glycol having a polymerization degree of from 1 to 100, polypropylene glycol having a polymerization degree of from 1 to 100 and a copolymer of ethylene oxide and propylene oxide, and a mono (meth)acrylate ester of polyalkylene glycol, such as polyethylene glycol or polypropylene glycol having a polymerization degree of from 1 to 100 and a copolymer of ethylene oxide and propylene oxide, and having a terminal capped with an alkyl group having from 1 to 6 carbon atoms.

Examples of the compound having two or more polymerizable groups include 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, dimethyloltricyclodecane diacrylate, trimethylolpropane triacrylate, trimethylol EO-added triacrylate, pentaerythritol triacrylate, pentaerythritol tetraacrylate, dipentaerythritol hexaacrylate, dipentaerythritol monohydroxypentaacrylate, alkyl-modified dipentaerythritol pentaacrylate, alkyl-modified dipentaerythritol tetraacrylate, alkyl-modified dipentaerythritol triacrylate, ditrimethylolpropane tetraacrylate, trimethylolpropane triacrylate, EO-modified trimethylolpropane triacrylate, PO-modified trimethylolpropane triacrylate, tris(acryloxyethyl) isocyanurate, EO-modified phosphoric diacrylate, EO-modified phosphoric triacrylate, EO-modified phosphoric dimethacrylate, caprolactone, EO-modified phosphoric dimethacrylate trisacryloxyethyl phosphate, bisphenol A ethylene oxide adduct diacrylate (Biscoat V #700, a trade name, produced by Osaka Organic Chemical Industry Ltd.), bisphenol A glycidyl diacrylate (Biscoat V #802, produced by Osaka Organic Chemical Industry Ltd.), Biscoat V #1000 (produced by Osaka Organic Chemical Industry Ltd.), polyethylene glycol diacrylate, and methacrylate compounds of these compounds. These compounds are suitable for improving the mechanical strength of the polymer.

An epoxy acrylate resin may be used. Specific examples thereof include a phenol novolac epoxy acrylate resin, a cresol novolac epoxy acrylate resin, a phenol novolac acid-modified epoxy acrylate resin, a cresol novolac acid-modified epoxy acrylate resin and a trisphenolmethane acid-modified epoxy acrylate resin.

Various kinds of epoxy resins may be used in combination. Examples thereof include an epoxy resin derived from a divalent phenol compound, such as a bisphenol A type epoxy resin, a bisphenol F type epoxy resin, a bisphenol S type epoxy resin, a bisphenol AD type epoxy resin, a resorcin type epoxy resin, a hydroquinone type epoxy resin, a catechol type epoxy resin, a dihydroxynaphthalene type epoxy resin, a biphenyl type epoxy resin and a tetramethylbiphenyl type epoxy resin, an epoxy resin derived from a trivalent or higher phenol compound, such as a phenol novolac type epoxy resin, a cresol novolac type epoxy resin, a triphenylmethane type epoxy resin, a tetraphenylethane type epoxy resin, a dicyclopentadiene-phenol-modified type epoxy resin, a phenol aralkyl type epoxy resin, a biphenyl aralkyl type epoxy resin, a naphthol novolac type epoxy resin, a naphthol aralkyl type epoxy resin, a naphthol-phenol cocondensation novolac type epoxy resin, a naphthol-cresol cocondensation novolac type epoxy resin, an aromatic hydrocarbon formaldehyde resin-modified phenol resin type epoxy resin and a biphenyl-modified novolac type epoxy resin, a tetrabromobisphenol A type epoxy resin, a brominated phenol novolac type epoxy resin, a polycarboxylic acid polyglycidyl ester, a polyol polyglycidyl ether, a fatty acid epoxy resin, an alicyclic epoxy resin, a glycidylamine type epoxy resin, a triphenolmethane type epoxy resin and a dihydroxybenzene type epoxy resin, but the epoxy resin is not limited to these examples. The epoxy resins may be used solely or as a mixture of two or more kinds of them.

Specific examples of the epoxy compound include an alkyl monoglycidyl ether having from 2 to 25 carbon atoms (such as butyl glycidyl ether, 2-ethylhexyl glycidyl ether, decyl glycidyl ether and stearyl glycidyl ether), butanediol diglycidyl ether, 1,6-hexanediol diglycidyl ether, neopentyl glycol diglycidyl ether, dodecanediol diglycidyl ether, pentaethyltriol polyglycidyl ether, trimethylolpropane polyglycidyl ether, glycerol polyglycidyl ether, phenyl glycidyl ether, p-sec-butylphenyl glycidyl ether, p-tert-butylphenyl glycidyl ether, resorcin glycidyl ether, allyl glycidyl ether, tetrafluoropropyl glycidyl ether, octafluoropropyl glycidyl ether, dodecafluoropentyl glycidyl ether, styrene oxide, 1,7-octadiene diepoxide, limonene diepoxide, limonene monoxide, α-pinene epoxide, β-pinene epoxide, cyclohexene epoxide, cyclooctene epoxide, vinylcyclohexene oxide, butoxypolyethylene glycol glycidyl ether, polyethylene glycol diglycidyl ether, 3,4-epoxycyclohexenylmethyl-3',4'-epoxycyclohexene carboxylate, 3,4-epoxycyclohexenylethyl-3',4'-epoxycyclohexene carboxylate, 1,2-epoxy-4-vinylcyclohexane, vinylcyclohexene dioxide, allylcyclohexene dioxide, 1-epoxyethyl-3,4-epoxycyclohexane, 3,4-epoxy-4-methylcyclohexyl-2-propylene oxide, bis(3,4-epoxycyclohexyl)ether, bis(3,4-epoxycyclohexylmethyl) adipate, diglycidyl phthalate, diglycidyl terephthalate, diglycidyl hexahydrophthalate, diglycidyl tetrahydrophthalate, tris(2,3-epoxypropyl) isocyanurate, 3-ethyl-3-hydroxymethyloxetane, 3-ethyl-3-(phenoxymethyl)oxetane, di(1-ethyl(3-oxetanyl)) methyl ether and 3-ethyl-3-(2-ethylhexylmethyl)oxetane.

Various compound may be used as the surfactant, examples of which include a silicone compound, a fluorine compound, a polyether compound, an acrylic acid copolymer, a titanate compound, imidazoline, a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, an amine lauryl sulfate compound, an alkyl-substituted aromatic sulfonate salt, an alkyl phosphate salt, an aliphatic or aromatic sulfonic acid formalin condensate, laurylamide propylbetaine, laurylamino betaine acetate, a polyethylene glycol fatty acid ester, polyoxyethylene alkylamine, a perfluoroalkyl sulfonate salt, a perfluoroalkyl carboxylate salt, an oligomer having a perfluoroalkyl group and a hydrophilic group, an oligomer having a perfluoroalkyl group and an oleophilic group, urethane having a perfluoroalkyl group, polyester-modified polydimethylsiloxane having a hydroxyl group, polyester polyether-modified polydimethylsiloxane having a hydroxyl group, polyether-modified polydimethylsiloxane having a hydroxyl group, and polyester-modified polyalkylsiloxane. The surfactant has such an effect as facilitation of coating of the composition on the supporting substrate. A preferred ratio of the surfactant varies depending on the kind of the surfactant and the compositional formulation of the composition, and is from 0.0001 to 0.05, and more preferably from 0.003 to 0.01, in terms weight ratio based on the total amount of the polymerizable compounds.

A known photopolymerization initiator may be used for optimizing the polymerization rate of the polymerizable liquid crystal composition. The addition amount of the photopolymerization initiator is preferably from 0.0001 to 0.2, and more preferably from 0.001 to 0.10, in terms of weight ratio based on the total amount of the polymerizable compounds. Examples of the photopolymerization initiator include 2-hydroxy-2-methyl-1-phenylpropan-1-one (DAROCURE 1173), 1-hydroxycyclohexyl phenyl ketone, 2,2-dimethoxy-1,2-diphenylethan-1-one (IRGACURE 651), 1-hydroxycyclohexyl phenyl ketone (IRGACURE 184), IRGACURE 127, IRGACURE 500 (a mixture of IRGACURE 184 and benzophenone), IRGACURE 2959, IRGACURE 907, IRGACURE 369, IRGACURE 379, IRGACURE 754, IRGACURE 1300, IRGACURE 819, IRGACURE 1700, IRGACURE 1800, IRGACURE 1850, IRGACURE 1870, DAROCURE 4265, DAROCURE MBF, DAROCURE TPO, IRGACURE 784, IRGACURE OXE01, IRGACURE OXE02, p-methoxyphenyl-2,4-bis(trichloromethyl)triazine, 2-(p-butoxystyryl)-5-trichloromethyl-1,3,4-oxadiazole, 9-phenylacridine, 1-(4-isopropylphenyl)-2-hydroxy-2-methylpropan-1-one, benzyldimethylketal, 2-methyl-1-(4-(methylthio)phenyl)-2-morpholinopropane-1-one, and a mixture of 2,4-diethylxanthone and methyl p-dimethylaminobenzoate. DAROCURE and IRGACURE are trade names of commercial products available from Ciba Specialty Chemicals Co., Ltd. A known sensitizer may be added thereto, examples of which include isopropylthioxanthone, diethylthioxanthone, ethyl-4-dimethylaminobenzoate (DAROCURE EDB) and 2-ethylhexyl-4-dimethylaminobenzoate (DAROCURE EHA).

Examples of the photoradical polymerization initiator also include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-(4-(methylthio)phenyl)-2-morpholinopropane-1-one, a mixture of 2,4-diethylxanthone and methyl p-dimethylaminobenzoate, a mixture of benzophenone and methyltriethanolamine.

A known photopolymerization initiator may be used for optimizing the polymerization rate of the compound having an epoxy group. The addition amount of the photopolymerization initiator is preferably from 0.0001 to 0.1, and more preferably from 0.001 to 0.07, in terms of weight ratio based on the total amount of the polymerizable compounds. Examples of the photopolymerization initiator are shown below. Heating or other operations may be carried out upon irradiation with light within such a temperature range in that the liquid crystal phase is maintained. The polymerizable liquid crystal composition of the invention may contain an ordinary cationic photopolymerization initiator upon use. Examples of the cationic photopolymerization initiator include a diaryliodonium salt (hereinafter, abbreviated as DAS) and a triarylsulfonium salt (hereinafter, abbreviated as TAS).

Examples of the DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium-p-toluenesulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, 4-methoxyphenylphenyliodonium-p-toluenesulfonate, 4-methoxyphenylphenyliodonium diphenyliodonium tetra(pentafluorophenyl)borate, bis(4-t-butylphenyl)iodonium diphenyliodonium tetrafluoroborate, bis(4-t-butylphenyl)iodonium diphenyliodonium hexafluoroarsenate, bis(4-t-butylphenyl)iodonium diphenyliodonium trifluoromethanesulfonate, bis(4-t-butylphenyl)iodonium trifluoroacetate, bis(4-t-butylphenyl)iodonium p-toluenesulfonate and bis(4-t-butylphenyl)iodonium diphenyliodonium tetra(pentafluorophenyl)borate.

The DAS may be improved in sensitivity by adding thereto a photosensitizer, such as thioxanthone, phenothiazine, chlorothioxanthonse, xanthone, anthracene, diphenylanthracene and rubrene.

Examples of the TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium-p-toluenesulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate, 4-methoxyphenyldiphenylsulfonium-p-toluenesulfonate, 4-methoxyphenyldiphenylsulfonium triphenylsulfonium tetra(pentafluorophenyl)borate, 4-phenylthiophenyldiphenylsulfonium tetrafluoroborate, 4-phenylthiophenyldiphenylsulfonium hexafluorophosphonate, 4-phenylthiophenyldiphenylsulfonium hexafluoroarsenate, 4-phenylthiophenyldiphenylsulfonium trifluoromethanesulfonate, 4-phenylthiophenyldiphenylsulfonium-p-toluenesulfonate and 4-phenylthiophenyldiphenylsulfonium tetra(pentafluorophenyl)borate.

The cationic photopolymerization initiator is available as various commercially available products, and specific examples of the trade names thereof include CYRACURE UVI-6990, CYRACURE UVI-6974 and CYRACURE UVI-6992, available from Union Carbide Corp., Adeka Optomer SP-150, SP-152, SP-170 and SP-172, available from Adeka Corp., PHOTOINITIATOR 2074, available from Rhodia, Inc., IRGACURE 250, available from Ciba Specialty Chemicals Co., Ltd., UV-9380C, available from GE Silicones, CPI Series, available from SAN-APRO Ltd., and TPS Series, TAZ Series, DPI Series, BPI Series, MDS Series, DTS Series, SI Series, PI Series, NDI Series, PAI Series, NAI Series, NI Series, DAM Series, MBZ Series, PYR Series, DNB Series and NB Series, available from Midori Kagaku Co., Ltd.

A thermal polymerization initiator may be used in combination. Specific examples of the trade name thereof include San-Aid (base agent) SI-60, SI-80, SI-100, SI-110, SI-145, SI-150, SI-160 and SI-180 and San-Aid (auxiliary agent) SI, available from Sanshin Chemical Industry, Co., Ltd. The thermal polymerization initiator may be used in combination with the photoradical polymerization initiator and the cationic photoradical polymerization initiator or used in combination with the photoradical polymerization initiator.

A polymerization inhibitor may be added to the polymerizable liquid crystal composition for preventing initiation of polymerization upon storing. A known polymerization inhibitor may be used, and preferred examples thereof include 2,5-di(t-butyl)hydroxytoluene (BHT), hydroquinone, Methylene Blue, diphenylpicric acid hydrazide (DPPH), benzothiadine, 4-nitrosodimethylaniline (NIDI) and o-hydroxybenzophenone.

An oxygen inhibitor may be added to the polymerizable liquid crystal composition for improving the storage stability thereof. A radical formed in the composition reacts with oxygen in the atmosphere to provide a peroxide radical, which accelerate unfavorable reaction with the polymerizable compound. In order to prevent the phenomenon, an oxygen inhibitor is preferably added. Examples of the oxygen inhibitor include a phosphate ester compound.

In order to improve the weather resistance of the polymerizable liquid crystal composition, an ultraviolet ray absorbent, a light stabilizer (radical scavenger) and an antioxidant may be added. Examples of commercially available products of the ultraviolet ray absorbent and the light stabilizer include TINUVIN Series, available from Ciba Specialty Chemicals Co., Ltd., and ADK STAB Series, available from ADEKA Corp. Examples of the antioxidant include ADK STAB AO Series, available from ADEKA Corp., Sumilizer Series, available from Sumitomo Chemical Co., Ltd., and Irganox Series, available from Ciba Specialty Chemicals Co., Ltd.

An organic silicon compound may further be added to the polymerizable liquid crystal composition for controlling adhesion to the substrate. Specific examples of the organic silicon compound include 3-acryloxypropyltrimethoxysilane, 3-(N-allylamino)propyltrimethoxysilane, bis(2-hydroxyethyl)-3-aminopropyltriethoxysilane, 1,3-vinyltetramethylsilazane, 3-mercaptopropyltrimethoxysilane, methacryloxypropyltrimethoxysilane, vinyltrialkoxysilane, 3-aminopropyltrialkoxysilane, N-(2-aminoethyl)-3-aminopropyltrialkoxysilane, 3-chlorotrialkoxysilane, 3-thiocyanatepropyltriethoxysilane and 2-(carboxymethylthio)ethyltrimethylsilane. Compounds obtained by replacing one methyl group among the three alkoxy groups of these compounds, i.e., dialkoxymethylsilane compounds, may also be used.

A crosslinking agent may further be added to the polymerizable liquid crystal composition for improving the crosslinking density upon curing. The crosslinking agent may be an alkylol compound and an alkoxy compound that undergo electrophilic substitution reaction to an aromatic ring. Specific examples of the alkylol compound include a polyfunctional alkanol aromatic compound, such as 1,2-benzenedimethanol, 1,3-benzendimethanol, 1,4-benzenedimethanol and 1,3,5-benzenetrimethanol, a polyfunctional alkanol urea compound, such as dimethylol urea, dimethylolethylene urea and dimethylolpropylene urea, a polyfunctional alkylalkanol compound, such as trimethylolpropane and trimethylolpropane monoallyl ether, a polyfunctional alkanol melamine compound, such as trimethylolmelamine, triethylolmelamine, hexamethylolmelamine and hexaethylolmelamine, and an alkanol benzoguanamine compound, such as dimethylolbenzoguanamine, trimethylolbenzoguanamine and tetramethylolbenzoguanamine. Specific examples of the alkoxy compound include 1,4-dimethoxymethylbenzene, 1,3,5-trimethoxymethylbenzene, 1,3,5-triazine-2,4,6-tri(dimethoxymethylamine), 1,3,5-triazine-2-methoxymethylamine-4,6-di(dimethoxymethylamine), 1,4-bis(methoxyphenoxy)benzene, trimethoxymethylmelamine, hexamethoxymethylmelamine, N,N'-dimethoxymethyl urea and N,N'-dimethoxymethyl-4,5-dimethoxy-2-imidazolidione. The addition amount of the crosslinking agent to the polymerizable liquid crystal composition is generally from 1 to 50% by weight, and preferably from 5 to 30% by weight.

The polymerizable liquid crystal composition may be coated as it is on the surface of the substrate. However, in general, for facilitating coating operation, the polymerizable liquid crystal composition is diluted with a solvent, or in alternative, the components of the polymerizable liquid crystal composition are dissolved in a solvent, so as to prepare a solution of the polymerizable liquid crystal composition containing the polymerizable liquid crystal composition and the solvent, and the solution is coated. A sole compound may be used as the solvent, and two or more of compounds may be used as a mixture therefor. Examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (such as methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (such as methyl propionate, methyl 3-methoxypropyonate, ethyl propionate, propyl propionate and butyl propionate), alkyl butyrate (such as methyl butyrate, ethyl butyrate, butyl butyrate, isobutyl butyrate and propyl butyrate), dialkyl malonate (such as diethyl malonate), alkyl glycolate (such as methyl glycolate and ethyl glycolate), alkyl lactate (such as methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-diemthylacetamide, N-methylpropyonamide, N,N-dimethylormamide, N,N-diethylformamide, N,N-diethylacetamide, N,N-diemthylacetamide dimethylacetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerin, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Preferred examples of the ether solvent include ethylene glycol dimethyl ether, diethylene glycol dimethyl ether, bis(2-propyl)ether, 1,4-dioxane and tetrahydrofuran (THF).

Preferred examples of the glycol monoalkyl ether solvent include ethylene glycol monoalkyl ether (such as ethylene glycol monomethyl ether and ethylene glycol monobutyl ether), diethylene glycol monoalkyl ether (such as diethylene glycol monoethyl ether), triethylene glycol monoalkyl ether, propylene glycol monoalkyl ether (such as propylene glycol monobutyl ether), dipropylene glycol monoalkyl ether (such as dipropylene glycol monomethyl ether), ethylene glycol monoalkyl ether acetate (such as ethylene glycol monobutyl ether acetate), diethylene glycol monoalkyl ether acetate (such as diethylene glycol monoethyl ether acetate), triethylene glycol monoalkyl ether acetate, propylene glycol monoalkyl ether acetate (such as propylene glycol monomethyl ether acetate, propylene glycol monoethyl ether acetate and propylene glycol monobutyl ether acetate), dipropylene glycol monoalkyl ether acetate (such as dipropylene glycol monomethyl ether acetate), and diethylene glycol methyl ethyl ether.

Preferred examples of the aromatic hydrocarbon solvent include benzene, toluene, xylene, mesitylene, ethylbenzene, diethylbenzene, i-propylbenzene, n-propylbenzene, t-butylbenzen, s-butylbenzen, n-butylbenzen and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, tetrachloroethylene, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl ether acetate, methyl acetoacetate and 1-methoxy-2-propyl acetate.

An amide solvent, an aromatic hydrocarbon solvent and a ketone solvent are preferably used from the standpoint of solubility of the polymerizable liquid crystal compounds, and an ester solvent, an alcohol solvent, an ether solvent and a glycol monoalkyl ether solvent are also preferably used in combination from the standpoint of the boiling point of the solvent. There is no particular limitation on selecting the solvent, and in the case where a plastic substrate is used as the supporting substrate, it is necessary to lower the drying temperature to prevent the substrate from being deformed, and is also necessary to prevent the substrate from being damaged with the solvent. Preferred examples of the solvent used in this case include an aromatic hydrocarbon solvent, a ketone solvent, an ester solvent, an ether solvent, an alcohol solvent, an acetate solvent and a glycol monoalkyl ether solvent.

The preferred ratio of the solvent in the solution of the polymerizable liquid crystal composition is generally from 50 to 95% based on the total weight of the solution. The lower limit is a value determined by considering the solubility of the polymerizable liquid crystal compound and the optimum viscosity upon coating the solution. The upper limit is a value determined by considering the economical issue, such as the cost for the solvent and the time and amount of heat necessary for evaporating the solvent. The ratio of the solvent is preferably from 60 to 90%, and more preferably from 70 to 85%.

In the following description, a liquid crystal film of the invention obtained from the polymerizable liquid crystal composition may be referred to as a liquid crystal film in some cases. The liquid crystal film can be produced in the following manner. The solution of the polymerizable liquid crystal composition is coated on a supporting substrate, and then dried to form a coated film. The coated film is then irradiated with light to polymerize the polymerizable liquid crystal composition to fix the nematic alignment formed by the composition in a liquid crystal state in the coated film. Examples of the supporting substrate that can be used herein include glass, a substrate having a plastic thin film coated thereon, and a plastic film. Examples of a plastic material constituting the plastic thin film or the plastic film include polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

Examples of the cycloolefin resin include a norbornene resin and a dicyclopentadiene resin. Among these, those having no unsaturated bond or having unsaturated bonds that have been hydrogenated are preferably used. Examples thereof include a hydrogenated product of a ring-opening (co)polymer of one or plural kinds of norbornene monomers, an addition (co)polymer of one or plural kinds of norbornene monomers, an addition copolymer of a norbornene monomer and an olefin monomer (such as ethylene and an α-olefin), an addition copolymer of a norbornene monomer and a cycloolefin monomer (such as cyclopentene, cyclooctene and 5,6-dihydrodicyclopentadiene), and modified products thereof. Specific examples thereof include ZEONEX and ZEONOR (produced by Nippon Zeon Corp.), ARTON (produced by JSR Corp.), TOPAS (produced by Ticona, Inc.), APEL (produced by Mitsui Chemicals, Inc.), ESCENA (produced by Sekisui Chemical Co., Ltd.) and OPTOREZ (produced by Hitachi Chemical Co., Ltd.)

The plastic film may be a uniaxially stretched film or a biaxially stretched film. The plastic film may be subjected to a surface treatment, such as a hydrophilic treatment, e.g., a corona treatment and a plasma treatment, and a hydrophobic treatment. The method for the hydrophilic treatment is not particularly limited, but a corona treatment, an UV ashing treatment and a plasma treatment are preferred, and a plasma treatment is particularly preferred. The plasma treatment can be effected by a method disclosed in JP-A-2002-226616 and JP-A-2002-121648. An anchor coating layer may be formed for improving adhesion between the liquid crystal film and the plastic film. The anchor coating layer may be formed of an inorganic material or an organic material as far as the layer improves adhesion between the liquid crystal film and the plastic film. The plastic film may be a laminated film. Instead of the plastic film, a metallic substrate, such as aluminum, iron and copper, having slit grooves formed on the surface thereof, and a glass substrate, such as alkali glass, borosilicate glass and flint glass, having been etched in a slit form may also be used.

The supporting substrate, such as glass, a substrate having a plastic film coated thereon and a plastic films, may be subjected to a physical or mechanical surface treatment, such as rubbing, before forming a coated film of the polymerizable liquid crystal composition. In the case where the polymerizable liquid crystal layer and the liquid crystal film of a homeotropic alignment are to be formed, such a surface treatment as rubbing is not carried out in many cases, but the rubbing treatment may be carried out for preventing alignment defects from occurring. The rubbing treatment may be carried out by an arbitrary method, and in general, the following methods are employed. That is, a rubbing cloth formed of such a material as rayon, cotton or polyamide is wound on a metallic roll, and the roll is rotated and moved in a state where the roll is in contact with the supporting substrate or the polymer film, or the supporting substrate is moved with the rotated roll staying. The rubbing treatment may be carried out directly on the supporting substrate, or on the plastic film formed on the supporting substrate. The method for the rubbing treatment has been described above. An alignment capability may be imparted to the surface of the supporting substrate by oblique vapor deposition of silicon oxide depending on the kind of the supporting substrate.

Examples of a coating method for obtaining a uniform thickness upon coating the polymerizable liquid crystal composition or a solution thereof include a spin coating method, a microgravure coating method, a gravure coating method, a wire bar coating method, a dip coating method, a spray coating method, a meniscus coating method and a die coating method. In particular, a wire bar coating method and the like, in which a shearing force is applied to the liquid crystal composition upon coating, may be employed in the case where the alignment of the liquid crystal composition is controlled without a surface treatment, such as rubbing, on the substrate.

Upon preparing the solution of the polymerizable liquid crystal composition, the compounds (1) to (5) may be used after dissolving with a solvent. The solvent is selected from such solvents that have a capability of dissolving the compounds (1) to (5) and do not impair the stability and uniformity of the homeotropic alignment of the polymerizable liquid crystal composition, which is an advantage of the invention. Examples of the solvent include those solvents that have been described for preparation of the solution of the polymerizable liquid crystal composition. The using amount thereof may be set within such a range that the stability of the polymerizable liquid crystal composition is not impaired.

Upon coating the solution of the polymerizable liquid crystal composition of the invention, the solvent is removed after coating to form a polymerizable liquid crystal layer having a uniform thickness, i.e., a layer of the polymerizable liquid crystal composition, on the supporting substrate. The conditions for removing the solvent are not particularly limited, and the coated film is dried to such an extent that the solvent has been substantially removed, and the coated film of the polymerizable liquid crystal composition loses flowability. The solvent can be removed by air drying at room temperature, drying with a hot plate, drying in a drying furnace, blowing warm air or hot air. The polymerizable liquid crystal composition in the coated film may complete a nematic alignment during the drying operation of the coated film in some cases, depending on the kinds and the compositional ratios of the compounds used in the polymerizable liquid crystal composition. Accordingly, the coated film after completing the drying step can be subjected to a polymerizing step without subjecting to a heat-treating step described later. For further uniformizing the alignment of the liquid crystal molecules in the coated film, the coated film after the drying step may be subjected to a heat treatment and then to photopolymerization.

Preferred ranges of the temperature and time for the heat treatment of the coated film, the wavelength of light used for light irradiation, and the amount of light radiated from a light source vary depending on the kinds and compositional ratios of the compounds used in the polymerizable liquid crystal composition, and the presence or absence and the addition amount of the photopolymerization initiator. Accordingly, the conditions of the temperature and time for the heat treatment of the coated film, the wavelength of light used for light irradiation, and the amount of light radiated from a light source described later are considered to be approximative ranges.

The heat treatment of the coated film is preferably carried out under such conditions that the solvent is removed, and a uniform alignment of the polymerizable liquid crystal is obtained. The heat treatment may be carried out at a temperature higher than the liquid crystal phase transition temperature of the polymerizable liquid crystal composition. One example of the heat-treating method is a method of heating the coated film to a temperature where the polymerizable liquid crystal composition exhibits a nematic liquid crystal phase, whereby the polymerizable liquid crystal composition in the coated film forms a nematic alignment. A nematic alignment may be formed by changing the temperature of the coated film within a temperature range where the polymerizable liquid crystal composition exhibits a nematic liquid crystal phase. In this method, the coated film is heated to a high temperature region within the aforementioned temperature range to complete substantially a nematic alignment of the coated film, and then the temperature is decreased to make an alignment with higher regularity. In both cases using the heat-treating methods, the heat-treating temperature may be from room temperature to 120° C., preferably room temperature to 100° C., more preferably from room temperature to 90° C., and further preferably from room temperature to 70° C. The heat-treating time is generally from 5 seconds to 2 hours, preferably from 10 seconds to 40 minutes, and more preferably from 20 seconds to 20 minutes. In order to increase the temperature of the layer containing the polymerizable liquid crystal composition to the prescribed temperature, the heat-treating time is preferably 5 seconds or more. In order to prevent the productivity from being deteriorated, the heat-treating time is preferably 2 hours or less. The cooling time of the coated film is also important for providing a uniform homeotropic alignment, and is generally from 5 seconds to 20 minutes, preferably from 5 seconds to 10 minutes, and more preferably from 5 seconds to 5 minutes, at room temperature. The polymerizable liquid crystal layer of the invention is thus completed in this manner.

The nematic alignment state of the polymerizable liquid crystal compounds formed in the polymerizable liquid crystal layer is fixed by polymerizing the polymerizable liquid crystal composition through irradiation of light. The wavelength of the light used for the light irradiation is not particularly limited, and an electron beam, an ultraviolet ray, a visible ray, an infrared ray (heat ray) and the like may be used. In general, an ultraviolet ray or a visible ray is used. The range of the wavelength is generally from 150 to 500 nm, preferably from 250 to 450 nm, and more preferably from 300 to 400 nm. Examples of the light source include a low pressure mercury lamp (such as a bactericidal lamp, a fluorescent chemical lamp and a black light), a high pressure discharge lamp (such as a high pressure mercury lamp and a metal halide lamp), and a short arc discharge lamp (such as a super high pressure mercury lamp, a xenon lamp and a mercury xenon lamp). Preferred examples of the light source include a metal halide lamp, a xenon lamp, a super high pressure mercury lamp and a high pressure mercury lamp. The wavelength range of the light source used for irradiation may be selected by inserting a filter between the light source and the polymerizable liquid crystal layer to pass the specific wavelength range. The amount of light radiated from the light source is generally from 2 to 5,000 mJ/cm$^2$, preferably from 10 to 3,000 mJ/cm$^2$, and more preferably from 100 to 2,000 mJ/cm$^2$. The temperature condition upon irradiation of light is preferably set similarly to the heat-treating temperature.

The atmosphere upon polymerization may be any of a nitrogen atmosphere, an inert gas atmosphere and an air atmosphere, and for ensuring the adhesion property to the supporting substrate, it is preferred that the polymerization is firstly carried out in an air atmosphere and then carried out in a nitrogen atmosphere or an inert gas atmosphere. According to the procedure, the epoxy component firstly undergoes polymerization to exhibit adhesion property. The acrylate component is then polymerized to improve the strength of the coated film. In alternative, the oxygen concentration may be appropriately controlled, whereby radical polymerization is suppressed, and simultaneously cationic polymerization is carried out.

For improving the uniformity of the homeotropic alignment, plural kinds of the compound (3) as the component (C) may be used in combination. The component (C) may be added directly to the polymerizable liquid crystal composition or may be added thereto after diluting with a solvent or the like. The ratio of the component (C) is preferably from 1 to 20% by weight based on the total amount of the components (A) to (E), as described above. The ratio thereof is more preferably from 3 to 15% by weight, further preferably from 3 to 13% by weight, and particularly preferably from 3 to 10% by weight. Preferred examples of the compound (3) include the compounds (3-1-1), (3-2-1), (3-2-2) and (3-3-1).

In the case where the polymerizable liquid crystal layer of the invention and a liquid crystal film obtained by polymerizing it through light or heat are used in various optical devices, and in the case where they are used as an optical compensation device used in a liquid crystal display device, it is considerably important to control the distribution of the tilt angle in the thickness direction.

One example of the method of controlling the tilt angle is a method of controlling the kinds and compositional ratios of the liquid crystal compounds used in the polymerizable liquid crystal composition. The tilt angle can be controlled by adding other components to the polymerizable liquid crystal composition. The tilt angle of the liquid crystal film can also be controlled by the kind of the solvent and the concentration of the solute in the polymerizable liquid crystal composition, and the kind and addition amount of the surfactant added as one of the other components. The tilt angle of the liquid crystal film can also be controlled by the kind and the rubbing condition of the supporting substrate or the polymer coated film, and the drying conditions and heat-treating conditions of the coated film of the polymerizable liquid crystal composition. Furthermore, the irradiation atmosphere and the temperature upon irradiation in the photopolymerization step after alignment also influence the tilt angle of the liquid crystal film. In other words, it can be considered that substantially the all conditions in the production process of the liquid crystal film influence the tilt angle in any way. Therefore, an arbitrary tilt angle can be obtained by optimizing the polymerizable liquid crystal composition and by appropriately selecting the various conditions in the production process of the liquid crystal film.

In a homeotropic alignment, the tilt angle is distributed uniformly from the substrate interface to the free interface at from 85 to 90 degree. The alignment state can be obtained by forming a coated film of the polymerizable liquid crystal composition of the invention having the compound (3) added thereto on the surface of the supporting substrate. There are some cases where a uniform homeotropic alignment is difficult to provide in the aforementioned manner depending on the kind of the polymerizable liquid crystal compound or the formulation of the polymerizable liquid crystal composition. In such cases, it is considered that a homogeneous alignment nature or a tilted alignment nature is dominant, and therefore, the addition amount of the component (B) or the compounds (4-3) to (4-5) as the component (D) is increased for optimization, whereby a uniform homeotropic alignment can be obtained. The homeotropic alignment can be further improved in uniformity when the surface of the supporting substrate has polarity by a hydrophilic treatment or the like even though a surface treatment, such as rubbing, is not effected. In the case where alignment defects occur upon coating without a rubbing treatment, a uniform homeotropic alignment can be obtained by effecting a rubbing treatment or the like.

In the case where a homeotropic alignment agent is formed on the supporting substrate, examples thereof include a silane coupling agent, such as octadecyltriethoxysilane, lecithin, a chromium complex, a polyimide alignment film for a homeotropic alignment, a low temperature (less than 180° C.) baked film of a polyamic acid alignment film, a high temperature (180° C. or more) baked film of a polyamic acid alignment film, and a water soluble silsesquioxane film. The tilt angle can also be controlled by using an electric field or a magnetic field. For obtaining a homeotropic alignment without alignment defects, the alignment treatment may be effected on the surface of the supporting substrate by using a mechanical measure, such as rubbing.

There are cases where the uniformity of the aforementioned various alignment modes of the liquid crystal film can be improved by appropriately selecting the structures of the polymerizable liquid crystal compounds used. It has been observed in the invention that the uniformity can be stably obtained in the case where the bifunctional polymerizable liquid crystal compound has a mesogen skeleton containing an ester group or a carbonate group, the case where the bifunctional polymerizable liquid crystal compound has a fluorine atom in the polymerizable group, and the case where the monofunctional polymerizable liquid crystal compound has cyano at a mesogen terminal group. Preferred examples of such compounds include the compounds (1-1-2), (1-1-3), (1-2-7), (1-2-9), (1-2-10), (1-2-11), (2-2), (2-3), (2-4), (2-5), (2-8), (2-9), (4-3-1) to (4-3-7), (4-4-1) to (4-4-3), (4-4-5) to (4-4-7), (4-5-1), (4-5-3), (4-5-4), (4-5-9) and (4-5-10).

A suitable thickness of the liquid crystal film varies depending on the retardation corresponding to the target device and the birefringence of the liquid crystal film. Therefore, the suitable range thereof cannot be determined strictly and may be generally from 0.05 to 50 μm, preferably from 0.1 to 20 μm, and more preferably from 0.5 to 10 μm. The liquid crystal film preferably has a haze of 1.5% or less, and more preferably 1.0% or less, and a transmittance of 80% or more, and more preferably 95% or more. The conditions of transmittance preferably satisfied in the visible ray region.

The liquid crystal film is effective as an optical compensation device applied to a liquid crystal display device (particularly, a liquid crystal display device of an active matrix type or a passive matrix type). Examples of the type of the liquid crystal display device, to which the liquid crystal film is applied as an optical compensation film, include an IPS (in-plane switching) type, an OCB (optically compensated birefringence) type, a TN (twisted nematic) type, an STN (super twisted nematic) type, an ECB (electrically controlled birefringence) type, a DAP (deformation of aligned phases) type, a CSH (color super homeotropic) type, a VAN/VAC (vertically aligned nematic/cholesteric) type, an OMI (optical mode interference) type and an SBE (super birefringence effect) type. Furthermore, the liquid crystal film can be used as a phase retarder for a display device of a guest-host type, a ferroelectric type or antiferroelectric type. The optimum values of the parameters demanded for the liquid crystal film, such as the distribution of tilt angle in the thickness direction and the thickness, vary depending on the kind of device since they greatly depend on the kind of a liquid crystal device to be compensated and the optical parameters thereof.

The liquid crystal film can be used as an optical device having a polarizing plate and the like integrated therewith, and in this case, the liquid crystal film is disposed outside the liquid crystal cell. However, the liquid crystal film as an optical compensation device can be disposed inside the liquid crystal cell since it suffers no or less elution of impurities into the liquid crystal filled in the cell. By applying a photolithography technique to the use of the polymerizable liquid crystal composition, an optical compensation layer containing liquid crystal films having different optical parameters can be disposed in respective pixels of blue, green and red of the liquid crystal display device, or in respective prescribed regions obtained by dividing one of the pixels. For example, by applying the technique disclosed in JP-A-2001-222009, one pixel can be divided into a reflection display part and a transmission display part having a ¼λ plate formed of the liquid crystal film, whereby a semi-transmission-reflection liquid crystal display device improved in light utilization efficiency can be provided, i.e., the display capability of the liquid crystal display device can be further improved.

EXAMPLES

The invention will be described in more detail below with reference to examples, but the invention is not construed as being limited to the examples. Evaluation methods used in the examples are shown below.

<Polymerization Conditions>

A polymerizable composition was irradiated with light having an intensity of 30 mW/cm$^2$ (365 nm) by using a 250 W super high pressure mercury lamp at room temperature firstly in an air atmosphere and then in a nitrogen atmosphere for 30 seconds for each atmosphere.

<Confirmation of Alignment State of Liquid Crystal>

A substrate having a liquid crystal film was held between two polarizing plates having been disposed as crossed nicols. In the case where a dark field was viewed by observing the substrate from the front, and a bright field was viewed by observing the substrate in the vertical direction or the horizontal direction, it was evaluated that the liquid crystal film exhibited a homeotropic alignment. With respect to the uniformity of the homeotropic alignment, a substrate having a liquid crystal film was held between two polarizing plates having been disposed as crossed nicols, and in the case where light passing through the liquid crystal film due to alignment defects of the liquid crystal was not observed (dark field), it was evaluated that the liquid crystal film exhibited a uniform homeotropic alignment. As the supporting substrate, a plastic film, a glass substrate having polyamic acid coated and baked thereon or a slide glass were used, and a polymerizable liquid crystal composition was coated on the supporting substrate, aligned and polymerized under the aforementioned conditions to obtain a liquid crystal film.

<Measurement with Ellipsometer>

OPTIPRO ellipsometer, produced by SHINTECH, INC., was used. A substrate having a liquid crystal film was irradiated with light having a wavelength of 550 nm. The retardation was measured by decreasing the incident angle of the light with respect to the film surface from 90 degree. The retardation is expressed by Δn×d, wherein Δn represents the optical anisotropy, and d represents the thickness of the polymer film.

<Confirmation of Adhesion Property—Cellotape (Registered Trade Name) Peeling Test>

Cellotape (adhesive tape) as a commercially available product was adhered on the surface of the substrate having liquid crystal film, which was used for confirming the alignment state, and then peeled off after lapsing 30 seconds, and the state of the surface after peeling was observed. The state was evaluated by the following five grades.

A: Completely no peeling
B: 1 to 10% peeled
C: 10 to 30% peeled
D: 30 to 50% peeled
E: 50% or more peeled <Confirmation of Stability of Solution>

A solution was allowed to stand at room temperature for 24 hours, and occurrence of change in color of the solution was observed. The change in rotation viscosity of the solution at 25° C. was measured with an E-type viscometer.

<Synthesis of Compounds>

The compounds used in Examples were synthesized in the following manners.

The compound (1-1-3) was synthesized by the method disclosed in JP-A-2003-238491.

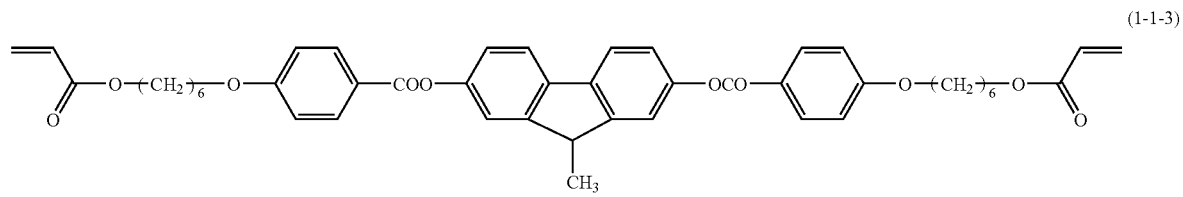

(1-1-3)

The compound (1-2-7) was synthesized by the method disclosed in WO93/22397.

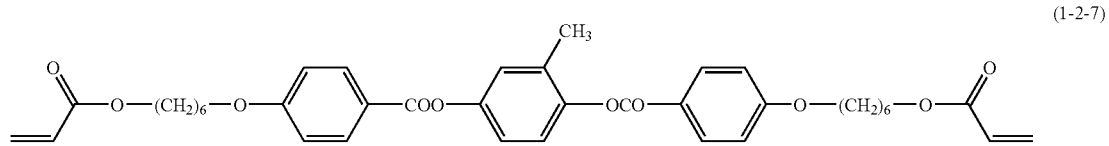

(1-2-7)

The compound (1-2-9) was synthesized by the method disclosed in WO97/00600.

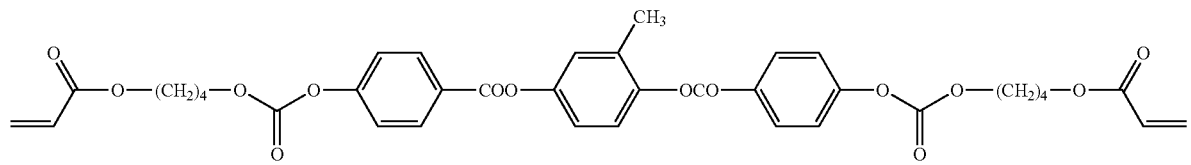
(1-2-9)
The compound (2-3) was synthesized by the method disclosed in Macromolecules, vol. 23, pp. 3938-3943 (1990).
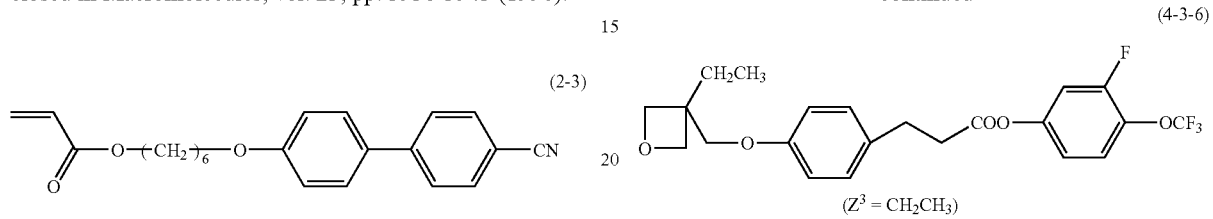
(2-3)
The compounds (4-3-2), (4-3-4) and (4-3-6) were synthesized by the method disclosed in JP-A-2005-320317.
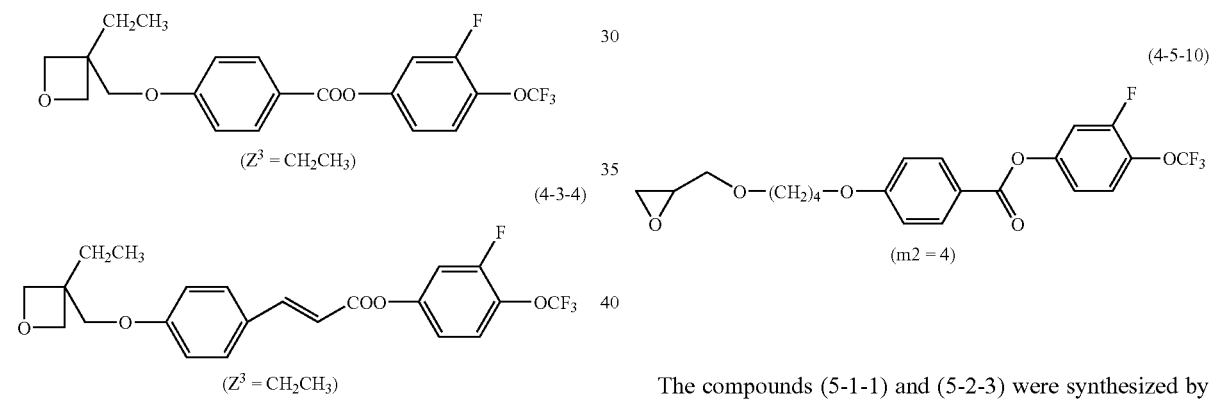
(4-3-6)
($Z^3$ = $CH_2CH_3$)
(4-3-2)
($Z^3$ = $CH_2CH_3$)
(4-3-4)
($Z^3$ = $CH_2CH_3$)
-continued
The compound (4-5-10) was synthesized by the method disclosed in JP-A-2006-117564.
(4-5-10)
(m2 = 4)
The compounds (5-1-1) and (5-2-3) were synthesized by the method disclosed in JP-A-2007-16213.
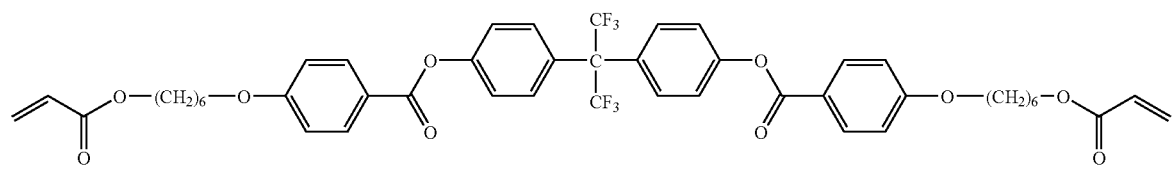
(5-1-1)
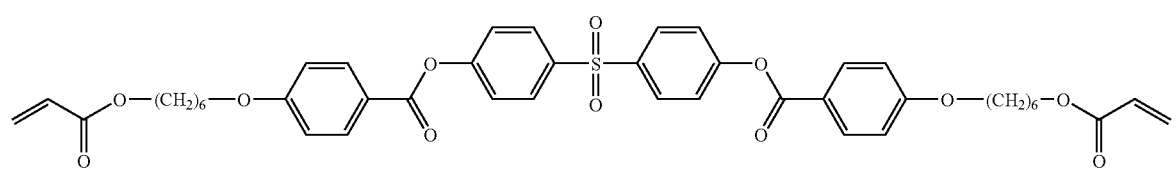
(5-2-3)

As the compound (3), the following compounds available from Osaka Gas Chemicals Co., Ltd. were used.
Compound (3-1-1): ONF-1
Compound (3-2-2): ONCOAT EX-1020
Compound (3-3-1): ONCOAT EX-1040

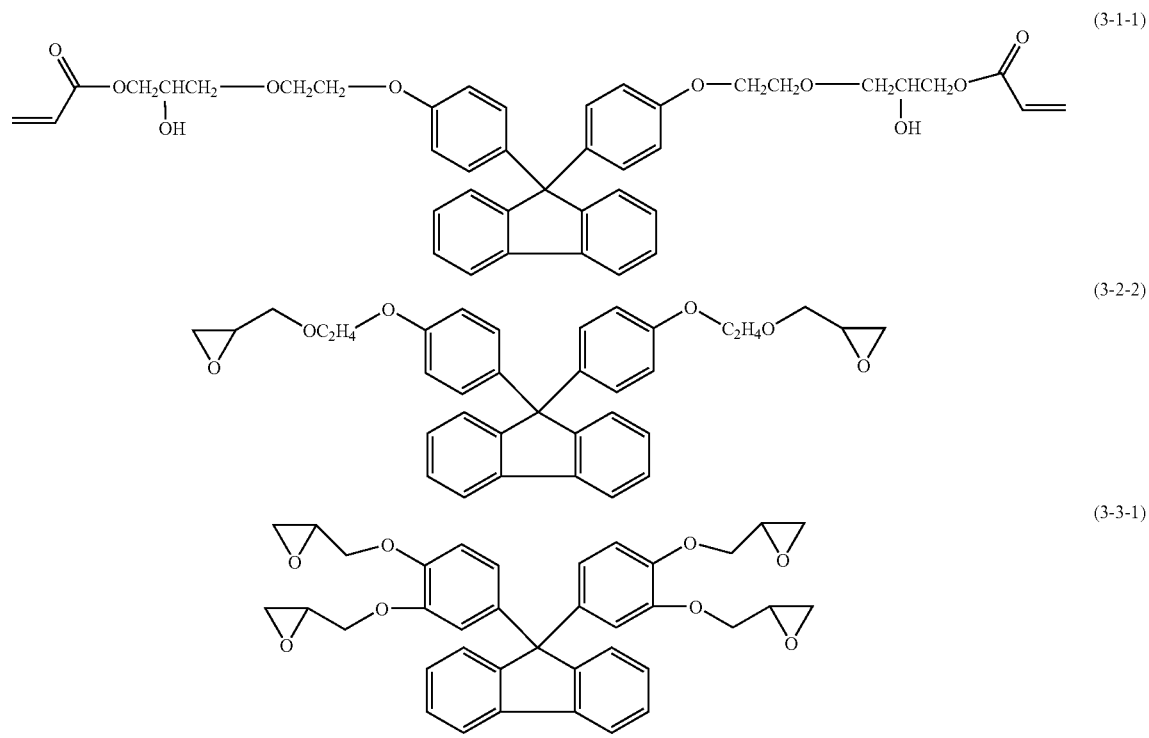

As the compound (4), the compounds (4-3-2), (4-3-4) and (4-3-6) mentioned above and the following compounds were used. These compounds were commercially available.

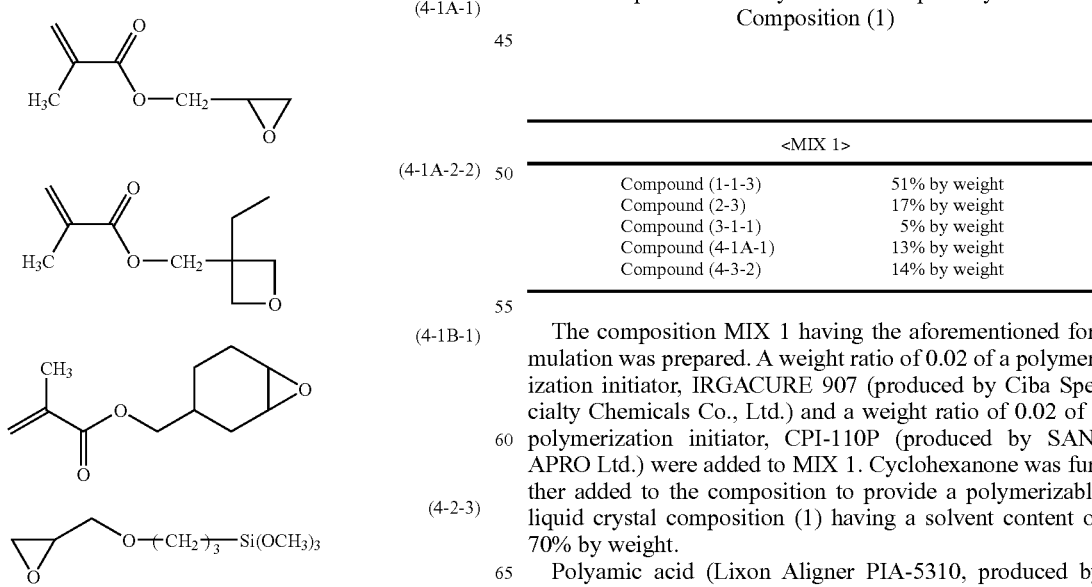

The compound (4-2-3) is SILA-ACE S-510, produced by Chisso Corporation.

Example 1

Preparation of Polymerizable Liquid Crystal Composition (1)

| <MIX 1> | |
|---|---|
| Compound (1-1-3) | 51% by weight |
| Compound (2-3) | 17% by weight |
| Compound (3-1-1) | 5% by weight |
| Compound (4-1A-1) | 13% by weight |
| Compound (4-3-2) | 14% by weight |

The composition MIX 1 having the aforementioned formulation was prepared. A weight ratio of 0.02 of a polymerization initiator, IRGACURE 907 (produced by Ciba Specialty Chemicals Co., Ltd.) and a weight ratio of 0.02 of a polymerization initiator, CPI-110P (produced by SAN-APRO Ltd.) were added to MIX 1. Cyclohexanone was further added to the composition to provide a polymerizable liquid crystal composition (1) having a solvent content of 70% by weight.

Polyamic acid (Lixon Aligner PIA-5310, produced by Chisso Corp.) was coated on a glass substrate (S-1112, produced by Matsunami Glass Industries, Ltd.), and after drying at 80° C. for 3 minutes, baked at 210° C. for 30 minutes. The polymerizable liquid crystal composition (1) was coated on the glass substrate having polyamic acid by a spin coating method. The substrate was heated to 70° C. for 3 minutes, and the coated film, which the solvent was removed therefrom, was then polymerized with an ultraviolet ray to obtain a liquid crystal film exhibiting a uniform homeotropic alignment. The measurement of retardation of the film provided the results shown in FIG. 1. The evaluation of adhesion property of the liquid crystal film to the supporting substrate was A. The solution was good in storage stability without change in viscosity confirmed.

Example 2

A polymerizable liquid crystal composition (2) was prepared in the same manner as in Example 1 except that the compound (3-1-1) was changed to the compound (3-2-2), and a liquid crystal film was obtained from the polymerizable liquid crystal composition (2) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 3

A polymerizable liquid crystal composition (3) was prepared in the same manner as in Example 1 except that the compound (3-1-1) was changed to the compound (3-3-1), and a liquid crystal film was obtained from the polymerizable liquid crystal composition (3) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 4

| <MIX 4> | |
|---|---|
| Compound (1-1-3) | 33% by weight |
| Compound (1-2-7) | 17% by weight |
| Compound (2-3) | 12% by weight |
| Compound (3-1-1) | 5% by weight |
| Compound (4-1A-1) | 13% by weight |
| Compound (4-3-2) | 12% by weight |
| Compound (5-2-3) | 8% by weight |

The composition MIX 4 having the aforementioned formulation was prepared. A weight ratio of 0.02 of a polymerization initiator, IRGACURE 907 and a weight ratio of 0.02 of a polymerization initiator, CPI-110P were added to MIX 4. Cyclohexanone was further added to the composition to provide a polymerizable liquid crystal composition (4) having a solvent content of 70% by weight. A liquid crystal film was obtained from the polymerizable liquid crystal composition (4) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 5

A polymerizable liquid crystal composition (5) was prepared in the same manner as in Example 4 except that the compound (4-1A-1) was changed to the compound (4-2-3), and a liquid crystal film was obtained from the polymerizable liquid crystal composition (5) in the same manner as in Example 4. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 6

A polymerizable liquid crystal composition (6) was prepared in the same manner as in Example 4 except that the compound (4-3-2) was changed to the compound (4-3-4), and a liquid crystal film was obtained from the polymerizable liquid crystal composition (6) in the same manner as in Example 4. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 7

A polymerizable liquid crystal composition (7) was prepared in the same manner as in Example 4 except that the compound (4-3-2) was changed to the compound (4-3-6), and a liquid crystal film was obtained from the polymerizable liquid crystal composition (7) in the same manner as in Example 4. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 8

| <MIX 8> | |
|---|---|
| Compound (1-1-3) | 54% by weight |
| Compound (2-3) | 29% by weight |
| Compound (3-1-1) | 4% by weight |
| Compound (4-1A-1) | 13% by weight |

The composition MIX 8 having the aforementioned formulation was prepared. A weight ratio of 0.02 of a polymerization initiator, IRGACURE 907 and a weight ratio of 0.02 of a polymerization initiator, CPI-110P were added to MIX 8. Cyclohexanone was further added to the composition to provide a polymerizable liquid crystal composition (8) having a solvent content of 70% by weight. A liquid crystal film was obtained from the polymerizable liquid crystal composition (8) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 9

| <MIX 9> | |
|---|---|
| Compound (1-1-3) | 51% by weight |
| Compound (2-3) | 28% by weight |
| Compound (3-1-1) | 4% by weight |
| Compound (4-1A-1) | 13% by weight |
| Compound (4-2-3) | 4% by weight |

The composition MIX 9 having the aforementioned formulation was prepared. A weight ratio of 0.02 of a polymerization initiator, IRGACURE 907 and a weight ratio of 0.02 of a polymerization initiator, CPI-110P were added to MIX 9. Cyclohexanone was further added to the composition to provide a polymerizable liquid crystal composition (9) having a solvent content of 70% by weight. A liquid crystal film was obtained from the polymerizable liquid crystal composition (9) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 10

| <MIX 10> | |
|---|---|
| Compound (1-1-3) | 54% by weight |
| Compound (2-3) | 29% by weight |
| Compound (3-1-1) | 4% by weight |
| Compound (4-1A-2-2) | 13% by weight |

The composition MIX 10 having the aforementioned formulation was prepared. A weight ratio of 0.02 of a polymerization initiator, IRGACURE 907 and a weight ratio of 0.02 of a polymerization initiator, CPI-110P were added to MIX 10. Cyclohexanone was further added to the composition to provide a polymerizable liquid crystal composition (10) having a solvent content of 70% by weight. A liquid crystal film was obtained from the polymerizable liquid crystal composition (10) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 11

| <MIX 11> | |
|---|---|
| Compound (1-1-3) | 54% by weight |
| Compound (2-3) | 29% by weight |
| Compound (3-1-1) | 4% by weight |
| Compound (4-1A-1) | 6.5% by weight |
| Compound (4-1A-2-2) | 6.5% by weight |

The composition MIX 11 having the aforementioned formulation was prepared. A weight ratio of 0.02 of a polymerization initiator, IRGACURE 907 and a weight ratio of 0.02 of a polymerization initiator, CPI-110P were added to MIX 11. Cyclohexanone was further added to the composition to provide a polymerizable liquid crystal composition (11) having a solvent content of 70% by weight. A liquid crystal film was obtained from the polymerizable liquid crystal composition (11) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 12

| <MIX 12> | |
|---|---|
| Compound (1-1-3) | 62% by weight |
| Compound (2-3) | 19% by weight |
| Compound (3-1-1) | 5% by weight |
| Compound (4-5-10) | 14% by weight |

The composition MIX 12 having the aforementioned formulation was prepared. A weight ratio of 0.02 of a polymerization initiator, IRGACURE 907 and a weight ratio of 0.02 of a polymerization initiator, CPI-110P were added to MIX 12. Cyclohexanone was further added to the composition to provide a polymerizable liquid crystal composition (12) having a solvent content of 70% by weight. A liquid crystal film was obtained from the polymerizable liquid crystal composition (12) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 13

| <MIX 13> | |
|---|---|
| Compound (1-1-3) | 53% by weight |
| Compound (2-3) | 16% by weight |

-continued

| <MIX 13> | |
|---|---|
| Compound (3-1-1) | 5% by weight |
| Compound (4-1A-2-2) | 14% by weight |
| Compound (4-5-10) | 12% by weight |

The composition MIX 13 having the aforementioned formulation was prepared. A weight ratio of 0.02 of a polymerization initiator, IRGACURE 907 and a weight ratio of 0.02 of a polymerization initiator, CPI-110P were added to MIX 13. Cyclohexanone was further added to the composition to provide a polymerizable liquid crystal composition (13) having a solvent content of 70% by weight. A liquid crystal film was obtained from the polymerizable liquid crystal composition (13) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 14

| <MIX 14> | |
|---|---|
| Compound (1-1-3) | 53% by weight |
| Compound (2-3) | 16% by weight |
| Compound (3-1-1) | 5% by weight |
| Compound (4-2-3) | 14% by weight |
| Compound (4-3-2) | 12% by weight |

The composition MIX 14 having the aforementioned formulation was prepared. A weight ratio of 0.02 of a polymerization initiator, IRGACURE 907 and a weight ratio of 0.02 of a polymerization initiator, CPI-110P were added to MIX 14. Cyclohexanone was further added to the composition to provide a polymerizable liquid crystal composition (14) having a solvent content of 70% by weight. A liquid crystal film was obtained from the polymerizable liquid crystal composition (14) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 15

| <MIX 15> | |
|---|---|
| Compound (1-1-3) | 52% by weight |
| Compound (2-3) | 16% by weight |
| Compound (3-1-1) | 4% by weight |
| Compound (4-2-3) | 16% by weight |
| Compound (4-3-2) | 12% by weight |

The composition MIX 15 having the aforementioned formulation was prepared. A weight ratio of 0.02 of a polymerization initiator, IRGACURE 907 and a weight ratio of 0.02 of a polymerization initiator, CPI-110P were added to MIX 15. Cyclohexanone was further added to the composition to provide a polymerizable liquid crystal composition (15) having a solvent content of 70% by weight. A liquid crystal film was obtained from the polymerizable liquid crystal composition (15) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 16

| <MIX 16> | |
|---|---|
| Compound (1-1-3) | 57% by weight |
| Compound (2-3) | 30% by weight |
| Compound (3-1-1) | 4% by weight |
| Compound (4-1B-1) | 9% by weight |

The composition MIX 16 having the aforementioned formulation was prepared. A weight ratio of 0.02 of a polymerization initiator, IRGACURE 907 and a weight ratio of 0.02 of a polymerization initiator, CPI-110P were added to MIX 16. Cyclohexanone was further added to the composition to provide a polymerizable liquid crystal composition (16) having a solvent content of 70% by weight. A liquid crystal film was obtained from the polymerizable liquid crystal composition (16) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 17

| <MIX 17> | |
|---|---|
| Compound (1-1-3) | 33% by weight |
| Compound (1-2-9) | 17% by weight |
| Compound (2-3) | 12% by weight |
| Compound (3-1-1) | 5% by weight |
| Compound (4-1A-1) | 13% by weight |
| Compound (4-3-2) | 12% by weight |
| Compound (5-2-3) | 8% by weight |

The composition MIX 17 having the aforementioned formulation was prepared. A weight ratio of 0.02 of a polymerization initiator, IRGACURE 907 and a weight ratio of 0.02 of a polymerization initiator, CPI-110P were added to MIX 17. Cyclohexanone was further added to the composition to provide a polymerizable liquid crystal composition (17) having a solvent content of 70% by weight. A liquid crystal film was obtained from the polymerizable liquid crystal composition (17) in the same manner as in Example 1. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 18

A polymerizable liquid crystal composition (18) was prepared in the same manner as in Example 17 except that the compound (5-2-3) in Example 17 was changed to the compound (5-1-1), and a liquid crystal film was obtained from the polymerizable liquid crystal composition (18) in the same manner as in Example 17. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Example 19

A liquid crystal film was obtained by using the polymerizable liquid crystal composition (4) in Example 4 in the same manner as in Example 1 except that a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 20

A liquid crystal film was obtained by using the polymerizable liquid crystal composition (5) in Example 5 in the same manner as in Example 1 except that a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 21

A liquid crystal film was obtained by using the polymerizable liquid crystal composition (8) in Example 8 in the same manner as in Example 1 except that a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 22

A liquid crystal film was obtained by using the polymerizable liquid crystal composition (10) in Example 10 in the same manner as in Example 1 except that a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 23

A liquid crystal film was obtained by using the polymerizable liquid crystal composition (13) in Example 13 in the same manner as in Example 1 except that a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 24

A liquid crystal film was obtained by using the polymerizable liquid crystal composition (15) in Example 15 in the same manner as in Example 1 except that a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 25

A liquid crystal film was obtained by using the polymerizable liquid crystal composition (18) in Example 18 in the same manner as in Example 1 except that a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 26

A liquid crystal film was obtained by using the polymerizable liquid crystal composition (4) in Example 4 in the same manner as in Example 1 except that a mixed solvent of toluene and 2-propanol (weight ratio: 9/1) was used as the solvent, and a triacetyl cellulose (TAC) film (thickness: 80 µm, TACPHAN, a trade name, produced by Gouju Sangyo Co., Ltd.) was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A.

Example 27

A norbornene resin film (ZEONOR 1600R, produced by Nippon Zeon Corp., see JP-A-2004-4641) was subjected to a hydrophilic treatment (plasma treatment) on the surface thereof by using an ordinary pressure plasma surface treatment device (AP-T02-L). The plasma discharge conditions were determined according to JP-A-2002-226616. The extent of the hydrophilic treatment was evaluated by a contact angle (25° C.) of pure water dropped on the surface of the norbornene resin substrate (measured by Contact Angle Meter CA-A, produced by Kyowa Interface Science Co., Ltd.). The contact angle before the treatment was 97°, and that after the treatment was 30°. A liquid crystal film was obtained by using the polymerizable liquid crystal composition (4) in Example 4 in the same manner as in Example 1 except that the norbornene resin film having been subjected to the hydrophilic treatment was used as the supporting substrate. The liquid crystal film exhibited a uniform homeotropic alignment. The evaluation of adhesion property of the liquid crystal film to the supporting substrate was A.

Example 28

A liquid crystal film was obtained by using the polymerizable liquid crystal composition (8) in Example 8 in the same manner as in Example 1 except that a mixed solvent of N,N-dimethylacetamide, 3-methoxybutyl acetate and 2-propanol (weight ratio: 3/6/1) was used as the solvent, and a slide glass was used as the supporting substrate. The liquid crystal film exhibited a uniform homeotropic alignment. The measurement of retardation of the film provided results that were similar to the results shown in FIG. 1. The evaluation of adhesion property of the liquid crystal film to the supporting substrate was A. The solution was good in storage stability with no change in viscosity confirmed.

Comparative Example 1

A polymerizable liquid crystal composition was obtained in the same manner as in Example 1 except that the compound (4-1A-1) and the compound (4-3-2) in the composition MIX 1 used in Example 1 were not used, but the compound (1-1-3), the compound (2-3) and the compound (3-1-1) were mixed in a ratio of 71% by weight/24% by weight/5% by weight to form a mixture, to which a weight ratio of 0.03 of a polymerization initiator, IRGACURE 907 was added. A liquid crystal film was obtained from the polymerizable liquid crystal composition in the same manner as in Example 1. The liquid crystal film exhibited a homeotropic alignment, but the evaluation of adhesion property of the liquid crystal film to the supporting substrate was E.

Comparative Example 2

A polymerizable liquid crystal composition was obtained in the same manner as in Example 4 except that the compound (4-1A-1) and the compound (4-3-2) were not used, but the compound (1-1-3), the compound (1-2-7), the compound (2-3), the compound (3-1-1) and the compound (5-2-3) were mixed in a ratio of 44% by weight/22% by weight/21% by weight/5% by weight/8% by weight to form a mixture, to which a weight ratio of 0.03 of a polymerization initiator, IRGACURE 907 was added. A liquid crystal film was obtained from the polymerizable liquid crystal composition in the same manner as in Example 1. The liquid crystal film exhibited a homeotropic alignment, but the evaluation of adhesion property of the liquid crystal film to the supporting substrate was E.

Comparative Example 3

A polymerizable liquid crystal composition was obtained in the same manner as in Example 8 except that the compound (4-1A-1) was not used, but the compound (1-1-3), the compound (2-3) and the compound (3-1-1) were mixed in a ratio of 62% by weight/33% by weight/5% by weight to form a mixture, to which a weight ratio of 0.03 of a polymerization initiator, IRGACURE 907 was added. A liquid crystal film was obtained from the polymerizable liquid crystal composition in the same manner as in Example 1. The liquid crystal film exhibited a homeotropic alignment, but the evaluation of adhesion property of the liquid crystal film to the supporting substrate was E.

Comparative Example 4

A composition was obtained and evaluated in the same manner as in Example 26, except that the composition of Comparative Example 2 was used and the solvent of the composition of Comparative Example 2 was changed to a mixed solvent of toluene and 2-propanol (weight ratio: 9/1). And a liquid crystal film was obtained from the composition in the same manner as in Example 1. The liquid crystal film exhibited a homeotropic alignment, but the evaluation of adhesion property of the liquid crystal film to the supporting substrate was E.

It is understood from the results of Examples and Comparative Examples that the liquid crystal films obtained from the polymerizable liquid crystal compositions of the invention exhibit a uniform homeotropic alignment and have no problem in adhesion property to the supporting substrates of the liquid crystal films and in storage stability of the solutions.

INDUSTRIAL APPLICABILITY

An epoxy polymerizable liquid crystal compound is added to a composition containing an acrylate polymerizable liquid crystal compound and a bisphenol fluorene liquid crystal compound, whereby such a polymerizable liquid crystal composition can be obtained that is excellent in stability of a solution thereof and in adhesion property to a supporting substrate. A liquid crystal film obtained from the polymerizable liquid crystal composition of the invention exhibits a uniform homeotropic alignment without a homeotropic alignment film having long-chain alkyl groups or a surface treatment with an inorganic material.

Accordingly, the invention provides such a liquid crystal film that is excellent in uniformity of a homeotropic alignment, adhesion property and storage stability.

The invention claimed is:

1. A polymerizable liquid crystal composition comprising at least one compound selected from a group of compounds represented by formulae (1-1) and (1-2) as a component (A), at least one compound selected from a group of compounds represented by formula (2) as a component (B), at least one compound selected from a group of compounds represented by formulae (3-1) to (3-3) as a component (C) and at least one compound selected from a group of compounds represented by formulae (4-1A), (4-1B), (4-2), (4-3), (4-4) and (4-5) as a component (D), and optionally containing at least one compound selected from a group of compounds represented by formulae (5-1) and (5-2) as a component (E):

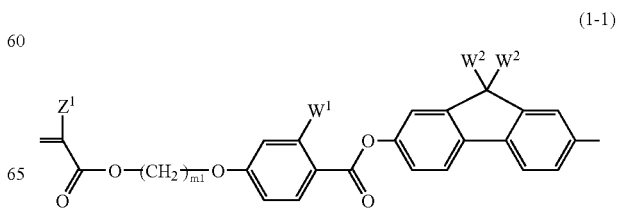

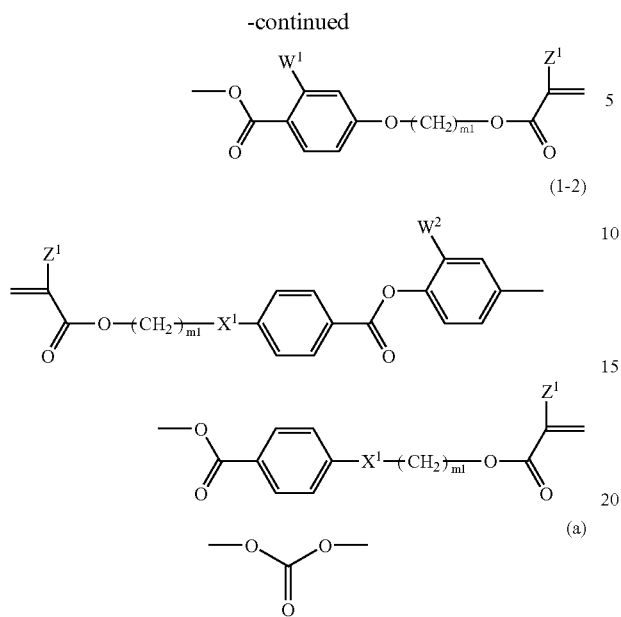

(1-2)

(a)

wherein $Z^1$ independently represents hydrogen, fluorine, methyl or trifluoromethyl; $W^1$ independently represents hydrogen or fluorine; $W^2$ independently represents hydrogen or methyl; $X^1$ independently represents —O— or a group represented by formula (a); and m1 independently represents an integer of from 2 to 15,

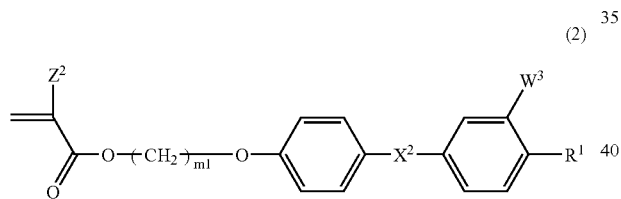

(2)

wherein $Z^2$ represents hydrogen or methyl; $W^3$ represents hydrogen or fluorine; $R^1$ represents —CN, —OCF$_3$, alkyl having from 1 to 10 carbon atoms or alkoxy having from 1 to 10 carbon atoms; $X^2$ represents a single bond, —COO— or —OCO—; and m1 represents an integer of from 2 to 15,

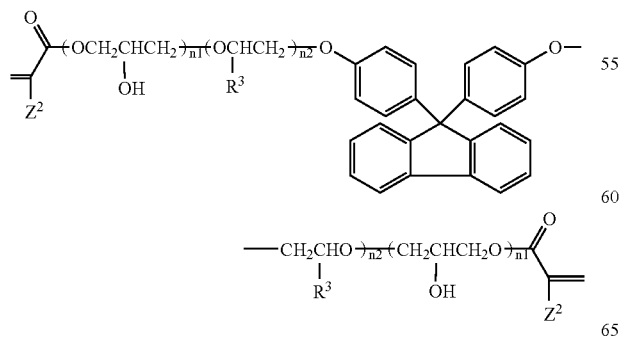

(3-1)

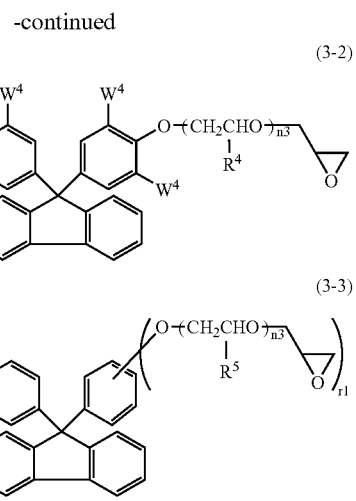

(3-2)

(3-3)

wherein $Z^2$ independently represents hydrogen or methyl; $R^3$ independently represents hydrogen or alkyl having from 1 to 6 carbon atoms; $R^4$ independently represents hydrogen or alkyl having from 1 to 6 carbon atoms; $R^5$ independently represents hydrogen or methyl; $W^4$ independently represents hydrogen, alkyl having from 1 to 6 carbon atoms, phenyl or halogen; n1 independently represents an integer of from 1 to 3; n2 independently represents an integer of from 1 to 3; n3 independently represents an integer of from 0 to 10; and r1 independently represents an integer of from 2 to 5,

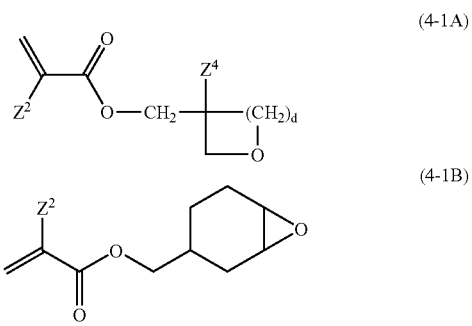

(4-1A)

(4-1B)

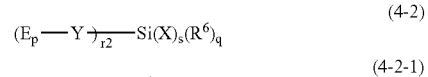

(4-2)

(4-2-1)

(4-2-2)

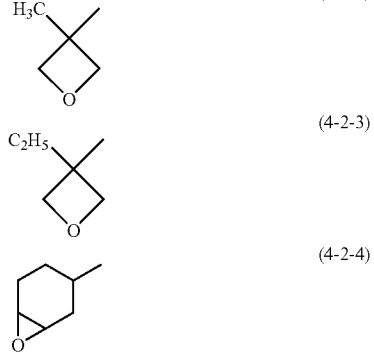

(4-2-3)

(4-2-4)

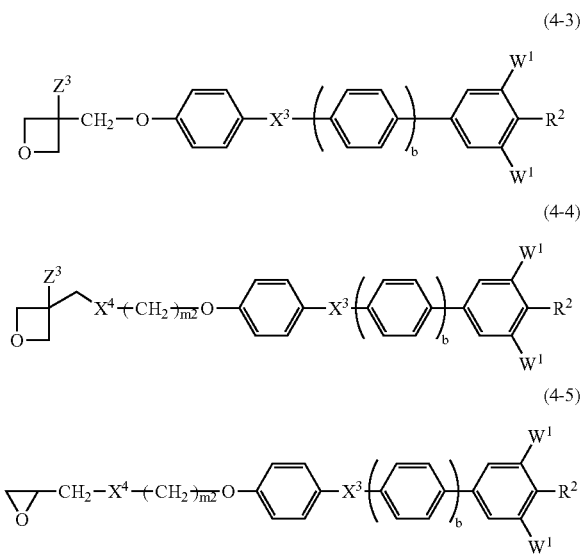

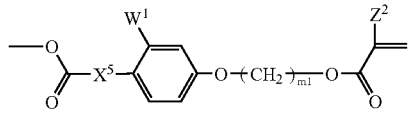

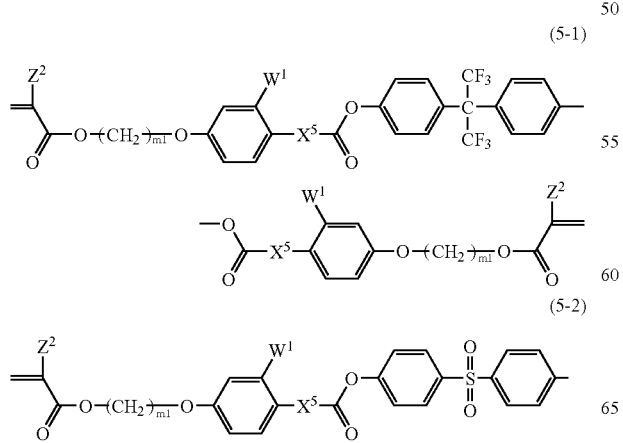

wherein $Z^2$ independently represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 20 carbon atoms, and in the alkylene, one or two —CH$_2$— not adjacent to each other may be replaced by —O—; X represents alkoxy having from 1 to 4 carbon atoms or trimethylsiloxy; $R^6$ represents alkyl having from 1 to 4 carbon atoms; r2 represents an integer of from 1 to 3; s and q each independently represents an integer of from 0 to 3; and the sum of r2, s and q is 4;

$Z^3$ independently represents methyl or ethyl; $W^1$ independently represents hydrogen or fluorine; $R^2$ independently represents —CN, —CF$_3$, —OCF$_3$, alkyl having from 1 to 25 carbon atoms or alkoxy having from 1 to 25 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; $X^4$ independently represents —CH$_2$— or —O—; m2 independently represents an integer of from 2 to 8; and b independently represents 0 or 1, wherein $Z^2$ independently represents hydrogen or methyl; $X^5$ independently represents a single bond, —(CH$_2$)$_2$— or —CH=CH—; $W^1$ independently represents hydrogen or fluorine; and m1 independently represents an integer of from 2 to 15.

2. The polymerizable liquid crystal composition according to claim 1, wherein in formulae (1-1) and (1-2), $Z^1$ independently represents hydrogen, fluorine or methyl; $W^1$ independently represents hydrogen or fluorine; $W^2$ independently represents hydrogen or methyl; $X^1$ independently represents —O— or a group represented by formula (a); and m1 independently represents an integer of from 2 to 15, in formula (2), $Z^2$ represents hydrogen or methyl; $W^3$ represents hydrogen or fluorine; $R^1$ represents —CN, —OCF$_3$, alkyl having from 1 to 10 carbon atoms or alkoxy having from 1 to 10 carbon atoms; $X^2$ represents a single bond, —COO— or —OCO—; and m1 represents an integer of from 2 to 15, in formulae (3-1) to (3-3), $Z^2$ independently represents hydrogen or methyl; $R^3$ independently represents hydrogen or alkyl having from 1 to 6 carbon atoms; $R^4$ independently represents hydrogen or alkyl having from 1 to 3 carbon atoms; $R^5$ independently represents hydrogen or methyl; $W^4$ independently represents hydrogen or alkyl having from 1 to 6 carbon atoms; n1 independently represents an integer of from 1 to 3; n2 independently represents an integer of from 1 to 3; n3 independently represents an integer of from 0 to 10; and r1 independently represents an integer of from 2 to 5, in formulae (4-1A), (4-1B) and (4-2), $Z^2$ independently represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 10 carbon atoms, and in the alkylene, one or two —CH$_2$— not adjacent to each other may be replaced by —O—; X represents alkoxy having from 1 to 4 carbon atoms or trimethylsiloxy; $R^6$ represents alkyl having from 1 to 4 carbon atoms; r2 represents an integer of from 1 to 3; s and q each independently represents an integer of from 0 to 3; and the sum of r2, s and q is 4, in formulae (4-3) to (4-5), $Z^3$ independently represents methyl or ethyl; $W^1$ independently represents hydrogen or fluorine; $R^2$ independently represents —CN, —CF$_3$, —OCF$_3$, alkyl having from 1 to 25 carbon atoms or alkoxy having from 1 to 25 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; $X^4$ independently represents —CH$_2$— or —O—; m2 independently represents an integer of from 2 to 8; and b independently represents 0 or 1, and in formulae (5-1) and (5-2), $Z^2$ independently represents hydrogen or methyl; $X^5$ independently represents a single bond, —(CH$_2$)$_2$— or —CH=CH—; $W^1$ independently represents hydrogen or fluorine; and m1 independently represents an integer of from 2 to 15.

3. The polymerizable liquid crystal composition according to claim 1, wherein in formulae (1-1) and (1-2), $Z^1$ independently represents hydrogen, fluorine or methyl; $W^1$ independently represents hydrogen or fluorine; $W^2$ independently represents hydrogen or methyl; $X^1$ independently represents —O— or a group represented by formula (a); and m1 independently represents an integer of from 2 to 10, in formula (2), $Z^2$ represents hydrogen or methyl; $W^3$ represents hydrogen or fluorine; $R^1$ represents —CN, —OCF$_3$, alkyl having from 1 to 10 carbon atoms or alkoxy having from 1 to 10 carbon atoms; $X^2$ represents a single bond, —COO— or —OCO—; and m1 represents an integer of from 2 to 10, in formulae (3-1) to (3-3), $Z^2$ independently represents hydrogen or methyl; $R^3$ represents hydrogen; $R^4$ independently represents hydrogen or alkyl having from 1 to 3 carbon atoms; $R^5$ independently represents hydrogen or methyl; $W^4$ represents hydrogen; n1 independently represents an integer of from 1 to 3; n2 independently represents an integer of from 1 to 3; n3 independently represents an integer of from 0 to 6; and r1 independently represents an integer of from 2 to 5, in formulae (4-1A), (4-1B) and (4-2), $Z^2$ represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 6 carbon atoms, and in the alkylene, one or two —CH$_2$— not adjacent to each other may be replaced by —O—; X represents alkoxy having from 1 to 4 carbon atoms or trimethylsiloxy; $R^6$ represents alkyl having from 1 to 4 carbon atoms; r2 represents an integer of from 1 to 3; s and q each independently represents an integer of from 0 to 3; and the sum of r2, s and q is 4, in formulae (4-3) to (4-5), $Z^3$ independently represents methyl or ethyl; $W^1$ independently represents hydrogen or fluorine; $R^2$ independently represents —CN, —OCF$_3$, alkyl having from 1 to 10 carbon atoms or alkoxy having from 1 to 10 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; $X^4$ independently represents —CH$_2$— or —O—; m2 independently represents an integer of from 2 to 8; and b independently represents 0 or 1, and in formulae (5-1) and (5-2), $Z^2$ independently represents hydrogen or methyl; $X^5$ independently represents a single bond, —(CH$_2$)$_2$— or —CH=CH—; $W^1$ independently represents hydrogen or fluorine; and m1 independently represents an integer of from 2 to 10.

4. The polymerizable liquid crystal composition according to claim 1, wherein in formulae (1-1) and (1-2), $Z^1$ independently represents hydrogen, fluorine or methyl; $W^1$ represents hydrogen or fluorine; $W^2$ independently represents hydrogen or methyl; $X^1$ represents —O— or a group represented by formula (a); and m1 independently represents an integer of from 2 to 6, in formula (2), $Z^2$ represents hydrogen or methyl; $W^3$ represents hydrogen or fluorine; $R^1$ represents —CN or —OCF$_3$; $X^2$ represents a single bond, —COO— or —OCO—; and m1 represents an integer of from 2 to 6, in formulae (3-1) to (3-3), $Z^2$ represents hydrogen; $R^3$ represents hydrogen; $R^4$ represents hydrogen; $R^5$ represents hydrogen; $W^4$ represents hydrogen; n1 represents an integer of from 1 to 3; n2 represents an integer of from 1 to 3; n3 represents an integer of from 0 to 4; and r1 represents 2, in formulae (4-1A), (4-1B) and (4-2), $Z^2$ represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 6 carbon atoms, and in the alkylene, one or two —CH$_2$— not adjacent to each other may be replaced by —O—; X represents alkoxy having from 1 to 4 carbon atoms; $R^6$ represents methyl; r2 represents 1 or 2; q represents 0 or 1; and s represents (4-r2-q), in formulae (4-3) to (4-5), $Z^3$ independently represents methyl or ethyl; $W^1$ independently represents hydrogen or fluorine; $R^2$ independently represents —CN, —OCF$_3$, alkyl having from 1 to 10 carbon atoms or alkoxy having from 1 to 10 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; $X^4$ independently represents —CH$_2$— or —O—; m2 independently represents an integer of from 2 to 8; and b independently represents 0 or 1, in formulae (5-1) and (5-2), $Z^2$ independently represents hydrogen or methyl; $X^5$ independently represents a single bond, —(CH$_2$)$_2$— or —CH=CH—; $W^1$ independently represents hydrogen or fluorine; and m1 independently represents an integer of from 2 to 6, and the polymerizable liquid crystal composition comprises the component (A) in a ratio of from 15 to 95% by weight, the component (B) in a ratio of from 3 to 40% by weight, the component (C) in a ratio of from 1 to 20% by weight, the component (D) in a ratio of from 1 to 25% by weight, and the component (E) in a ratio of from 0 to 20% by weight, based on a total weight of the components (A) to (E).

5. The polymerizable liquid crystal composition according to claim 1, wherein in formulae (1-1) and (1-2), $Z^1$ independently represents hydrogen, fluorine or methyl; $W^1$ represents hydrogen or fluorine; $W^2$ independently represents hydrogen or methyl; $X^1$ represents —O— or a group represented by formula (a); and m1 independently represents an integer of from 4 to 6, in formula (2), $Z^2$ represents hydrogen; $W^3$ represents hydrogen; $R^1$ represents —CN; $X^2$ represents a single bond, —COO— or —OCO—; and m1 represents an integer of from 4 to 6, in formulae (3-1) to (3-3), $Z^2$ represents hydrogen; $R^3$ represents hydrogen; $R^4$ represents hydrogen; $R^5$ represents hydrogen; $W^4$ represents hydrogen; n1 represents 1; n2 represents 1; n3 represents an integer of from 0 to 2; and r1 represents 2, in formulae (4-1A), (4-1B) and (4-2), $Z^2$ represents hydrogen or methyl; $Z^4$ represents hydrogen, methyl or ethyl; d represents 0 or 1; Ep represents a group represented by one of formulae (4-2-1) to (4-2-4); Y represents alkylene having from 1 to 6 carbon atoms, and in the alkylene, one or two —CH$_2$— not adjacent to each other may be replaced by —O—; X represents alkoxy having from 1 to 4 carbon atoms; $R^6$ represents methyl; r2 represents 1; q represents 0 or 1; and s represents (4-r2-q), in formulae (4-3) to (4-5), $Z^3$ independently represents methyl or ethyl; $W^1$ independently represents hydrogen or fluorine; $R^2$ independently represents —CN, —OCF$_3$, alkyl having from 1 to 8 carbon atoms or alkoxy having from 1 to 8 carbon atoms; $X^3$ independently represents a single bond, —COO—, —OCO—, —CH=CH—COO—, —OCO—CH=CH—, —CH$_2$CH$_2$—COO— or —OCO—CH$_2$CH$_2$—; X$^4$ independently represents —CH$_2$— or —O—; m2 independently represents an integer of from 2 to 6; and b independently represents 0 or 1, in formulae (5-1) and (5-2), Z$^2$ independently represents hydrogen or methyl; X$^5$ independently represents a single bond, —(CH$_2$)$_2$— or —CH=CH—; W$^1$ represents hydrogen; and m1 independently represents an integer of from 2 to 6, and the polymerizable liquid crystal composition comprises the component (A) in a ratio of from 27 to 91% by weight, the component (B) in a ratio of from 3 to 35% by weight, the component (C) in a ratio of from 3 to 15% by weight, the component (D) in a ratio of from 3 to 23% by weight, and the component (E) in a ratio of from 0 to 15% by weight, based on a total weight of the components (A) to (E).

6. The polymerizable liquid crystal composition according to claim 1, wherein in formulae (1-1) and (1-2), Z$^1$ represents hydrogen, fluorine or methyl; W$^1$ represents hydrogen or fluorine; W$^2$ independently represents hydrogen or methyl; X$^1$ represents —O— or a group represented by formula (a); and m1 represents an integer of from 4 to 6, in formula (2), Z$^2$ represents hydrogen; W$^3$ represents hydrogen; R$^1$ represents —CN; X$^2$ represents a single bond, —COO— or —OCO—; and m1 represents an integer of from 4 to 6, in formulae (3-1) to (3-3), Z$^2$ represents hydrogen; R$^3$ represents hydrogen; R$^4$ represents hydrogen; R$^5$ represents hydrogen; W$^4$ represents hydrogen; n1 represents 1; n2 represents 1; n3 represents an integer of from 0 to 2; and r1 represents 2, in formulae (4-1A), (4-1B) and (4-2), Z$^2$ represents hydrogen or methyl; Z$^4$ represents hydrogen or ethyl; d represents 0 or 1; Ep represents a group represented by one of formulae (4-2-1) to (4-2-4); Y represents alkylene having from 1 to 6 carbon atoms, and in the alkylene, one or two —CH$_2$— not adjacent to each other may be replaced by —O—; X represents methoxy or ethoxy; R$^6$ represents methyl; r2 represents 1; q represents 0 or 1; and s represents (4-r2-q), in formulae (4-3) to (4-5), Z$^3$ represents ethyl; W$^1$ independently represents hydrogen or fluorine; R$^2$ independently represents —CN or —OCF$_3$; X$^3$ independently represents a single bond, —COO—, —OCO—, —CH=CH—COO—, —OCO—CH=CH—, —CH$_2$CH$_2$—COO— or —OCO—CH$_2$CH$_2$—; X$^4$ represents —O—; m2 independently represents an integer of from 4 to 6; and b independently represents 0 or 1, in formulae (5-1) and (5-2), Z$^2$ represents hydrogen or methyl; X$^5$ represents a single bond; W$^1$ represents hydrogen or fluorine; and m1 represents an integer of from 4 to 6, and the polymerizable liquid crystal composition comprises the component (A) in a ratio of from 32 to 89% by weight, the component (B) in a ratio of from 5 to 35% by weight, the component (C) in a ratio of from 3 to 13% by weight, the component (D) in a ratio of from 3 to 20% by weight, and the component (E) in a ratio of from 0 to 13% by weight, based on a total weight of the components (A) to (E).

7. The polymerizable liquid crystal composition according to claim 6, wherein the polymerizable liquid crystal composition comprises the component (A) in a ratio of from 37 to 84% by weight, the component (B) in a ratio of from 10 to 35% by weight, the component (C) in a ratio of from 3 to 10% by weight, the component (D) in a ratio of from 3 to 18% by weight, and the component (E) in a ratio of from 0 to 10% by weight, based on a total weight of the components (A) to (E).

8. The polymerizable liquid crystal composition according to claim 4, wherein the polymerizable liquid crystal composition comprises the component (A) in a ratio of from 15 to 95% by weight, the component (B) in a ratio of from 3 to 40% by weight, the component (C) in a ratio of from 1 to 20% by weight, the component (D) in a ratio of from 1 to 25% by weight, and 0% by weight of the component (E), based on a total weight of the components (A) to (E).

9. The polymerizable liquid crystal composition according to claim 4, wherein the polymerizable liquid crystal composition comprises the component (A) in a ratio of from 15 to 94.9% by weight, the component (B) in a ratio of from 3 to 40% by weight, the component (C) in a ratio of from 1 to 20% by weight, the component (D) in a ratio of from 1 to 25% by weight, and the component (E) in a ratio of from 0.1 to 20% by weight, based on a total weight of the components (A) to (E).

10. The polymerizable liquid crystal composition according to claim 6, wherein the polymerizable liquid crystal composition comprises the component (A) in a ratio of from 32 to 89% by weight, the component (B) in a ratio of from 5 to 35% by weight, the component (C) in a ratio of from 3 to 13% by weight, the component (D) in a ratio of from 3 to 20% by weight, and 0% by weight of the component (E), based on a total weight of the components (A) to (E).

11. The polymerizable liquid crystal composition according to claim 6, wherein the polymerizable liquid crystal composition comprises the component (A) in a ratio of from 32 to 88.9% by weight, the component (B) in a ratio of from 5 to 35% by weight, the component (C) in a ratio of from 3 to 13% by weight, the component (D) in a ratio of from 3 to 20% by weight, and the component (E) in a ratio of from 0.1 to 13% by weight, based on a total weight of the components (A) to (E).

12. A polymerizable liquid crystal layer obtained by directly coating the polymerizable liquid crystal composition according to claim 1 on a supporting substrate.

13. The polymerizable liquid crystal layer according to claim 12, wherein the supporting substrate is a glass substrate.

14. The polymerizable liquid crystal layer according to claim 12, wherein the supporting substrate is a glass substrate having a plastic thin film coated on a surface thereof, or a plastic substrate.

15. The polymerizable liquid crystal layer according to claim 12, wherein the supporting substrate is a glass substrate having a plastic thin film coated on a surface thereof and being subjected a corona treatment or a plasma treatment on a surface of the plastic thin film, or a plastic substrate being subjected a corona treatment or a plasma treatment on a surface thereof.

16. The polymerizable liquid crystal layer according to claim 14, wherein a plastic material constituting the plastic thin film or the plastic substrate is one selected from polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

17. The polymerizable liquid crystal layer according to claim 15, wherein a plastic material constituting the plastic thin film or the plastic substrate is one selected from polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

18. The polymerizable liquid crystal layer according to claim 12, wherein an alignment state of a liquid crystal skeleton in the polymerizable liquid crystal layer is a homeotropic alignment.

19. A liquid crystal film obtained by polymerizing the polymerizable liquid crystal layer according to claim 12.

20. An optical compensation device comprising the liquid crystal film according to claim 19.

21. An optical device comprising at least one liquid crystal film according to claim 19 and a polarizing plate.

22. A liquid crystal display device comprising the optical compensation device according to claim 20 on an inner surface or an outer surface of a liquid crystal cell.

23. A liquid crystal display device comprising the optical device according to claim 21 on an outer surface of a liquid crystal cell.

* * * * *